(12) United States Patent
Su et al.

(10) Patent No.: US 12,210,137 B2
(45) Date of Patent: Jan. 28, 2025

(54) IMAGING LENS ASSEMBLY, CAMERA MODULE AND ELECTRONIC DEVICE

(71) Applicant: LARGAN PRECISION CO., LTD., Taichung (TW)

(72) Inventors: Heng-Yi Su, Taichung (TW); Yi-Jie Chen, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 482 days.

(21) Appl. No.: 17/709,677

(22) Filed: Mar. 31, 2022

(65) Prior Publication Data

US 2022/0365321 A1 Nov. 17, 2022

Related U.S. Application Data

(60) Provisional application No. 63/186,847, filed on May 11, 2021.

(51) Int. Cl.
*G02B 13/00* (2006.01)
*G02B 5/00* (2006.01)

(52) U.S. Cl.
CPC ......... *G02B 13/0015* (2013.01); *G02B 5/003* (2013.01)

(58) Field of Classification Search
CPC ...... G02B 13/0015; G02B 5/003; G02B 3/00; G02B 2003/0093; G02B 5/005; G02B 7/02; G02B 7/021; G02B 7/022; G02B 13/001; G02B 13/0055; G03B 9/00; G03B 9/02

USPC ....... 359/614, 601, 613, 642, 738, 739, 811, 359/819; 396/439, 505, 507, 529, 530

See application file for complete search history.

(56) References Cited

U.S. PATENT DOCUMENTS

| | | | |
|---|---|---|---|
| 8,967,814 B2 | 3/2015 | Chang | |
| 8,985,789 B2 | 3/2015 | Cho et al. | |
| 9,016,876 B2 | 4/2015 | Lai | |
| 10,018,808 B2 | 7/2018 | Chou | |
| 10,648,636 B2 * | 5/2020 | Chen | F21S 41/321 |
| 10,809,491 B2 | 10/2020 | Jeong et al. | |
| 2019/0179098 A1 | 6/2019 | Yang et al. | |
| 2019/0179103 A1 | 6/2019 | Yang et al. | |
| 2019/0346650 A1 | 11/2019 | Yang et al. | |
| 2020/0033548 A1 | 1/2020 | Yang et al. | |

(Continued)

FOREIGN PATENT DOCUMENTS

| | | | | |
|---|---|---|---|---|
| CN | 111853701 A | * | 10/2020 | |
| JP | 11352374 A | * | 12/1999 | ............... G02B 7/02 |

*Primary Examiner* — Arnel C Lavarias
(74) *Attorney, Agent, or Firm* — McClure, Qualey & Rodack, LLP

(57) ABSTRACT

An imaging lens assembly has an optical axis, and includes at least one radial reduction lens element and a light blocking element. The radial reduction lens element includes an effective optical portion and a peripheral portion. The effective optical portion includes a reduction part shrinking from a portion of the effective optical portion towards the optical axis so that the effective optical portion is non-circular. The peripheral portion and the reduction part are disposed at interval. The light blocking element includes a receiving structure and an extending light blocking structure. The extending light blocking structure and the receiving structure are disposed at interval, and the extending light blocking structure is connected to the receiving structure so that the effective optical portion is non-circular.

19 Claims, 51 Drawing Sheets

(56) References Cited

U.S. PATENT DOCUMENTS

| | | |
|---|---|---|
| 2020/0041750 A1 | 2/2020 | Wang |
| 2020/0057179 A1 | 2/2020 | Yang et al. |
| 2021/0063675 A1 | 3/2021 | Yang et al. |
| 2021/0072432 A1 | 3/2021 | Chen |

* cited by examiner

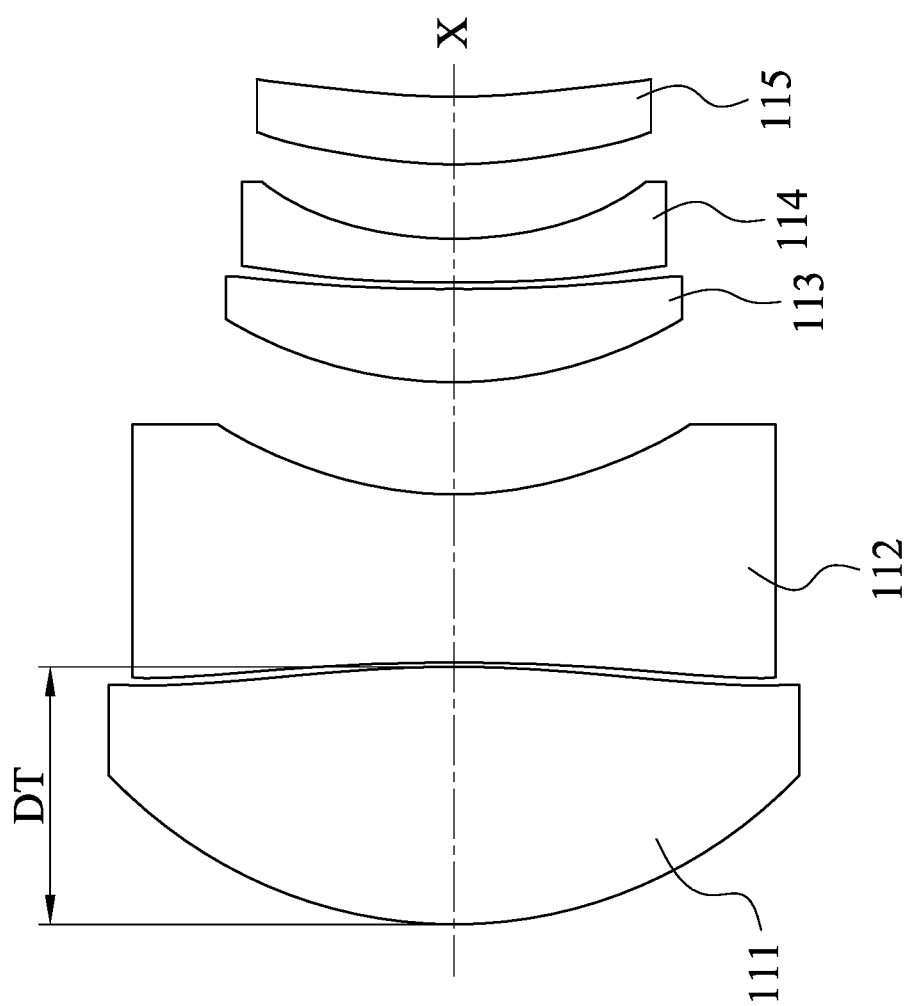

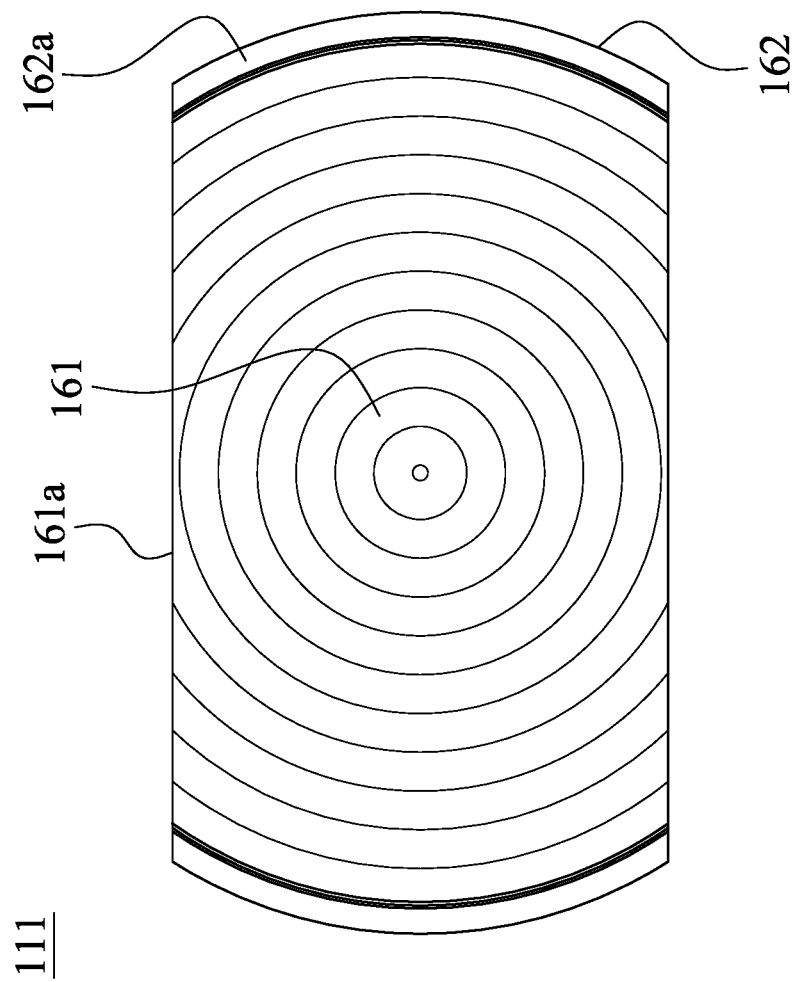
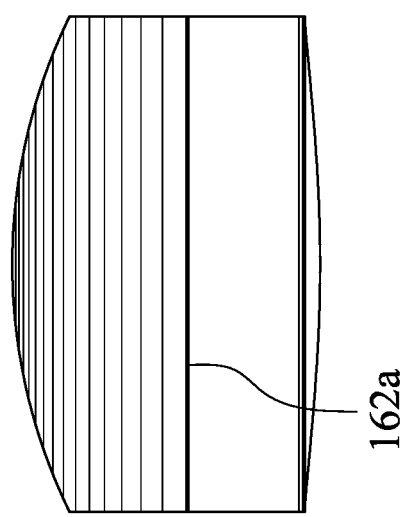
Fig. 1F
Fig. 1E

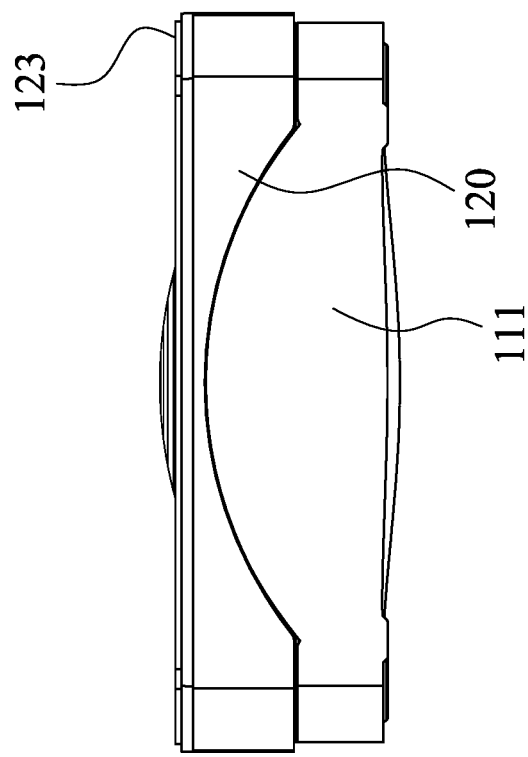
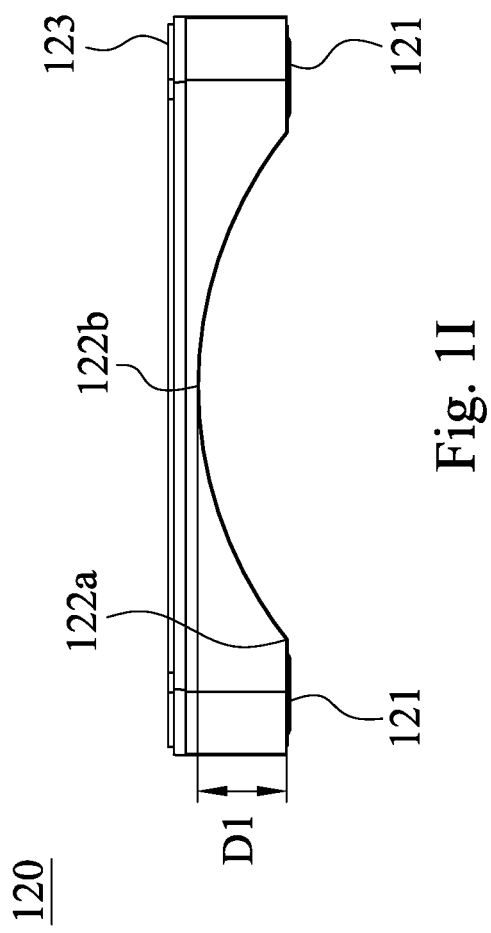
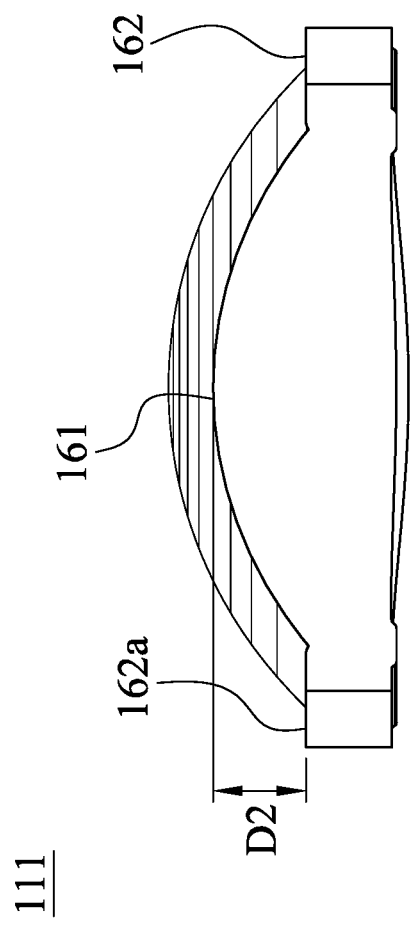
Fig. 1K
Fig. 1I
Fig. 1J

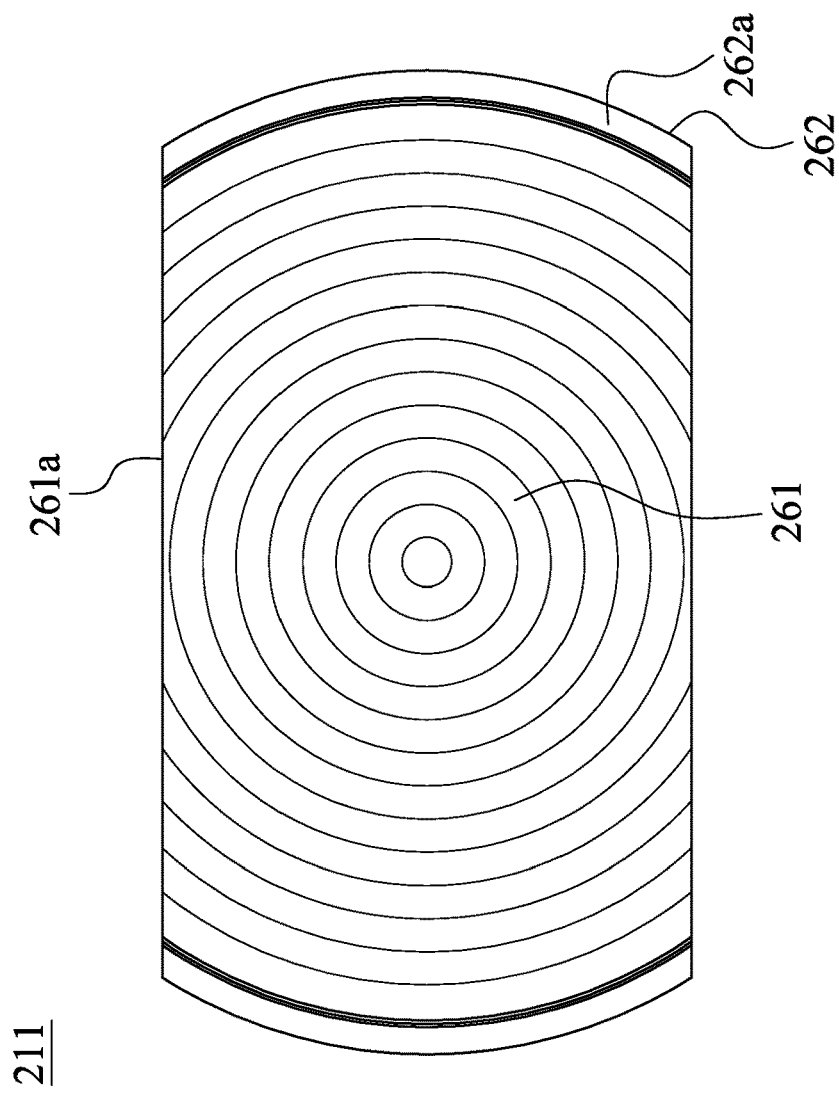
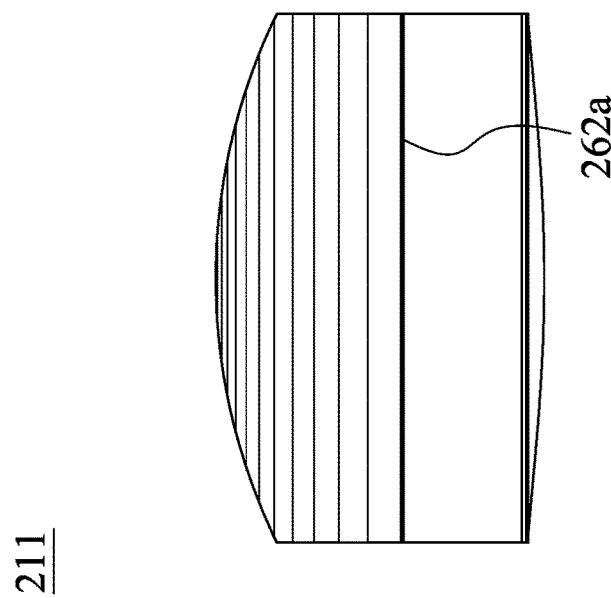
Fig. 2F
Fig. 2E

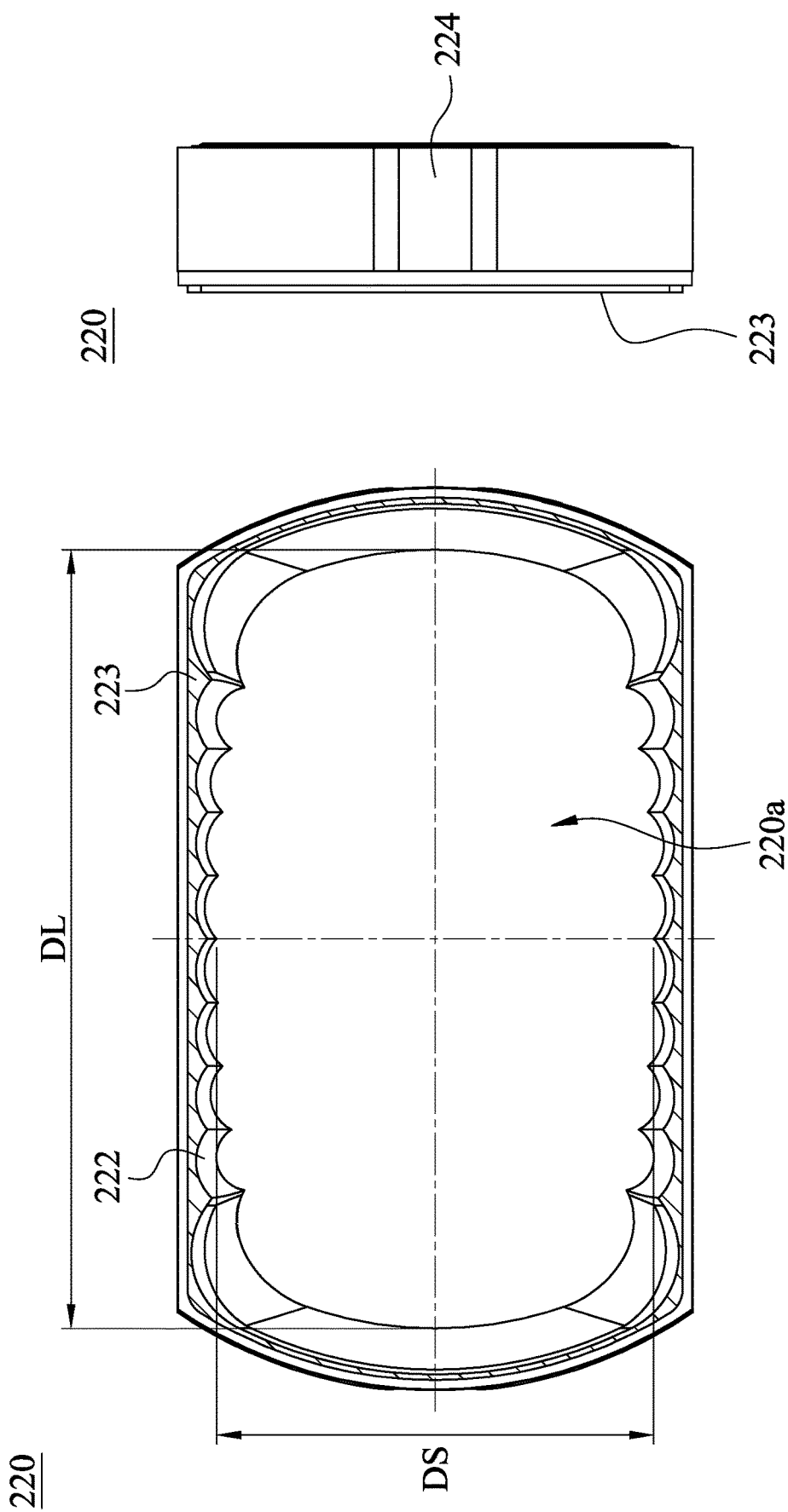

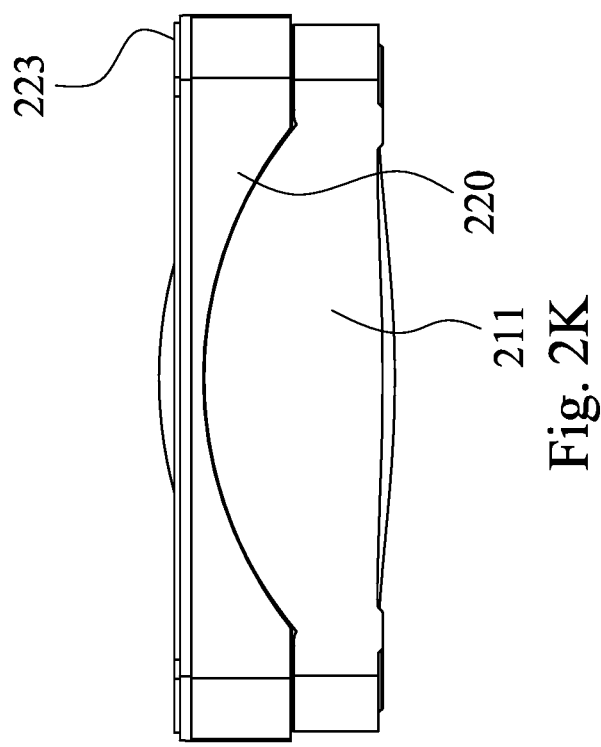
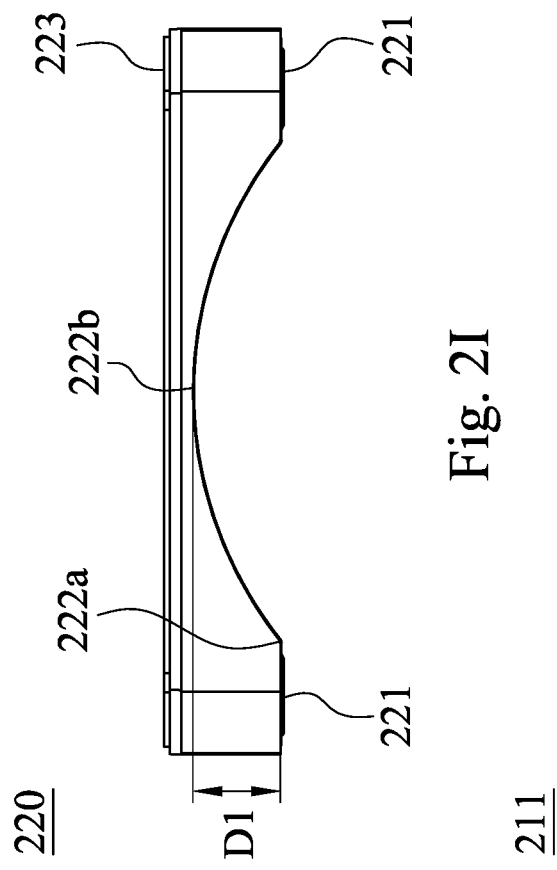
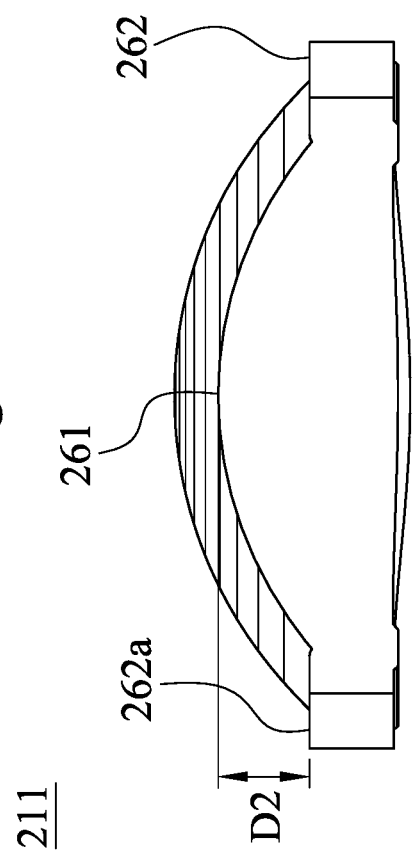
Fig. 2I
Fig. 2J
Fig. 2K

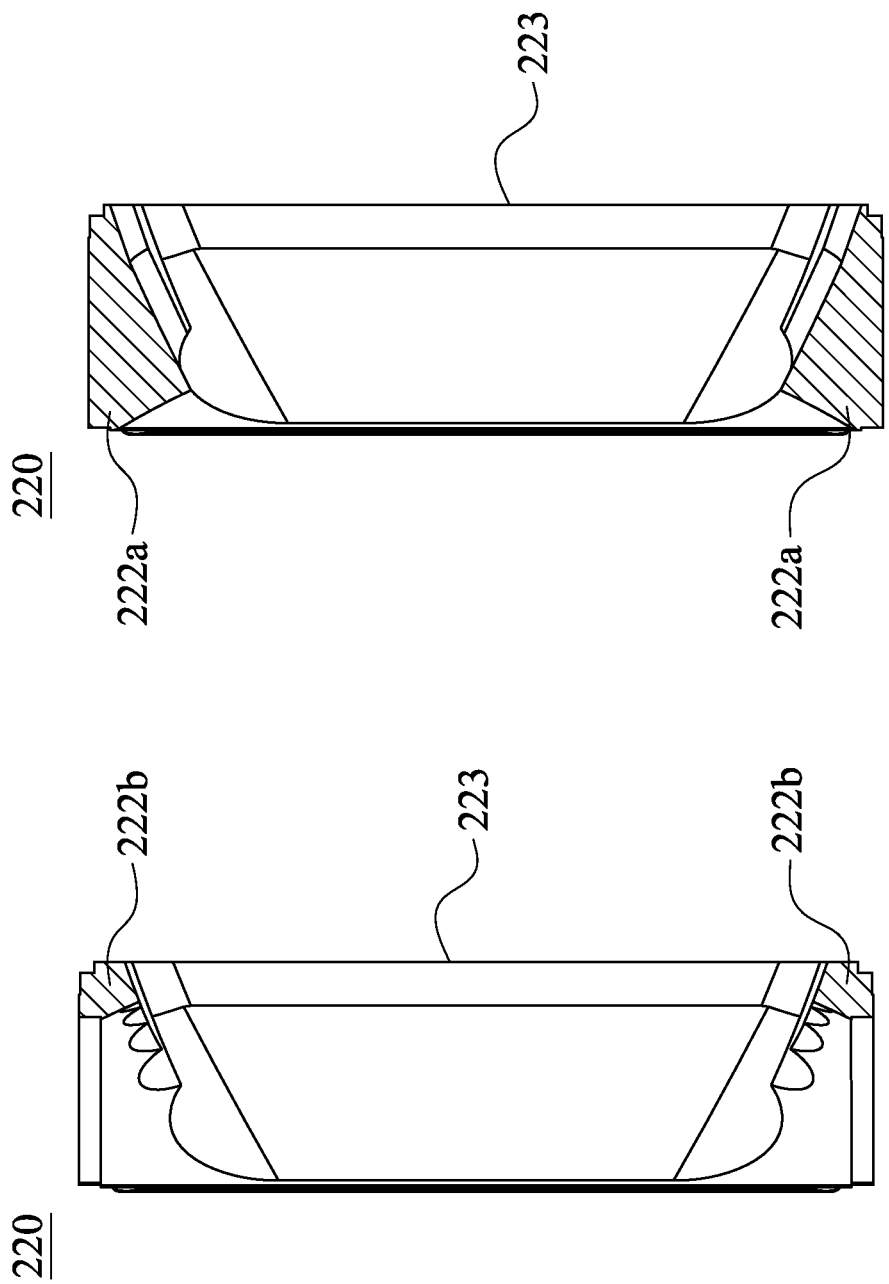

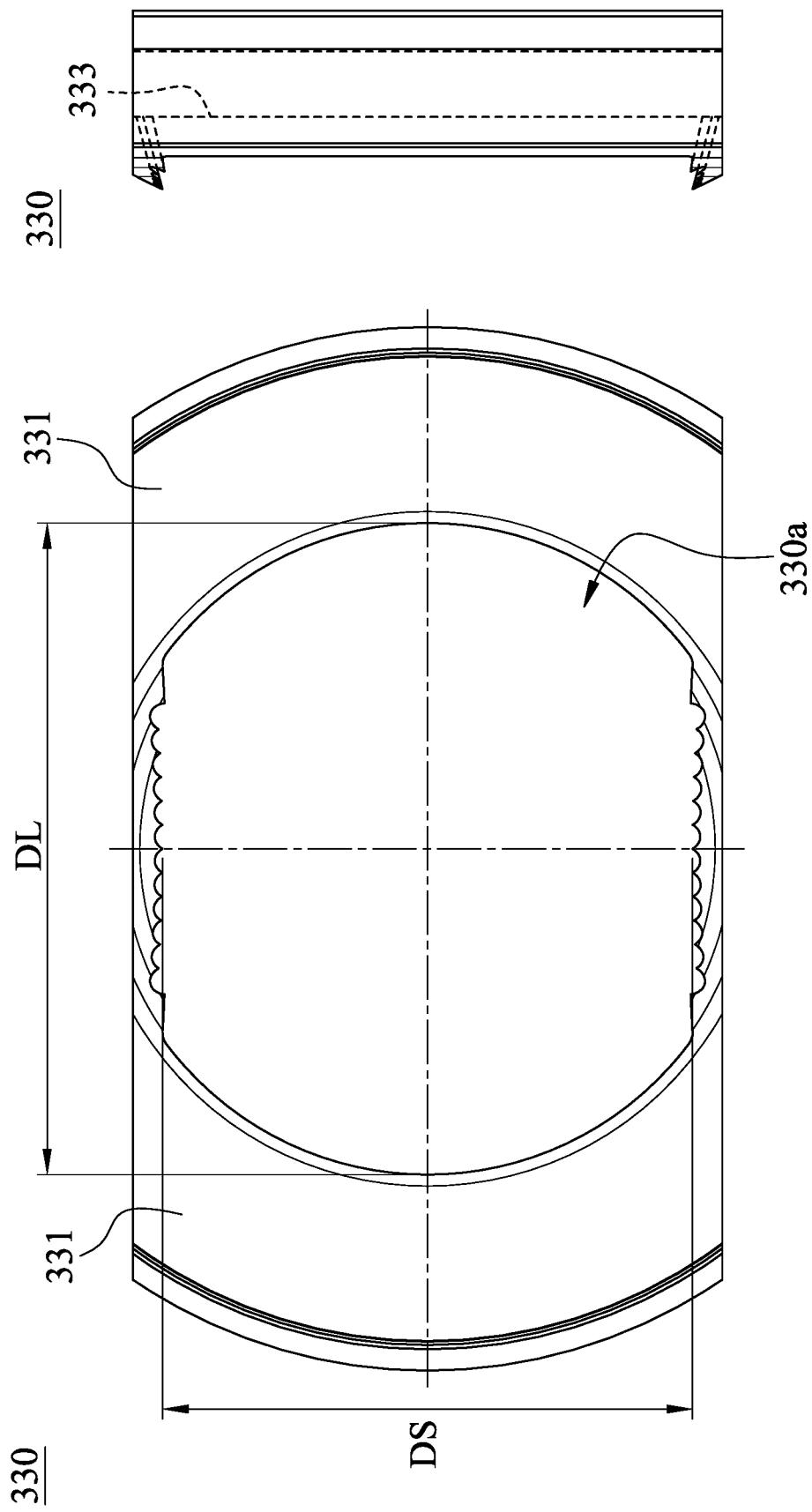

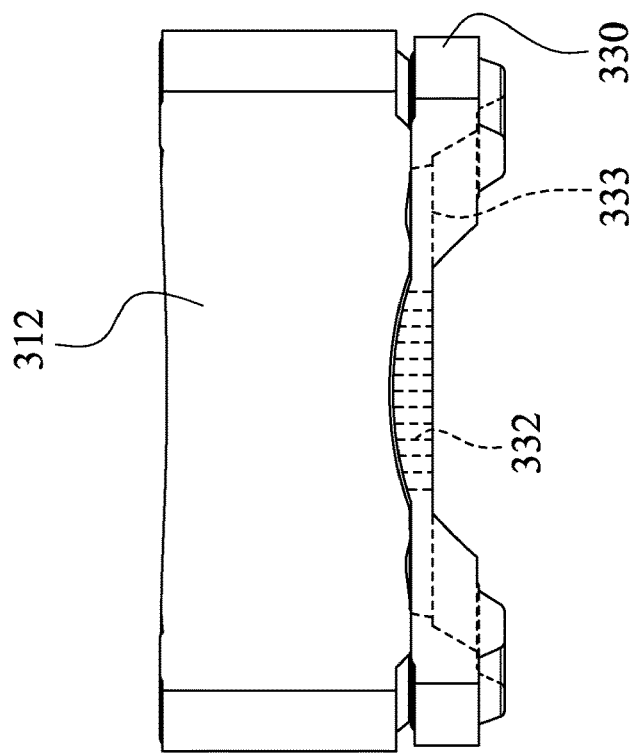
Fig. 3K
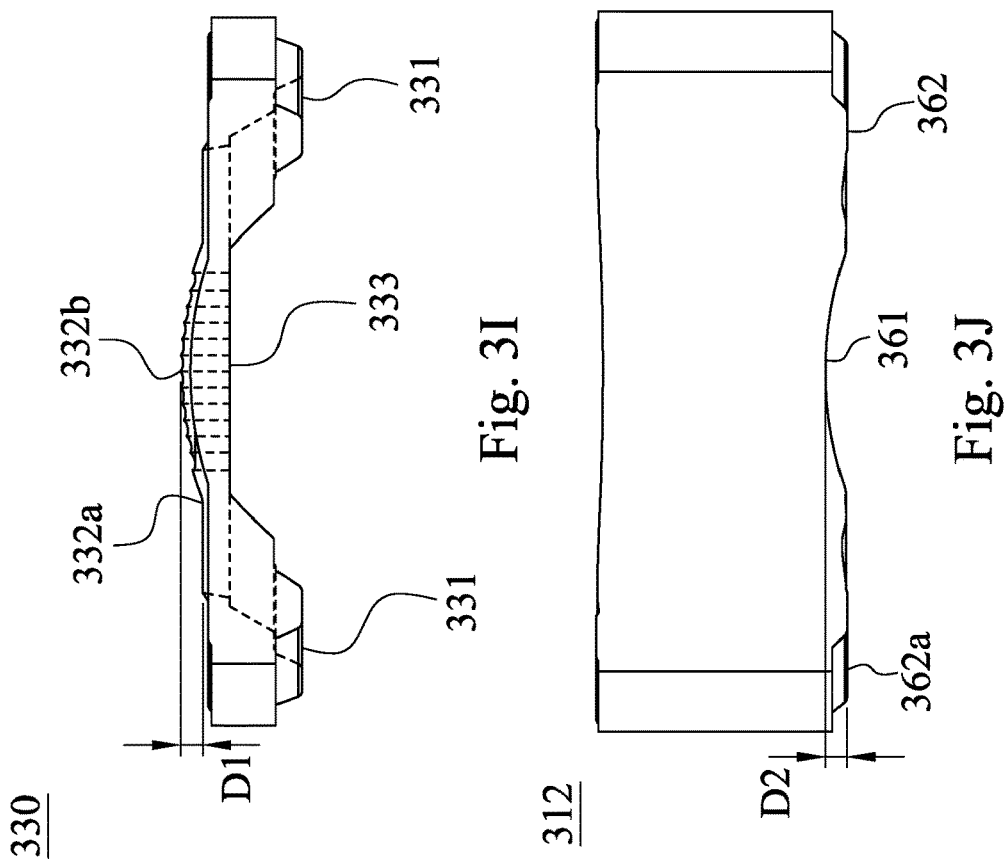
Fig. 3I
Fig. 3J

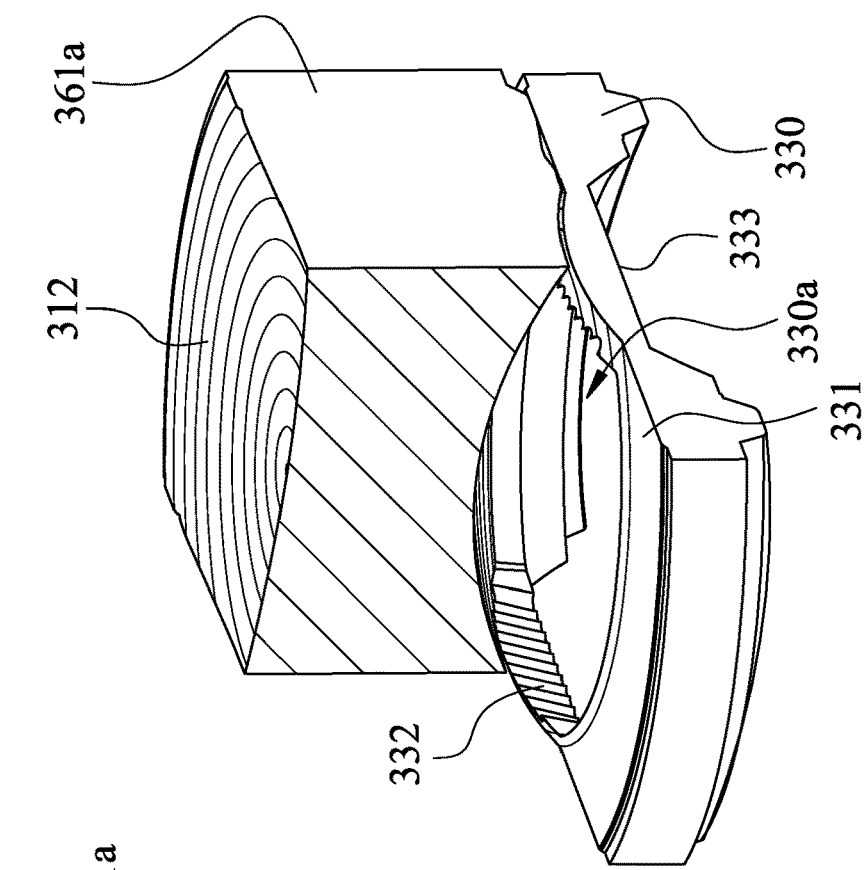
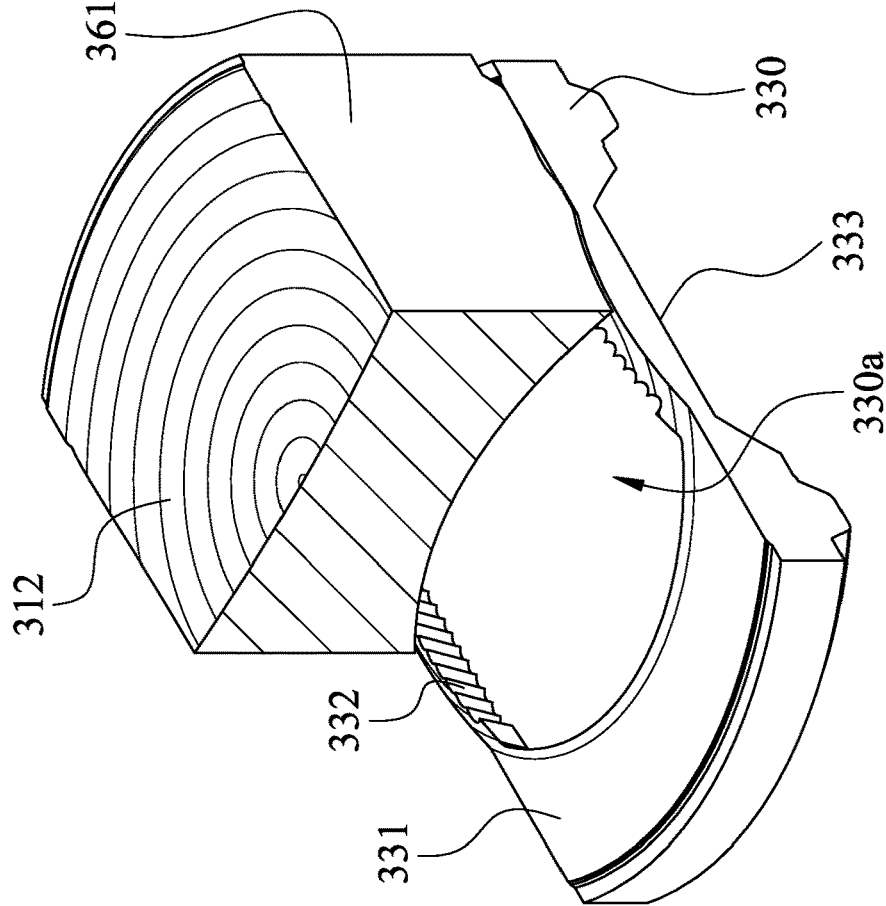

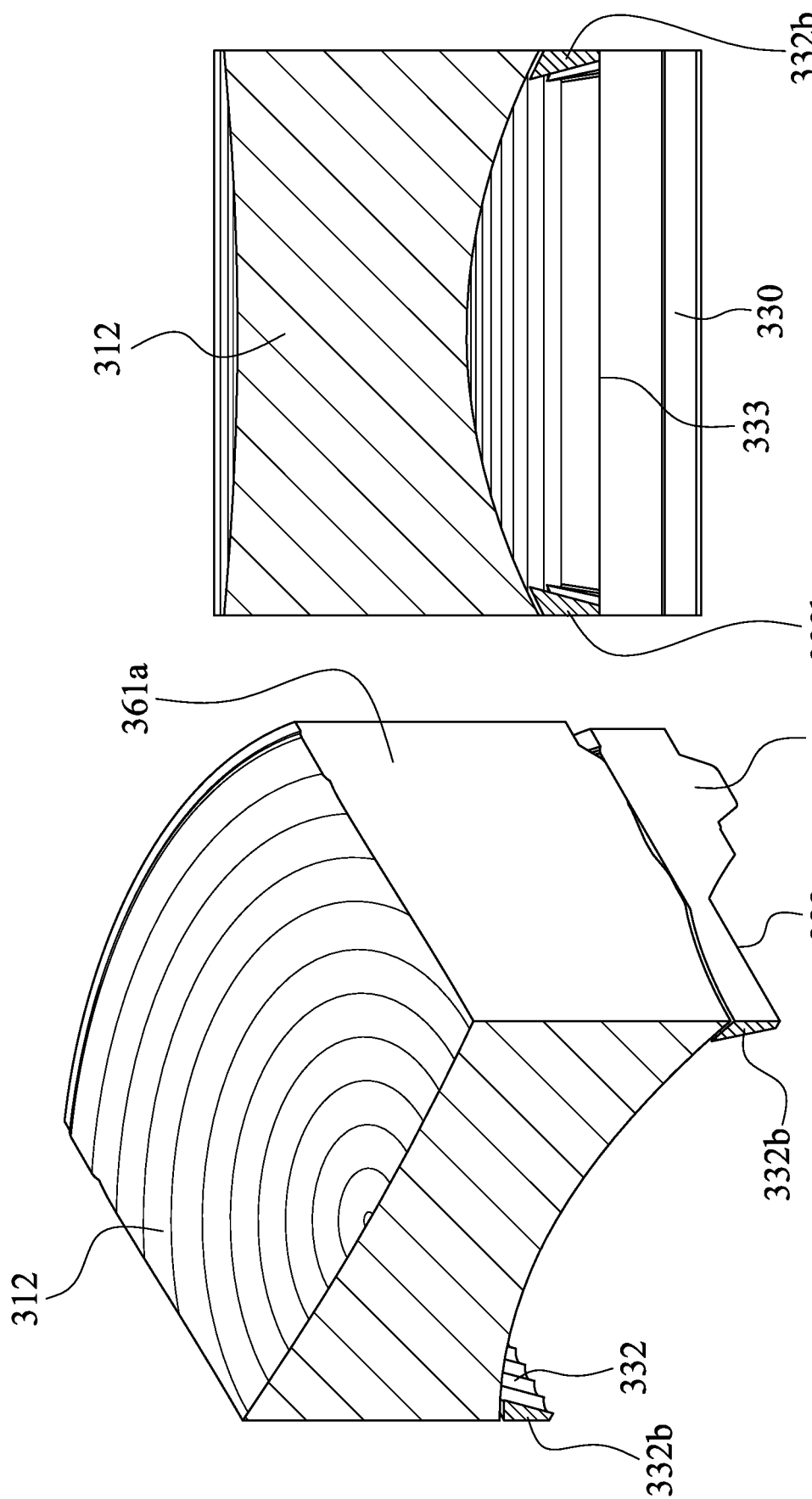

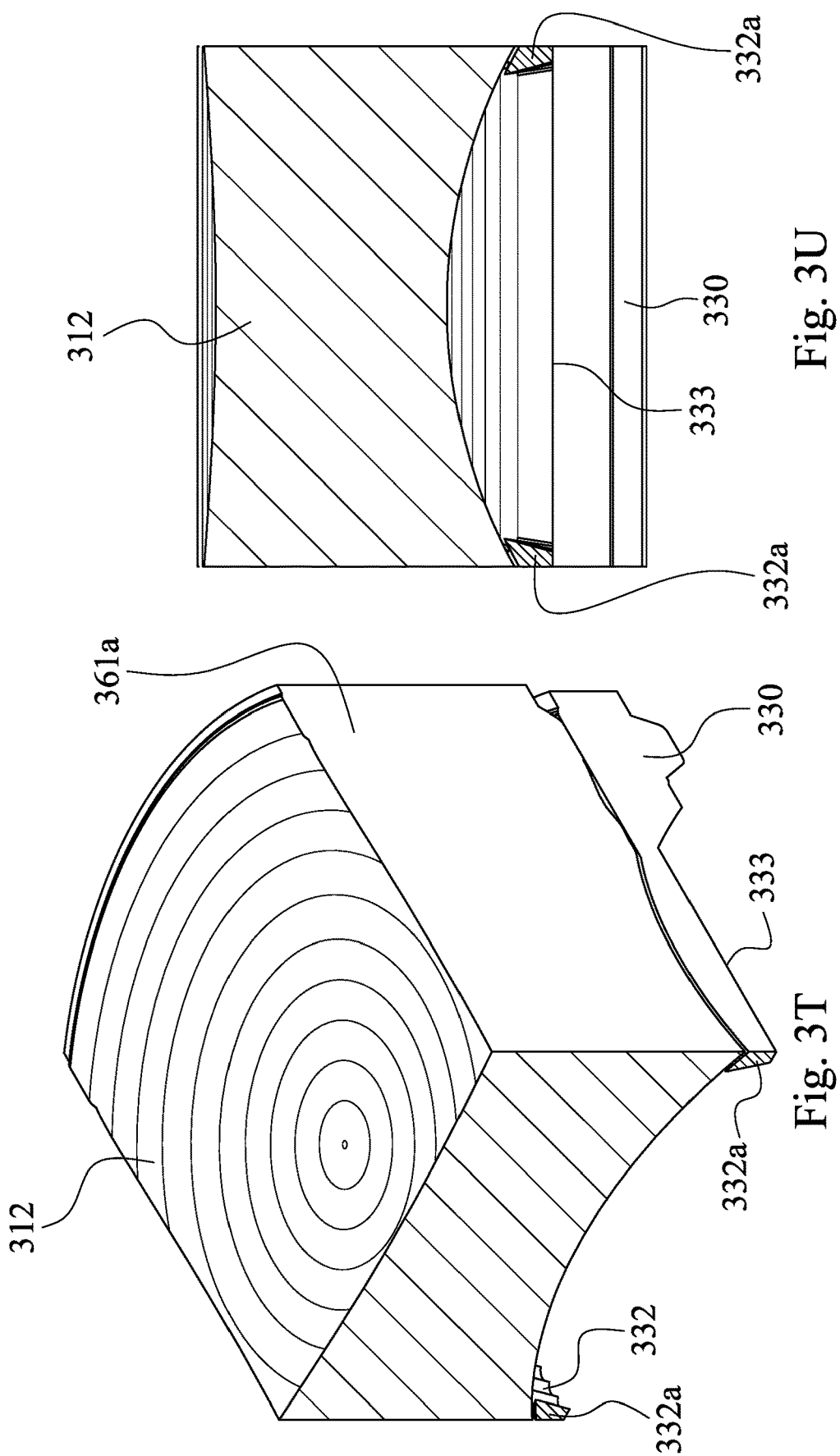

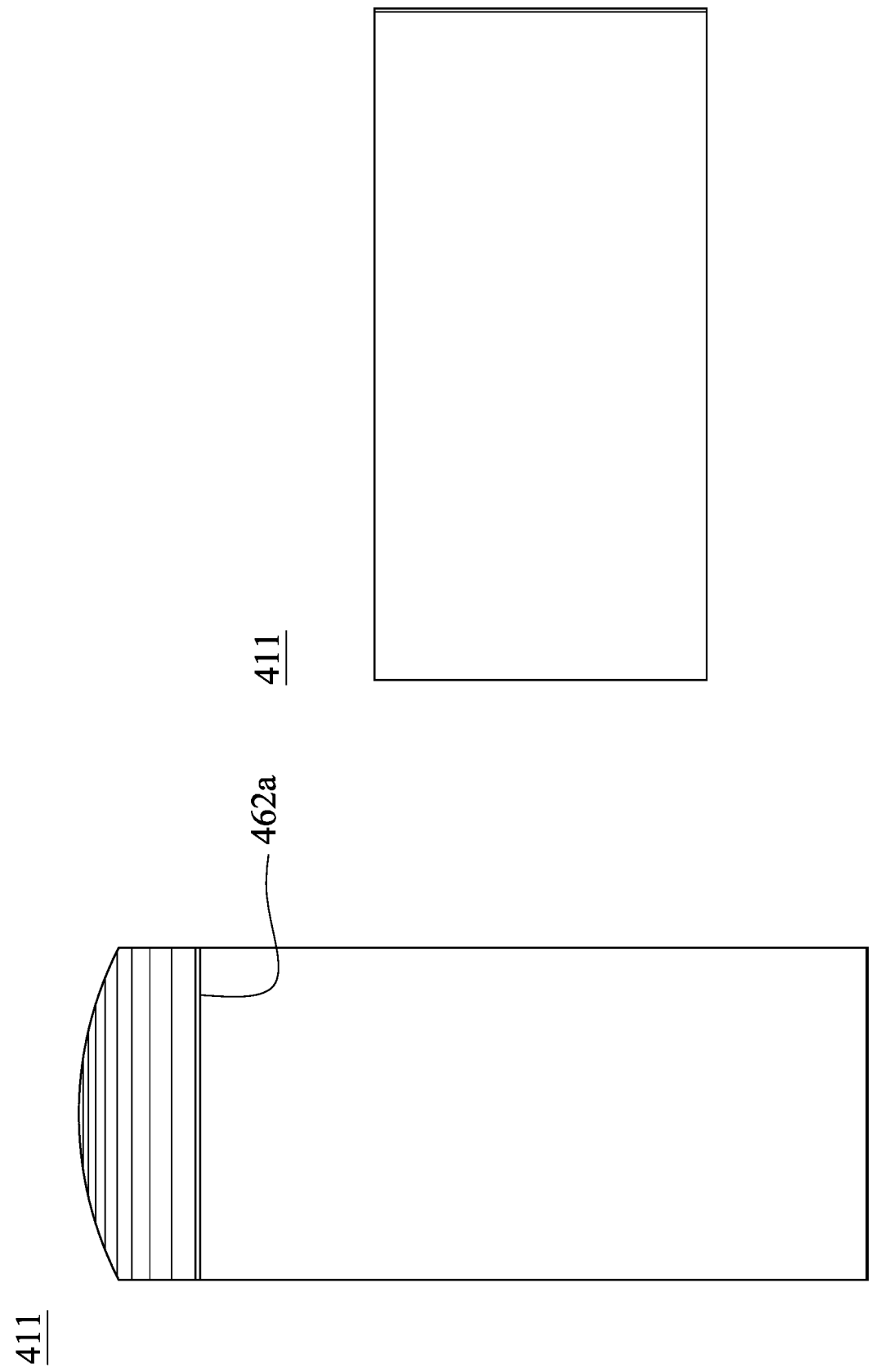

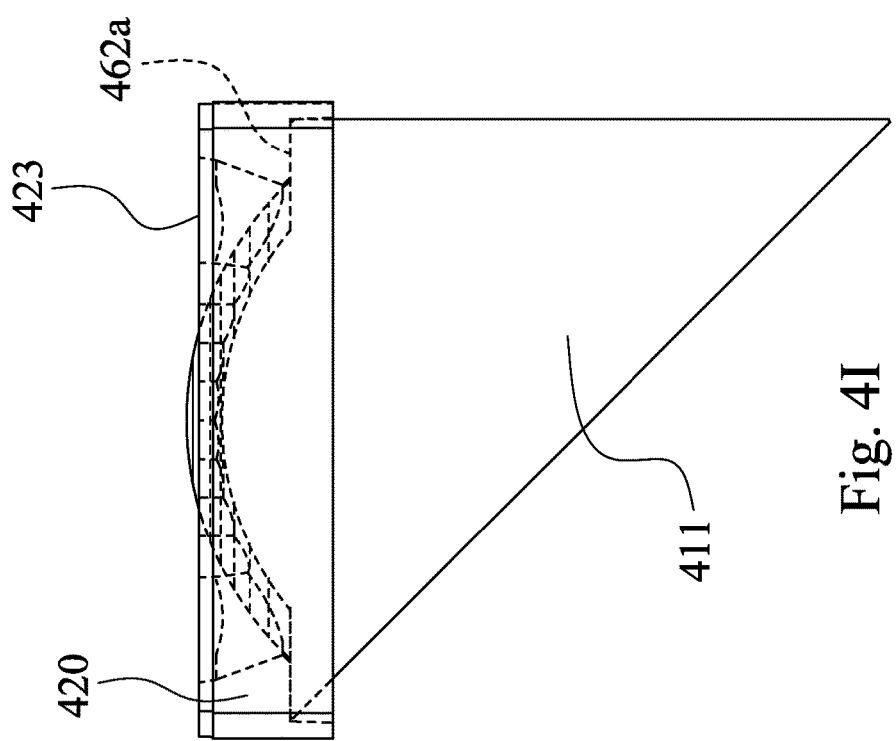
Fig. 4I
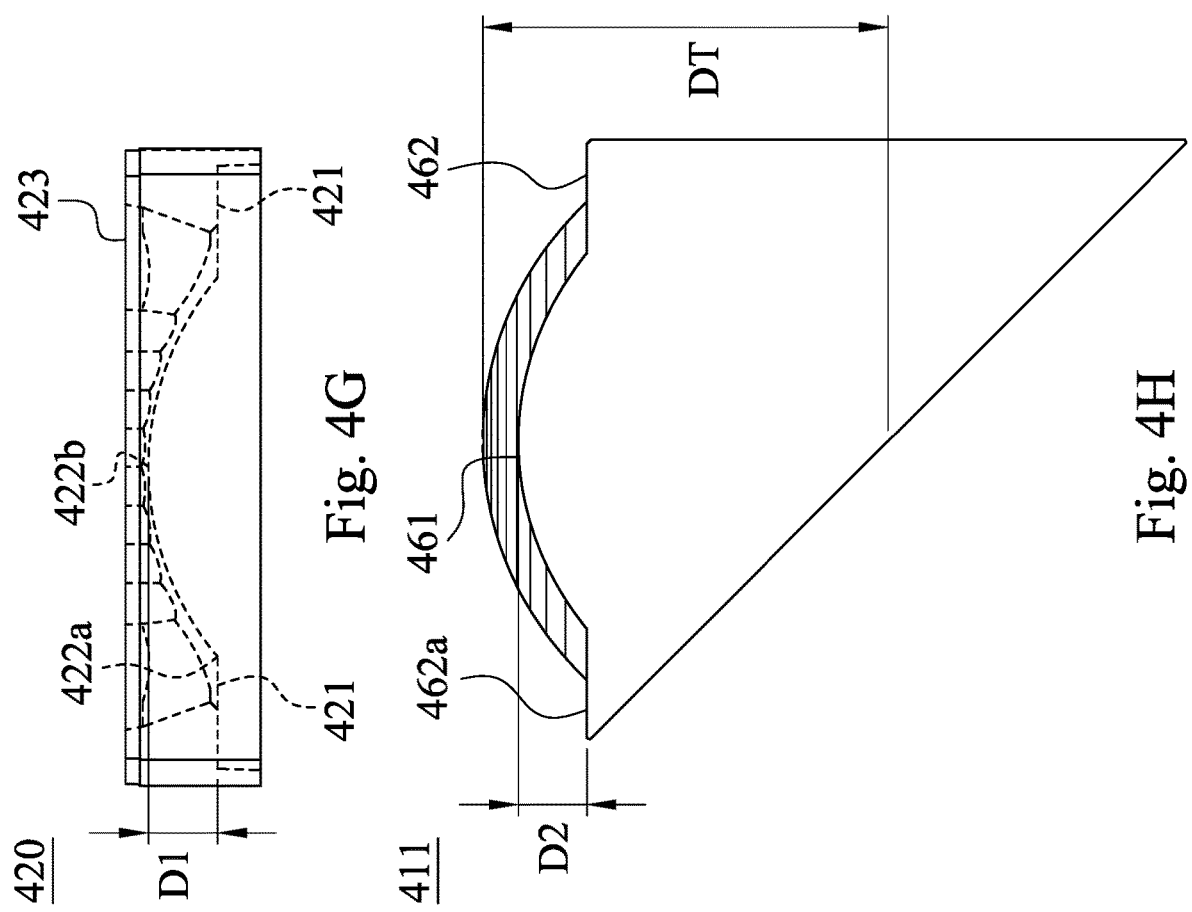
Fig. 4G
Fig. 4H

IMAGING LENS ASSEMBLY, CAMERA MODULE AND ELECTRONIC DEVICE

RELATED APPLICATIONS

This application claims priority to U.S. Provisional Application Ser. No. 63/186,847, filed May 11, 2021, which is herein incorporated by reference.

BACKGROUND

Technical Field

The present disclosure relates to an imaging lens assembly and a camera module. More particularly, the present disclosure relates to an imaging lens assembly and a camera module applicable to portable electronic devices.

Description of Related Art

In recent years, portable electronic devices have developed rapidly. For example, intelligent electronic devices and tablets have been filled in the lives of modern people, and camera modules and imaging lens assemblies thereof mounted on portable electronic devices have also prospered. However, as technology advances, the quality requirements of the imaging lens assemblies are becoming higher and higher. Therefore, an imaging lens assembly, which can balance the compact size and the image quality, needs to be developed.

SUMMARY

According to one aspect of the present disclosure, an imaging lens assembly has an optical axis, and includes at least one radial reduction lens element and a light blocking element. The radial reduction lens element includes an effective optical portion and a peripheral portion. The optical axis passes through the effective optical portion, and the effective optical portion includes a reduction part. The reduction part shrinks from a portion of the effective optical portion towards the optical axis so that the effective optical portion is non-circular. The peripheral portion extends from the effective optical portion towards a direction away from the optical axis, and the peripheral portion and the reduction part are disposed at interval along a circumferential direction surrounding the optical axis. The light blocking element has a central opening, the optical axis passes through the central opening, and the light blocking element includes a receiving structure and an extending light blocking structure. The receiving structure extends along the optical axis and towards one of an object side and an image side of the imaging lens assembly. The extending light blocking structure and the receiving structure are disposed at interval along the circumferential direction surrounding the optical axis, and the extending light blocking structure is connected to the receiving structure so that the central opening is non-circular. The receiving structure is directly contacted with the peripheral portion of the radial reduction lens element. The extending light blocking structure and the reduction part of the radial reduction lens element are correspondingly disposed. A location parallel to the optical axis of an end part of the extending light blocking structure is different from a location parallel to the optical axis of a middle part of the extending light blocking structure.

According to one aspect of the present disclosure, a camera module includes the imaging lens assembly of the aforementioned aspects.

According to one aspect of the present disclosure, an electronic device includes the camera module of the aforementioned aspect and an image sensor, wherein the image sensor is disposed on an image surface of the camera module.

BRIEF DESCRIPTION OF THE DRAWINGS

FIG. 1D is a partial schematic view of the imaging lens assembly according to the 1st example in FIG. 1A.

FIG. 1E is a side view of the radial reduction lens element according to the 1st example in FIG. 1A.

FIG. 1F is an image-side schematic view of the radial reduction lens element according to the 1st example in FIG. 1A.

FIG. 1I is another side view of the light blocking element according to the 1st example in FIG. 1A.

FIG. 1J is another side view of the radial reduction lens element according to the 1st example in FIG. 1A.

FIG. 1K is an assembling schematic view of the radial reduction lens element with the light blocking element according to the 1st example in FIG. 1A.

FIG. 1O is an assembling three dimensional view of the radial reduction lens element with the light blocking element according to the 1st example in FIG. 1A.

FIG. 2E is a side view of the radial reduction lens element according to the 2nd example in FIG. 2A.

FIG. 2F is an image-side schematic view of the radial reduction lens element according to the 2nd example in FIG. 2A.

FIG. 2G is an object-side schematic view of the light blocking element according to the 2nd example in FIG. 2A.

FIG. 2H is a side view of the light blocking element according to the 2nd example in FIG. 2A.

FIG. 2I is another side view of the light blocking element according to the 2nd example in FIG. 2A.

FIG. 2J is another side view of the radial reduction lens element according to the 2nd example in FIG. 2A.

FIG. 2K is an assembling schematic view of the radial reduction lens element with the light blocking element according to the 2nd example in FIG. 2A.

FIG. 2M is a cross-sectional side view of the light blocking element along a 2M-2M line in FIG. 2L.

FIG. 2N is a cross-sectional side view of the light blocking element along a 2N-2N line in FIG. 2L.

FIG. 3G is an object-side schematic view of the light blocking element according to the 3rd example in FIG. 3A.

FIG. 3H is a side view of the light blocking element according to the 3rd example in FIG. 3A.

FIG. 3I is another side view of the light blocking element according to the 3rd example in FIG. 3A.

FIG. 3J is another side view of the radial reduction lens element according to the 3rd example in FIG. 3A.

FIG. 3K is an assembling schematic view of the radial reduction lens element with the light blocking element according to the 3rd example in FIG. 3A.

FIG. 3O is an assembling three dimensional view of the radial reduction lens element with the light blocking element according to the 3rd example in FIG. 3A.

FIG. 3P is a partial cross-sectional view of the radial reduction lens element and the light blocking element according to the 3rd example in FIG. 3O.

FIG. 3Q is another partial cross-sectional view of the radial reduction lens element and the light blocking element according to the 3rd example in FIG. 3O.

FIG. 3R is a cross-sectional view of the radial reduction lens element and the light blocking element according to the 3rd example in FIG. 3O.

FIG. 3S is a cross-sectional schematic view of the radial reduction lens element and the light blocking element according to the 3rd example in FIG. 3O.

FIG. 3T is another cross-sectional view of the radial reduction lens element and the light blocking element according to the 3rd example in FIG. 3O.

FIG. 3U is another cross-sectional schematic view of the radial reduction lens element and the light blocking element according to the 3rd example in FIG. 3O.

FIG. 4C is a side view of the radial reduction lens element according to the 4th example in FIG. 4A.

FIG. 4D is an image-side schematic view of the radial reduction lens element according to the 4th example in FIG. 4A.

FIG. 4G is another side view of the light blocking element according to the 4th example in FIG. 4A.

FIG. 4H is another side view of the radial reduction lens element according to the 4th example in FIG. 4A.

FIG. 4I is an assembling schematic view of the radial reduction lens element with the light blocking element according to the 4th example in FIG. 4A.

DETAILED DESCRIPTION

Figure 1A:
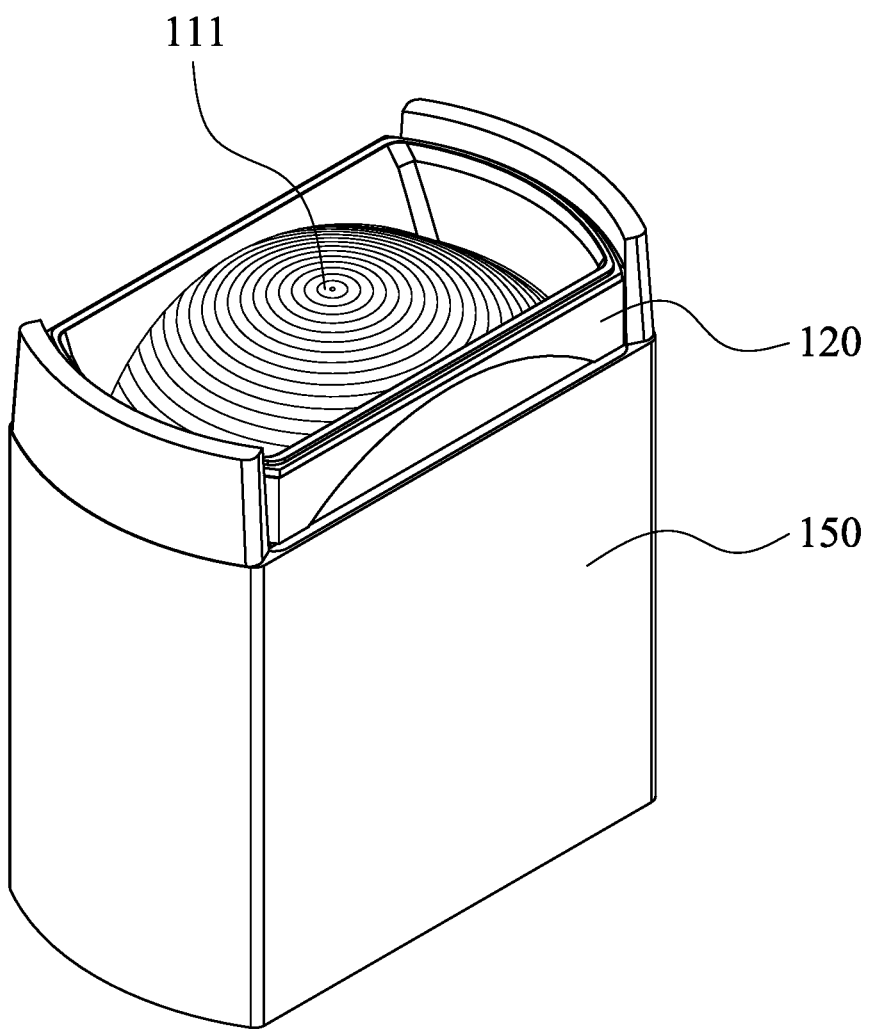
FIG. 1A is a three dimensional view of an imaging lens assembly according to the 1st example of the present disclosure.

The present disclosure provides an imaging lens assembly, the imaging lens assembly has an optical axis, and the imaging lens assembly includes at least one radial reduction lens element and a light blocking element. The radial reduction lens element includes an effective optical portion and a peripheral portion, wherein the optical axis passes through the effective optical portion, and the effective optical portion includes a reduction part. The reduction part shrinks from a portion of the effective optical portion towards the optical axis so that the effective optical portion is non-circular. The peripheral portion extends from the effective optical portion towards a direction away from the optical axis, and the peripheral portion and the reduction part are disposed at interval along a circumferential direction surrounding the optical axis. The light blocking element has a central opening, the optical axis passes through the central opening, and the light blocking element includes a receiving structure and an extending light blocking structure, wherein the receiving structure extends along the optical axis and towards one of an object side and an image side of the imaging lens assembly, the extending light blocking structure and the receiving structure are disposed at interval along the circumferential direction surrounding the optical axis, and the extending light blocking structure is connected to the receiving structure so that the central opening is non-circular. The receiving structure is directly contacted with the peripheral portion of the radial reduction lens element. The extending light blocking structure and the reduction part of the radial reduction lens element are correspondingly disposed. A location parallel to the optical axis of an end part of the extending light blocking structure is different from a location parallel to the optical axis of a middle part of the extending light blocking structure. The entire volume of the imaging lens assembly can be reduced via the radial reduction lens element, so that the possibility of the compact size of the imaging lens assembly is provided. Further, the light blocking element can prevent the non-imaging light from entering the radial reduction lens element so as to ensure the image quality.

In particular, the reduction part can be formed by the mold design of the injection molding or the cutting of the product after molding, but the present disclosure is not limited thereto. Moreover, the end part is connected to the receiving structure and the extending light blocking structure, and the middle part is located in the extending light blocking structure and close to the optical axis.

The peripheral portion of the radial reduction lens element can include a receiving surface directly contacted with the receiving structure of the light blocking element. Therefore, the assembling process of the light blocking element can be more stable so as to reduce the assembling tolerance.

The light blocking element can further include a coplanar structure formed by connecting of the receiving structure and the extending light blocking structure. In particular, the demolding resistance during the process of the injection molding can be reduced via the coplanar structure, so that the warpage of the product can be prevented during demolding, and the stability of the quality of the product can be enhanced. Furthermore, the connection of the receiving structure and the extending light blocking structure can be the closed loop by the coplanar structure surrounding the central opening, but the present disclosure is not limited thereto.

A normal direction of the coplanar structure can be parallel to the optical axis, and the coplanar structure and the radial reduction lens element are relatively disposed. When the coplanar structure is located on the most object-side end or the most image-side end of the imaging lens assembly, the smooth appearance of the imaging lens assembly can be obtained.

The central opening of the light blocking element can gradually expand along the optical axis and towards the coplanar structure. The difficulty of the release (that is, demolding) of the product can be reduced by the design of draft bevel so as to enhance the yield rate.

An air gap can be located between the extending light blocking structure and the radial reduction lens element. Therefore, the interference between the light blocking element and the radial reduction lens element can be prevented so as to ensure the assembling quality.

The light blocking element can be a black plastic product, and the light blocking element can include at least one gate trace. Further, a number of the gate trace can be two, but is not limited thereto. Therefore, the light blocking element can be corresponding to the structure of the injection molding product which is more complicated, so that the design margin of the mold can be enhanced.

When a maximum distance parallel to the optical axis between the end part and the middle part is D1, the following condition can be satisfied: $0.01 \text{ mm} \leq D1 \leq 3.0 \text{ mm}$. Therefore, the extending light blocking structure can be met the contour of the effective optical portion of the reduction part so as to enhance the light blocking efficiency.

When a maximum distance parallel to the optical axis between the effective optical portion located on the reduction part of the radial reduction lens element and the receiving surface of the peripheral portion is D2, the following condition can be satisfied: $0.01 \text{ mm} \leq D2 \leq 3.0 \text{ mm}$. Therefore, the maximum range of the requirement of the light blocking area can be defined corresponding to the shrinking degree of the reduction part towards the optical axis. It should be mentioned that the effective optical portion on the reduction part includes the effective optical portion of the reduction part.

When a maximum thickness of the radial reduction lens element close to the optical axis is DT, the following condition can be satisfied: $0.04 \text{ mm} \leq DT \leq 4.0 \text{ mm}$. In particular, the maximum thickness of the radial reduction lens element close to the optical axis is the central thickness of the radial reduction lens element.

When the maximum distance parallel to the optical axis between the end part and the middle part is D1, and the maximum distance parallel to the optical axis between the effective optical portion located on the reduction part of the radial reduction lens element and the receiving surface of the peripheral portion is D2, the following condition can be satisfied: $0.05 < D1/D2 < 3$. Therefore, the extending light blocking structure can fit the contour of the effective optical portion of the reduction part.

When the maximum distance parallel to the optical axis between the effective optical portion located on the reduction part of the radial reduction lens element and the receiving surface of the peripheral portion is D2, and the maximum thickness of the radial reduction lens element close to the optical axis is DT, the following condition can be satisfied: 0.03<D2/DT<0.8. Therefore, the aforementioned range is corresponding to the proportion range of the radial reduction lens element with different structures so as to meet the requirement of optical design.

When the maximum distance parallel to the optical axis between the end part and the middle part is D1, and the maximum thickness of the radial reduction lens element close to the optical axis is DT, the following condition can be satisfied: 0.02<D1/DT<0.7. Therefore, the aforementioned range can be corresponding to the proportion range of the extending light blocking structure with different structures so as to meet the requirement of optical design.

When a cross-sectional area of the middle part is A0, and a cross-sectional area of the end part is A1, the following condition can be satisfied: 0.05<A0/A1<2. Therefore, the light blocking efficiency of the effective optical portion of the reduction part can be ensured. In particular, the cross-sectional area of the extending light blocking structure can be changed according to the radius of curvature of the reduction part so as to fit the effective optical portion. Further, the following condition can be satisfied: 0.1<A0/A1<1.5. Therefore, the fitting situation of the cooperation between the light blocking element and the effective optical portion of the reduction part can be ensured.

When a distance of a long side defined via the central opening is DL, and a distance of a short side defined via the central opening is DS, the following condition can be satisfied: 0.3<DS/DL<1.0. In particular, the more ideal design range can be obtained by taking the manufacturability of the central opening and the light blocking requirement of the radial reduction lens element into consideration. Further, the following condition can be satisfied: 0.5<DS/DL<0.9.

Each of the aforementioned features of the imaging lens assembly can be utilized in various combinations for achieving the corresponding effects.

The present disclosure provides a camera module, which includes the aforementioned imaging lens assembly.

The present disclosure provides an electronic device, which includes the aforementioned camera module and an image sensor, wherein the image sensor is disposed on an image surface of the camera module.

According to the aforementioned embodiment, specific examples are provided, and illustrated via figures.

1st Example

Figure 1B:
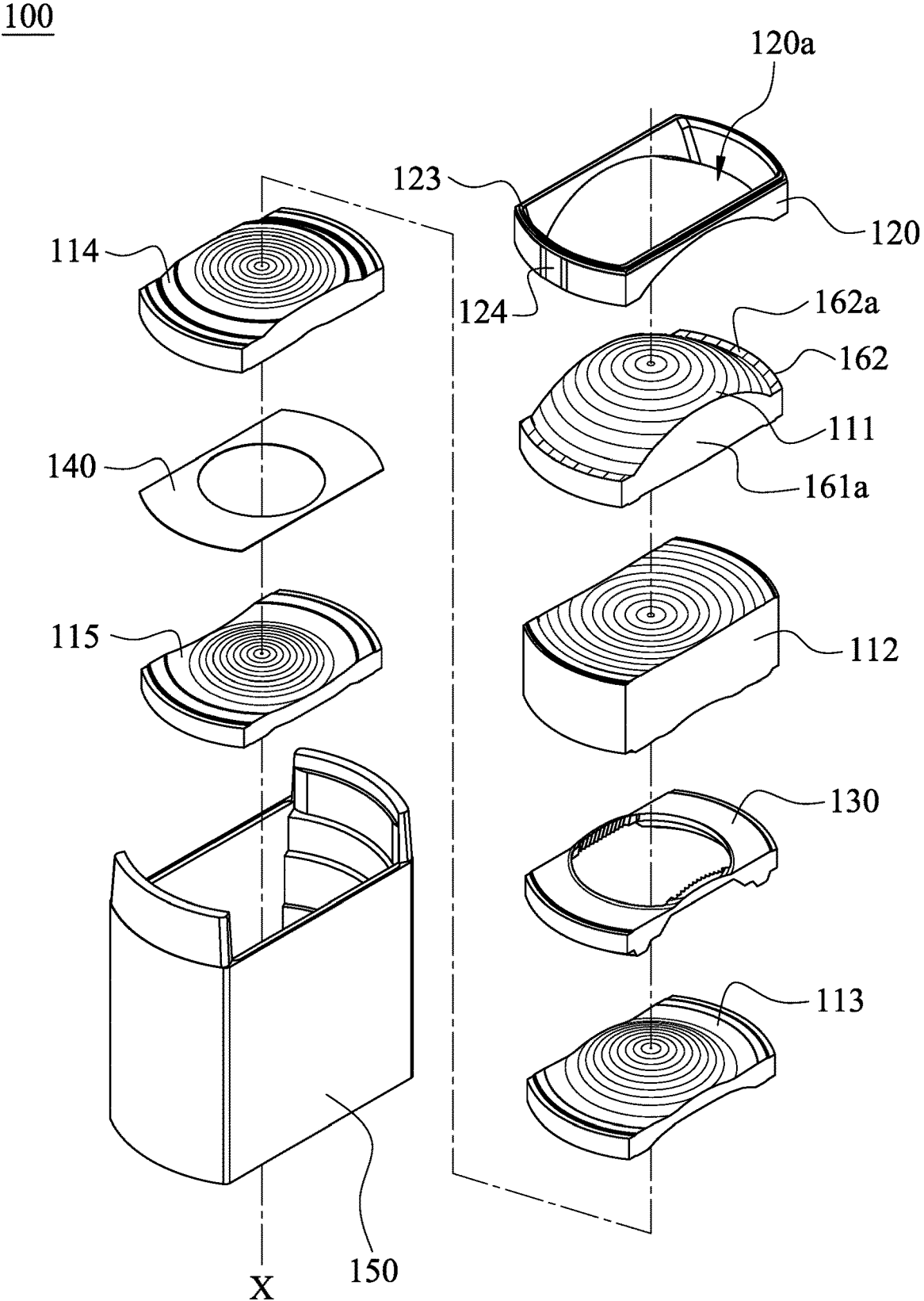
FIG. 1B is an exploded view of the imaging lens assembly according to the 1st example in FIG. 1A.
Figure 1C:
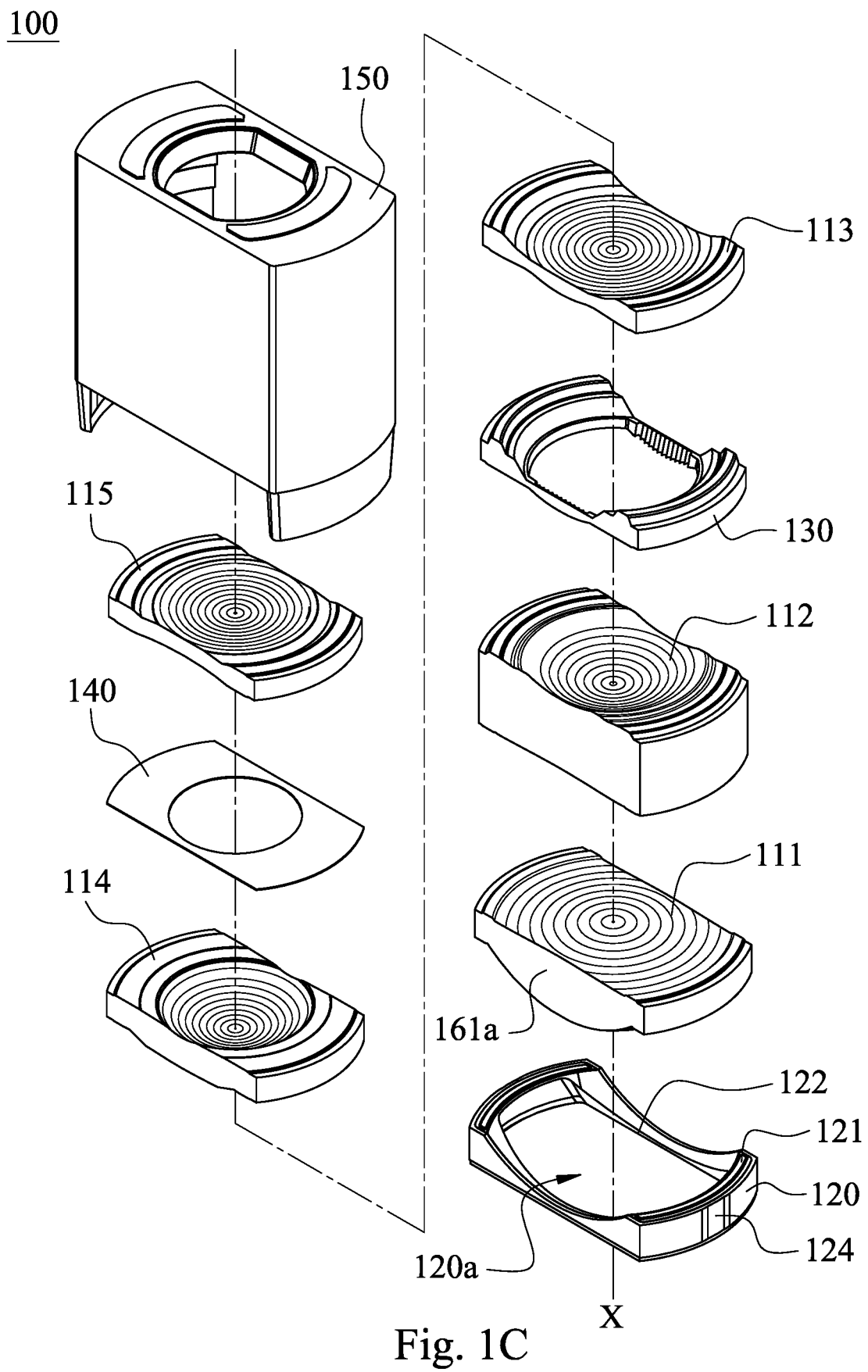
FIG. 1C is another exploded view of the imaging lens assembly according to the 1st example in FIG. 1A.

FIG. 1A is a three dimensional view of an imaging lens assembly 100 according to the 1st example of the present disclosure. FIG. 1B is an exploded view of the imaging lens assembly 100 according to the 1st example in FIG. 1A. FIG. 1C is another exploded view of the imaging lens assembly 100 according to the 1st example in FIG. 1A. FIG. 1D is a partial schematic view of the imaging lens assembly 100 according to the 1st example in FIG. 1A. In FIGS. 1A to 1D, the imaging lens assembly 100 has an optical axis X, and the imaging lens assembly 100, in order from an object side to an image side, includes a light blocking element 120, radial reduction lens elements 111, 112, a light blocking element 130, radial reduction lens elements 113, 114, a light blocking sheet 140, a radial reduction lens element 115 and a lens barrel 150, wherein the radial reduction lens elements 111, 112, 113, 114, 115, the light blocking elements 120, 130 and the light blocking sheet 140 are disposed in the lens barrel 150. In particular, the optical features such as numbers, structures, surface shapes and so on of the radial reduction lens elements can be disposed according to different imaging demand, and the optical features are not limited thereto.

FIG. 1E is a side view of the radial reduction lens element 111 according to the 1st example in FIG. 1A. FIG. 1F is an image-side schematic view of the radial reduction lens element 111 according to the 1st example in FIG. 1A. In FIGS. 1B, 1C, 1E and 1F, the radial reduction lens element 111 includes an effective optical portion 161 and a peripheral portion 162. The optical axis X passes through the effective optical portion 161, the effective optical portion 161 includes a reduction part 161a, and the reduction part 161a shrinks from a portion of the effective optical portion 161 towards the optical axis X so that the effective optical portion 161 is non-circular. The peripheral portion 162 extends from the effective optical portion 161 towards a direction away from the optical axis X, and the peripheral portion 162 and the reduction part 161a are disposed at interval along a circumferential direction surrounding the optical axis X. The entire volume of the imaging lens assembly 100 can be reduced via the radial reduction lens element 111, so that the possibility of the compact size of the imaging lens assembly 100 is provided. In particular, the reduction part 161a can be formed by the mold design of the injection molding or the cutting of the product after molding, but the present disclosure is not limited thereto.

Figure 1H:
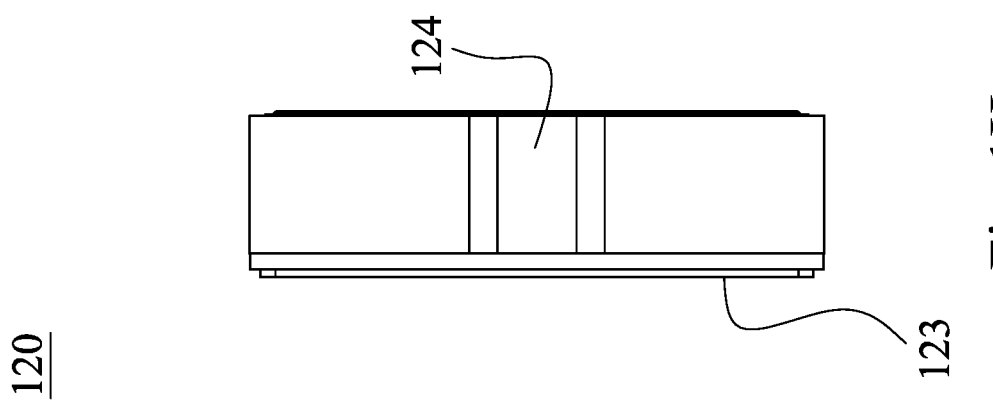
FIG. 1H is a side view of the light blocking element according to the 1st example in FIG. 1A.
Figure 1G:
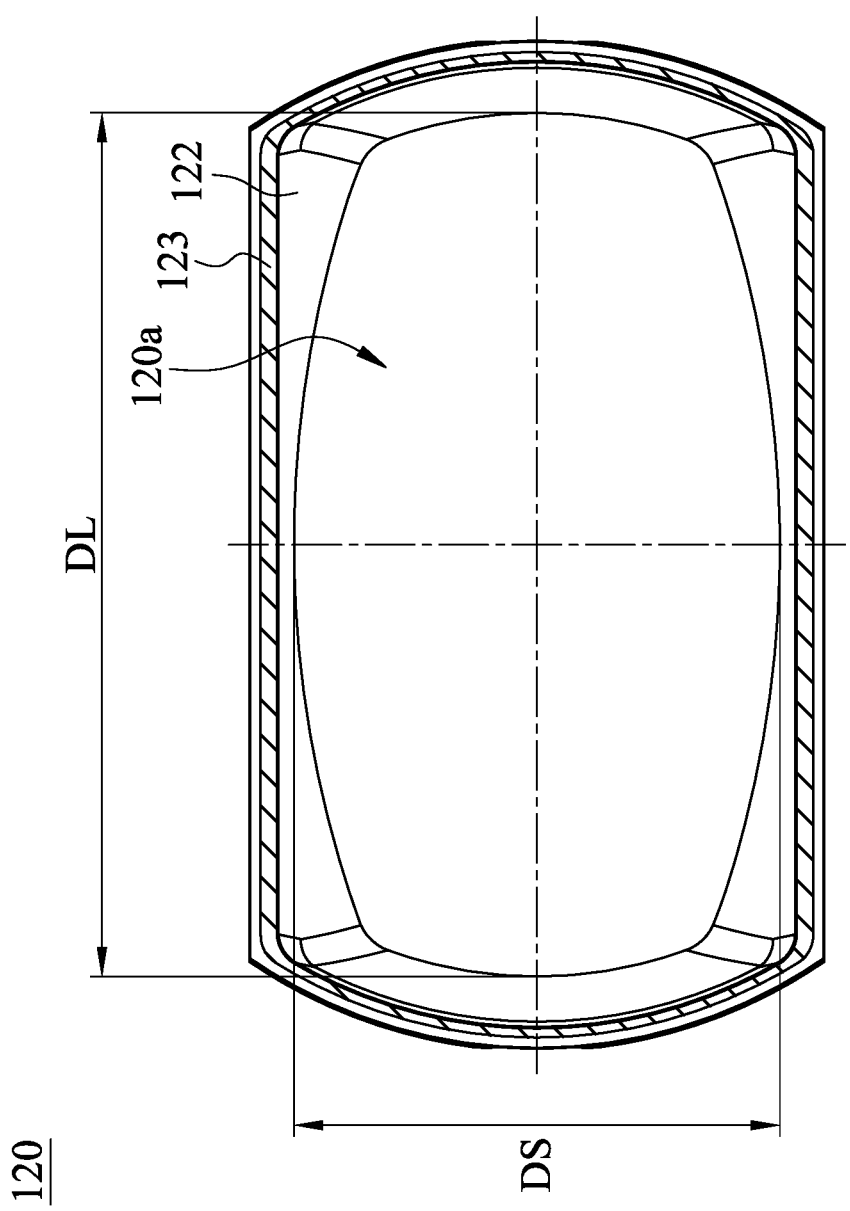
FIG. 1G is an object-side schematic view of the light blocking element according to the 1st example in FIG. 1A.

FIG. 1G is an object-side schematic view of the light blocking element 120 according to the 1st example in FIG. 1A. FIG. 1H is a side view of the light blocking element 120 according to the 1st example in FIG. 1A. FIG. 1I is another side view of the light blocking element 120 according to the 1st example in FIG. 1A. In FIGS. 1B, 1C, 1G, 1H and 1I, the light blocking element 120 has a central opening 120a, the optical axis X passes through the central opening 120a, and the light blocking element 120 includes a receiving structure 121 and an extending light blocking structure 122, wherein the receiving structure 121 extends along the optical axis X and towards the image side of the imaging lens assembly 100, the extending light blocking structure 122 and the receiving structure 121 are disposed at interval along the circumferential direction surrounding the optical axis X, and the extending light blocking structure 122 is connected to the receiving structure 121 so that the central opening 120a is non-circular. Therefore, the non-imaging light can be prevented from entering the radial reduction lens element 111 so as to ensure the image quality.

FIG. 1J is another side view of the radial reduction lens element 111 according to the 1st example in FIG. 1A. FIG. 1K is an assembling schematic view of the radial reduction lens element 111 with the light blocking element 120 according to the 1st example in FIG. 1A. In FIGS. 1I to 1K, the receiving structure 121 is directly contacted with the peripheral portion 162 of the radial reduction lens element 111. Furthermore, the peripheral portion 162 of the radial reduction lens element 111 includes a receiving surface 162a directly contacted with the receiving structure 121 of the light blocking element 120. Therefore, the assembling process of the light blocking element 120 can be more stable so as to reduce the assembling tolerance.

Figure 1L:
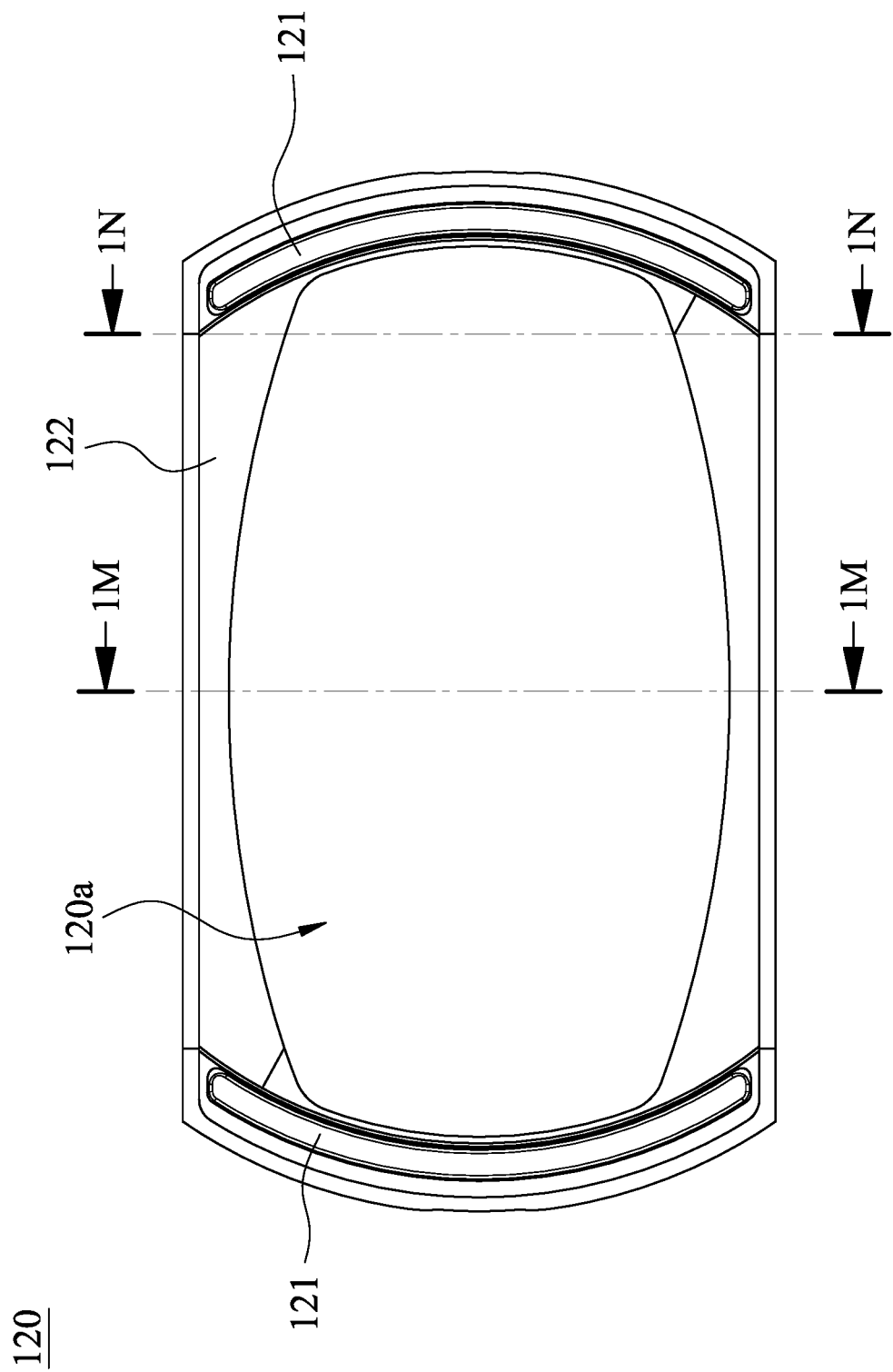
FIG. 1L is an image-side schematic view of the light blocking element according to the 1st example in FIG. 1A.
Figure 1N:
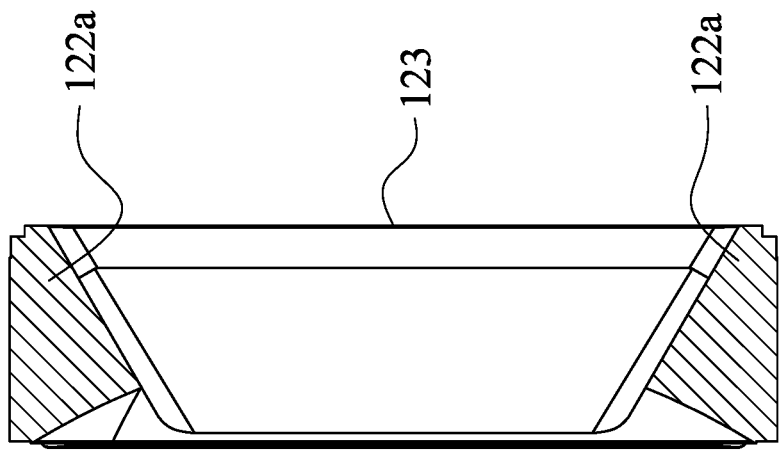
FIG. 1N is a cross-sectional side view of the light blocking element along line 1N-1N in FIG. 1L.
Figure 1M:
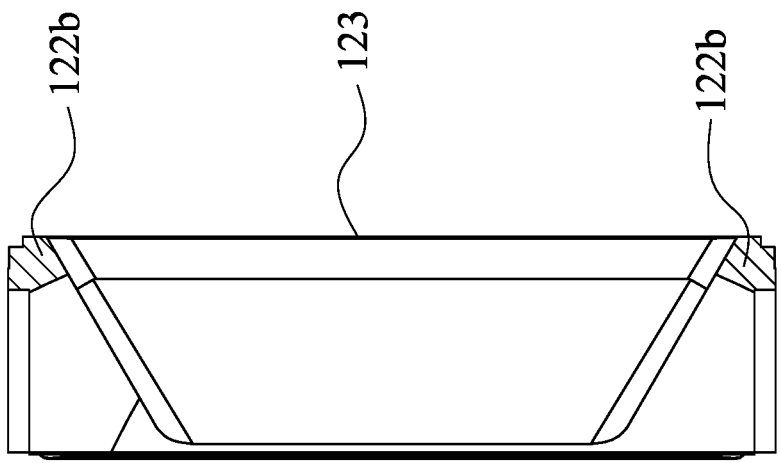
FIG. 1M is a cross-sectional side view of the light blocking element along line 1M-1M in FIG. 1L.
Figure 10:
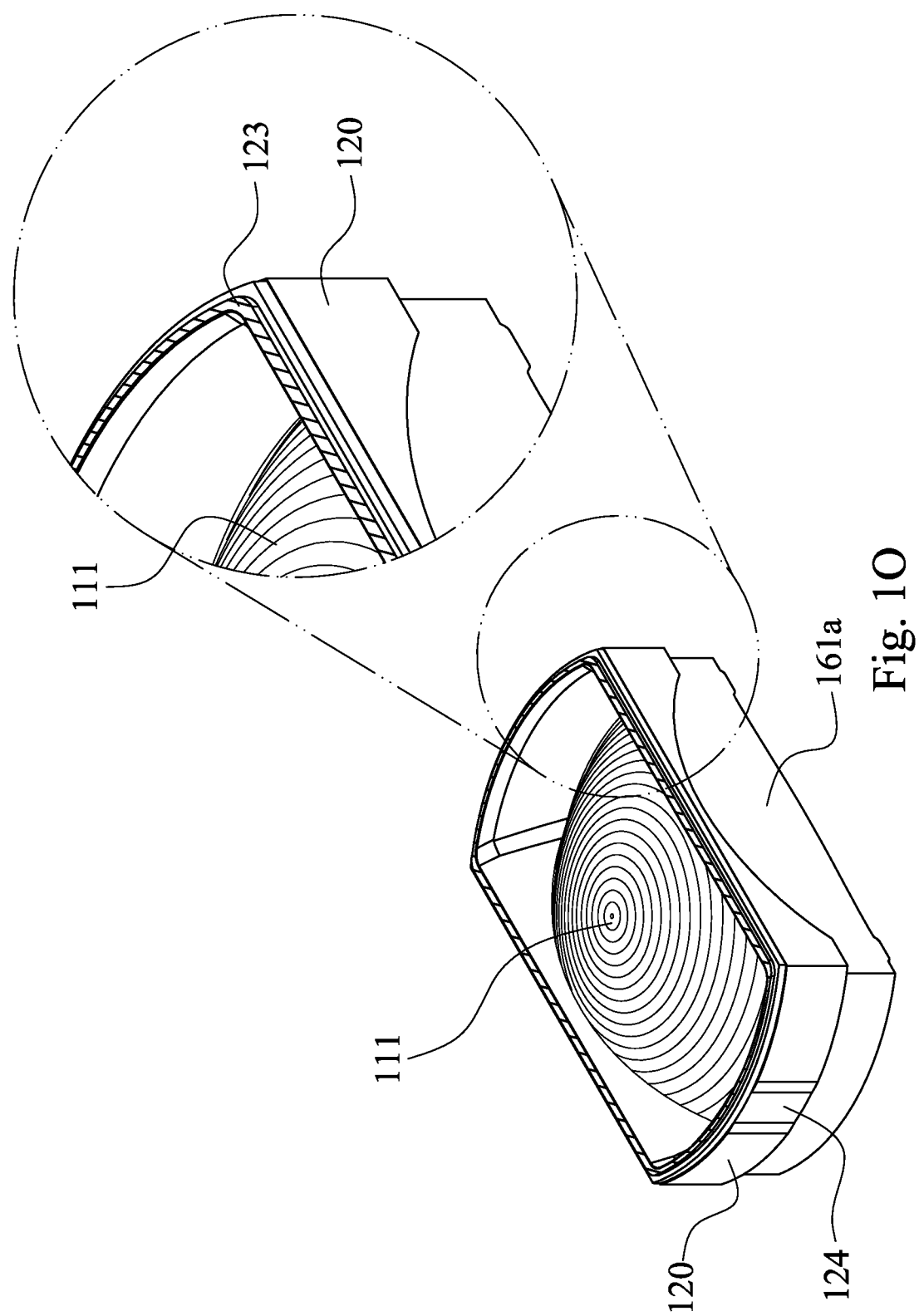
Figure 1Q:
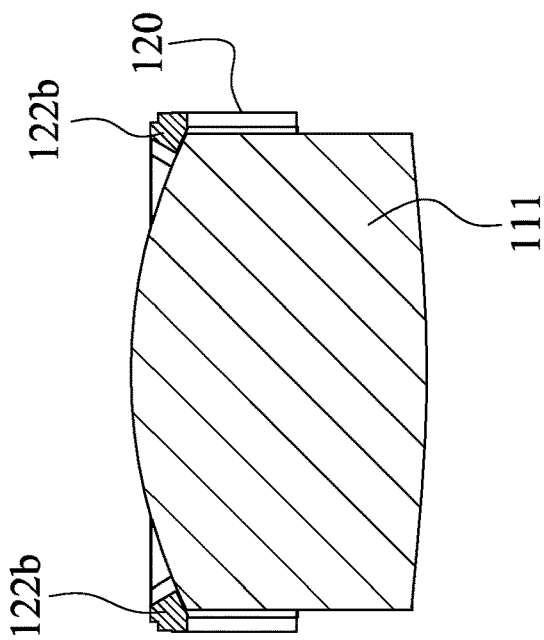
FIG. 1Q is a cross-sectional schematic view of the radial reduction lens element and the light blocking element according to the 1st example in FIG. 1O.
Figure 1P:
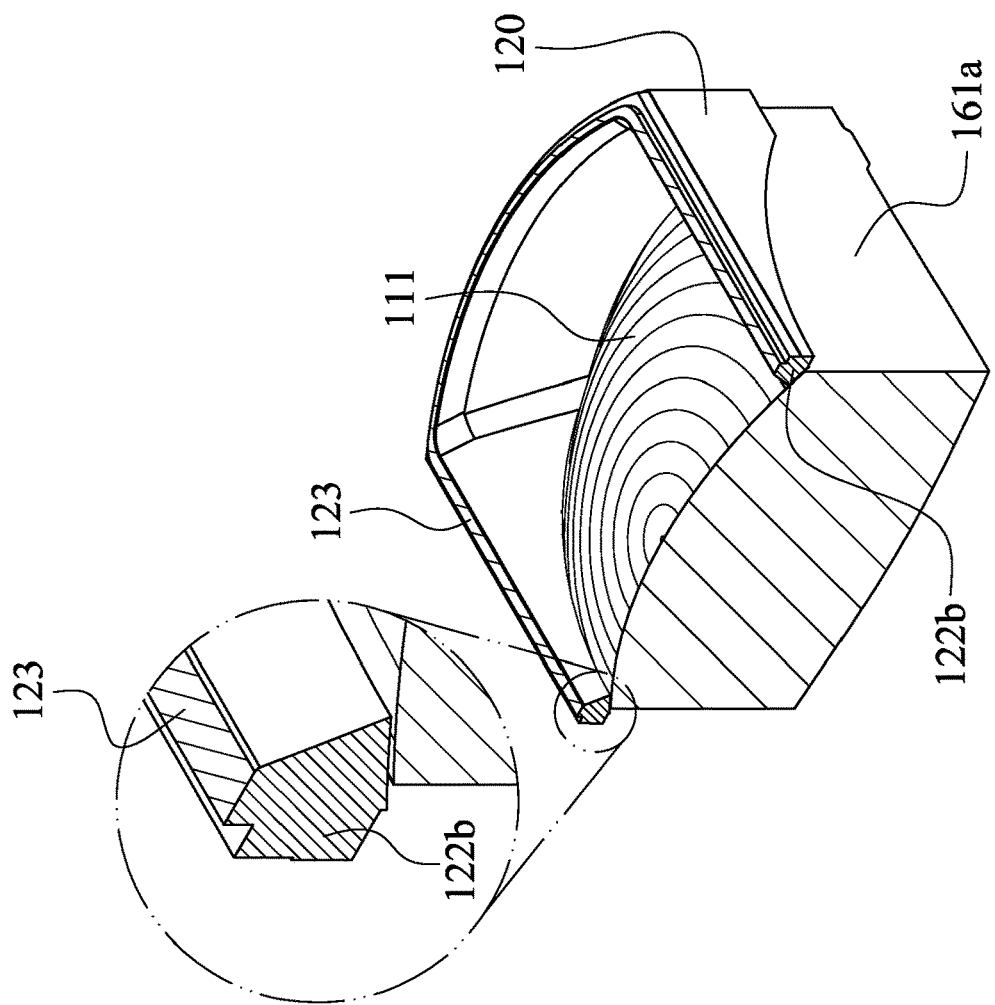
FIG. 1P is a cross-section view of the radial reduction lens element and the light blocking element according to the 1st example in FIG. 1O.
Figures 1R, 1S:
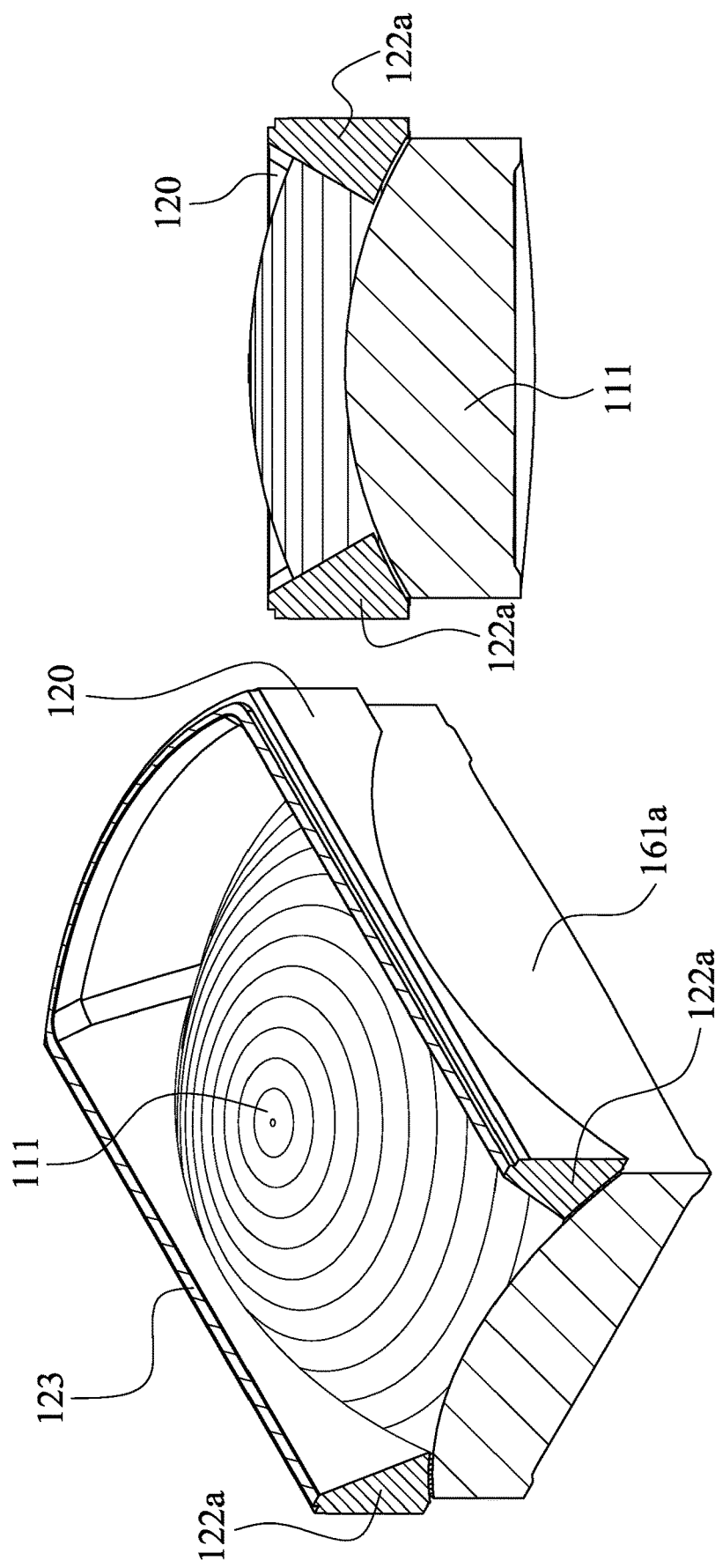
FIG. 1R is another cross-section view of the radial reduction lens element and the light blocking element according to the 1st example in FIG. 1O.
FIG. 1S is another cross-sectional schematic view of the radial reduction lens element and the light blocking element according to the 1st example in FIG. 1O.

FIG. 1L is an image-side schematic view of the light blocking element 120 according to the 1st example in FIG. 1A. FIG. 1M is a cross-sectional side view of the light blocking element 120 along line 1M-1M in FIG. 1L. FIG. 1N is a cross-sectional side view of the light blocking element 120 along line 1N-1N in FIG. 1L. FIG. 1O is an assembling three dimensional view of the radial reduction lens element 111 with the light blocking element 120 according to the 1st example in FIG. 1A. FIG. 1P is a cross-section view of the radial reduction lens element 111 and the light blocking element 120 according to the 1st example in FIG. 1O. FIG. 1Q is a cross-sectional schematic view of the radial reduction lens element 111 and the light blocking element 120 according to the 1st example in FIG. 1O. FIG. 1R is another cross-section view of the radial reduction lens element 111 and the light blocking element 120 according to the 1st example in FIG. 1O. FIG. 1S is another cross-sectional schematic view of the radial reduction lens element 111 and the light blocking element 120 according to the 1st example in FIG. 1O. In FIGS. 1C, 1I and 1L to 1S, the extending light blocking structure 122 and the reduction part 161a of the radial reduction lens element 111 are correspondingly disposed, and a location parallel to the optical axis X of an end part 122a of the extending light blocking structure 122 is different from a location parallel to the optical axis X of a middle part 122b of the extending light blocking structure 122. In particular, the end part 122a is connected to the receiving structure 121 and the extending light blocking structure 122, and the middle part 122b is located in the extending light blocking structure 122 and close to the optical axis X.

In FIGS. 1B, 1G to 1I, 1K, 1M to 1P and 1R, the light blocking element 120 further includes a coplanar structure 123 formed by connecting of the receiving structure 121 and the extending light blocking structure 122. In particular, the demolding resistance during the process of the injection molding can be reduced via the coplanar structure 123, so that the warpage of the product can be prevented during demolding, and the stability of the quality of the product can be enhanced. Furthermore, the connection of the receiving structure 121 and the extending light blocking structure 122 can be the closed loop by the coplanar structure 123 surrounding the central opening 120a, but the present disclosure is not limited thereto.

Furthermore, a normal direction of the coplanar structure 123 is parallel to the optical axis X, and the coplanar structure 123 and the radial reduction lens element 111 are relatively disposed. When the coplanar structure 123 is located on the most object-side end or the most image-side end of the imaging lens assembly 100, the smooth appearance of the imaging lens assembly 100 can be obtained. According to the 1st example, the coplanar structure 123 is located on the most object-side end of the imaging lens assembly 100.

The central opening 120a of the light blocking element 120 gradually expands along the optical axis X and towards the coplanar structure 123. The difficulty of the release (that is, demolding) of the product can be reduced by the design of draft bevel so as to enhance the yield rate.

In FIGS. 1K and 1O to 1S, an air gap is located between the extending light blocking structure 122 and the radial reduction lens element 111. Therefore, the interference between the light blocking element 120 and the radial reduction lens element 111 can be prevented so as to ensure the assembling quality In FIGS. 1B, 1C, 1H and 1O, the light blocking element 120 is a black plastic product, and the light blocking element 120 includes at least one gate trace 124. According to the 1st example, a number of the gate trace 124 is two, but the present disclosure is not limited thereto. Therefore, the light blocking element 120 can be corresponding to the structure of the injection molding product which is more complicated, so that the design margin of the mold can be enhanced.

In FIGS. 1D, 1G, 1I and 1J, when a maximum distance parallel to the optical axis X between the end part 122a and the middle part 122b is D1, a maximum distance parallel to the optical axis X between the effective optical portion 161 located on the reduction part 161a of the radial reduction lens element 111 and the receiving surface 162a of the peripheral portion 162 is D2, a maximum thickness of the radial reduction lens element 111 close to the optical axis X is DT, a cross-sectional area of the middle part 122b is A0, and a cross-sectional area of the end part 122a is A1, a distance of a long side defined via the central opening 120a is DL, and a distance of a short side defined via the central opening 120a is DS, the following conditions of the Table 1 are satisfied.

TABLE 1

| 1st example | | | |
|---|---|---|---|
| D1 (mm) | 0.77 | A0 (mm$^2$) | 0.053 |
| D2 (mm) | 0.80 | A1 (mm$^2$) | 0.395 |
| DT (mm) | 2.07 | A0/A1 | 0.13 |
| D1/D2 | 0.96 | DS (mm) | 3.07 |
| D1/DT | 0.37 | DL (mm) | 5.46 |
| D2/DT | 0.39 | DS/DL | 0.56 |

2nd Example

Figure 2A:
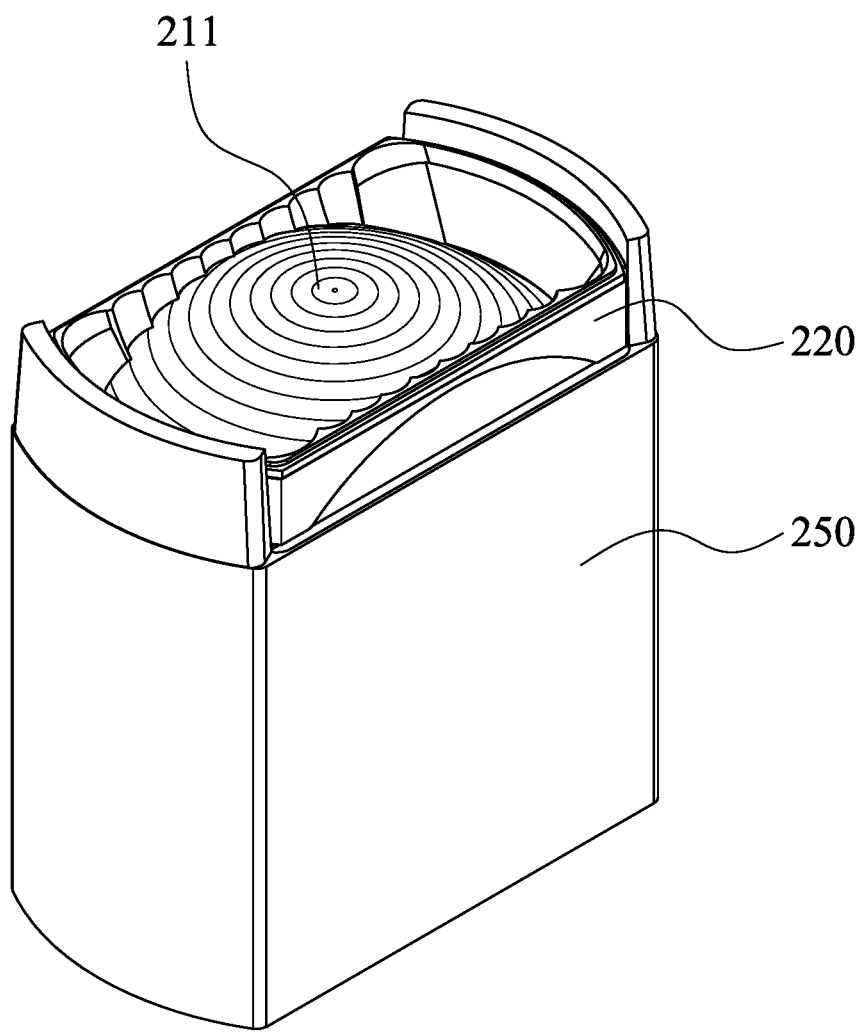
FIG. 2A is a three dimensional view of an imaging lens assembly according to the 2nd example of the present disclosure.
Figure 2B:
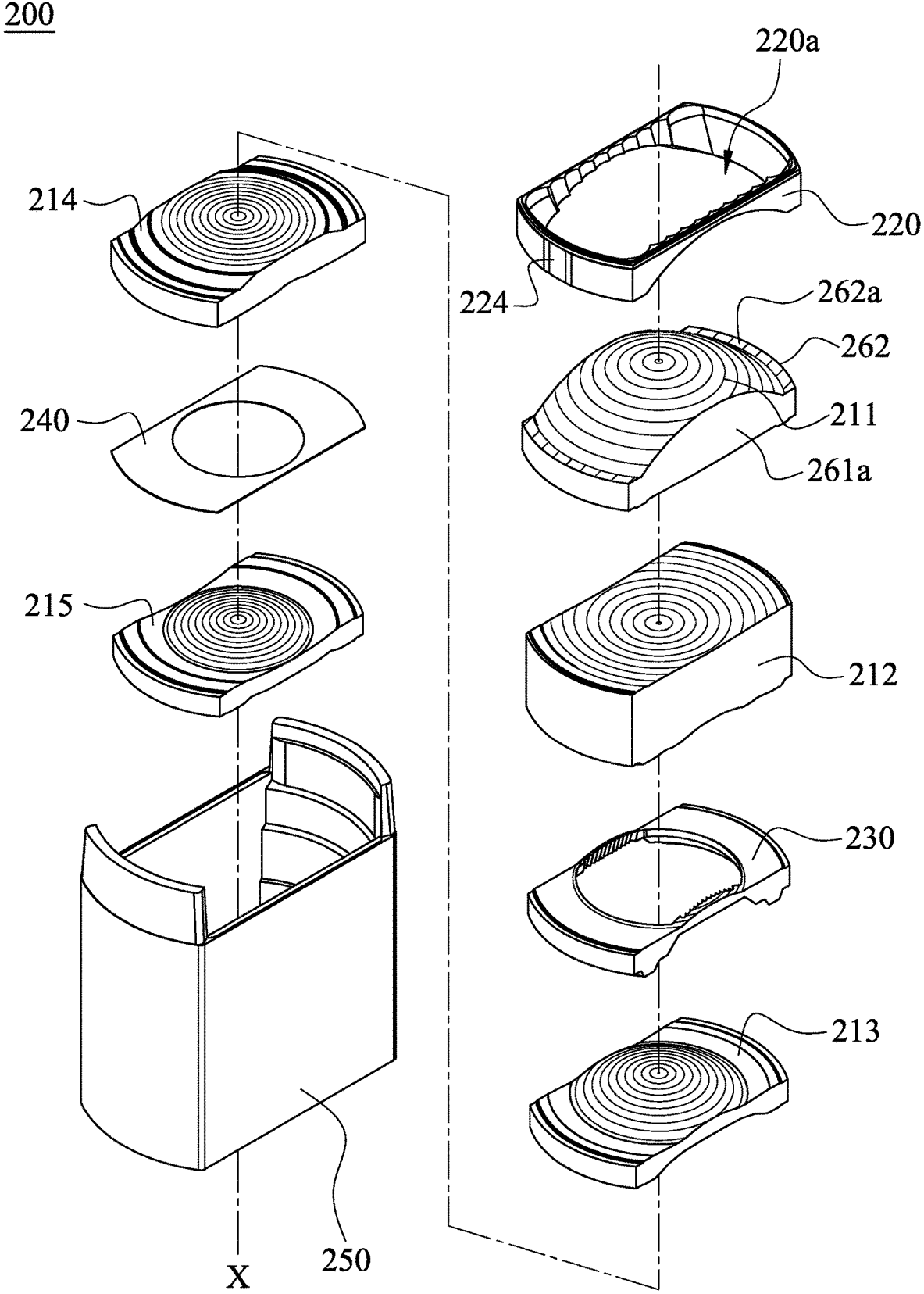
FIG. 2B is an exploded view of the imaging lens assembly according to the 2nd example in FIG. 2A.
Figure 2C:
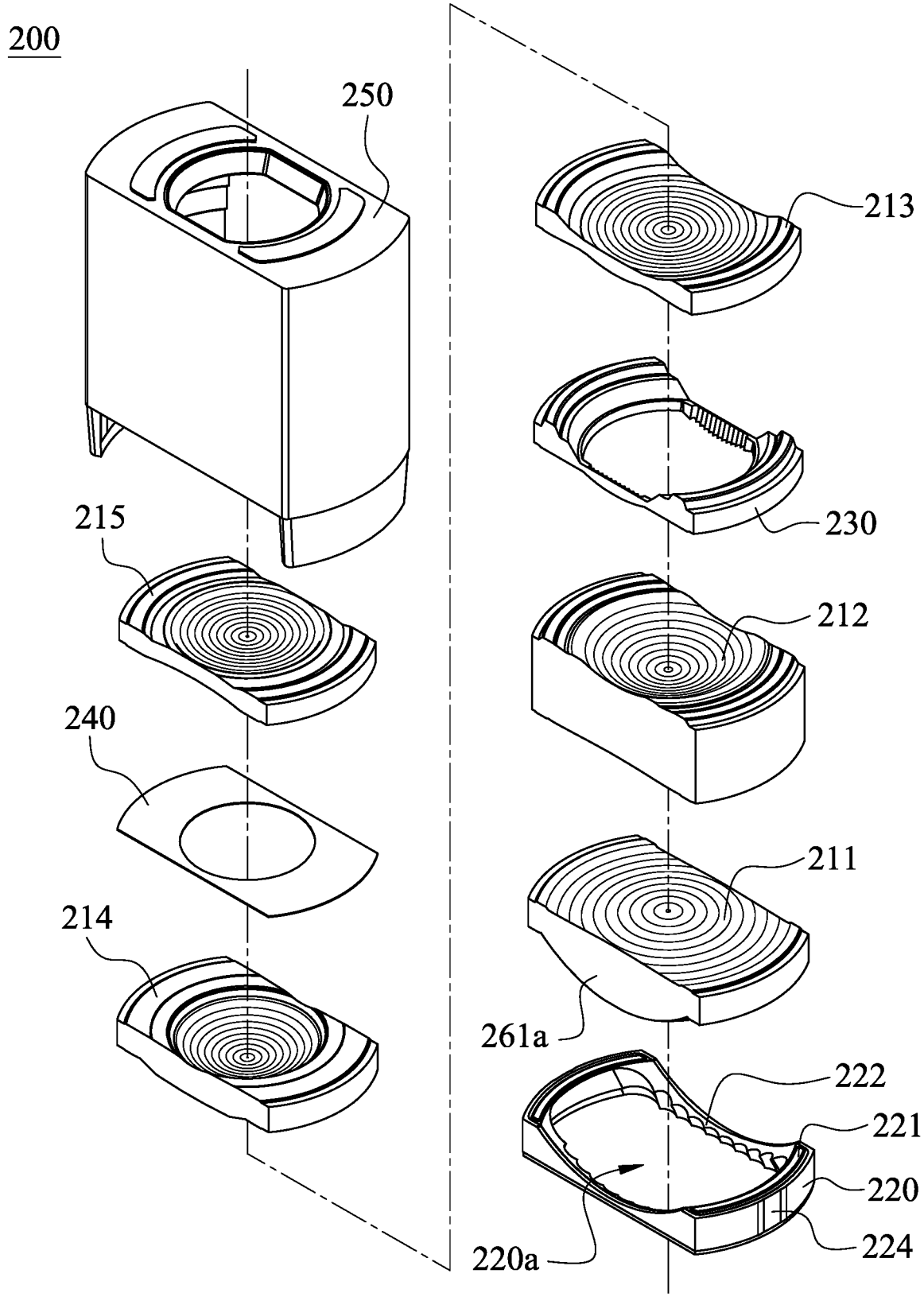
FIG. 2C is another exploded view of the imaging lens assembly according to the 2nd example in FIG. 2A.
Figure 2D:
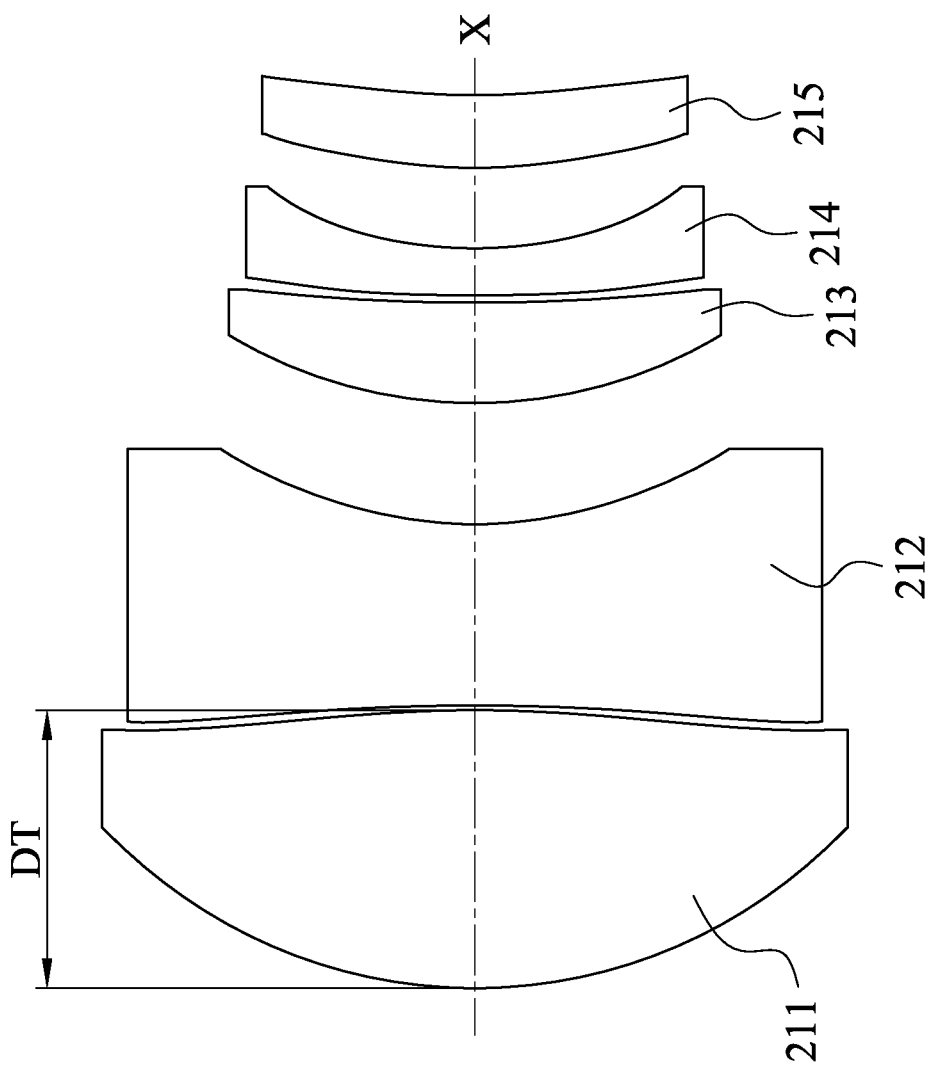
FIG. 2D is a partial schematic view of the imaging lens assembly according to the 2nd example in FIG. 2A.

FIG. 2A is a three dimensional view of an imaging lens assembly 200 according to the 2nd example of the present disclosure. FIG. 2B is an exploded view of the imaging lens assembly 200 according to the 2nd example in FIG. 2A. FIG. 2C is another exploded view of the imaging lens assembly 200 according to the 2nd example in FIG. 2A. FIG. 2D is a partial schematic view of the imaging lens assembly 200 according to the 2nd example in FIG. 2A. In FIGS. 2A to 2D, the imaging lens assembly 200 has an optical axis X, and the imaging lens assembly 200, in order from an object side to an image side, includes a light blocking element 220, radial reduction lens elements 211, 212, a light blocking element 230, radial reduction lens elements 213, 214, a light blocking sheet 240, a radial reduction lens element 215 and a lens barrel 250, wherein the radial reduction lens elements 211, 212, 213, 214, 215, the light blocking elements 220, 230 and the light blocking sheet 240 are disposed in the lens barrel 250. In particular, the optical features such as numbers, structures, surface shapes and so on of the radial reduction lens elements can be disposed according to different imaging demand, and the optical features are not limited thereto.

FIG. 2E is a side view of the radial reduction lens element 211 according to the 2nd example in FIG. 2A. FIG. 2F is an image-side schematic view of the radial reduction lens element 211 according to the 2nd example in FIG. 2A. In FIGS. 2B, 2C, 2E and 2F, the radial reduction lens element 211 includes an effective optical portion 261 and a peripheral portion 262. The optical axis X passes through the effective optical portion 261, the effective optical portion 261 includes a reduction part 261a, and the reduction part 261a shrinks from a portion of the effective optical portion 261 towards the optical axis X so that the effective optical portion 261 is non-circular. The peripheral portion 262 extends from the effective optical portion 261 towards a direction away from the optical axis X, and the peripheral portion 262 and the reduction part 261a are disposed at interval along a circumferential direction surrounding the optical axis X. The entire volume of the imaging lens assembly 200 can be reduced via the radial reduction lens element 211, so that the possibility of the compact size of the imaging lens assembly 200 is provided. In particular, the reduction part 261a can be formed by the mold design of the injection molding or the cutting of the product after molding, but the present disclosure is not limited thereto.

FIG. 2G is an object-side schematic view of the light blocking element 220 according to the 2nd example in FIG. 2A. FIG. 2H is a side view of the light blocking element 220 according to the 2nd example in FIG. 2A. FIG. 2I is another side view of the light blocking element 220 according to the 2nd example in FIG. 2A. In FIGS. 2B, 2C, 2G, 2H and 2I, the light blocking element 220 has a central opening 220a, the optical axis X passes through the central opening 220a, and the light blocking element 220 includes a receiving structure 221 and an extending light blocking structure 222, wherein the receiving structure 221 extends along the optical axis X and towards the image side of the imaging lens assembly 200, the extending light blocking structure 222 and the receiving structure 221 are disposed at interval along the circumferential direction surrounding the optical axis X, and the extending light blocking structure 222 is connected to the receiving structure 221 so that the central opening 220a is non-circular. Therefore, the non-imaging light can be prevented from entering the radial reduction lens element 211 so as to ensure the image quality.

FIG. 2J is another side view of the radial reduction lens element 211 according to the 2nd example in FIG. 2A. FIG. 2K is an assembling schematic view of the radial reduction lens element 211 with the light blocking element 220 according to the 2nd example in FIG. 2A. In FIGS. 2I to 2K, the receiving structure 221 is directly contacted with the peripheral portion 262 of the radial reduction lens element 211. Furthermore, the peripheral portion 262 of the radial reduction lens element 211 includes a receiving surface 262a directly contacted with the receiving structure 221 of the light blocking element 220. Therefore, the assembling process of the light blocking element 220 can be more stable so as to reduce the assembling tolerance.

Figure 2L:
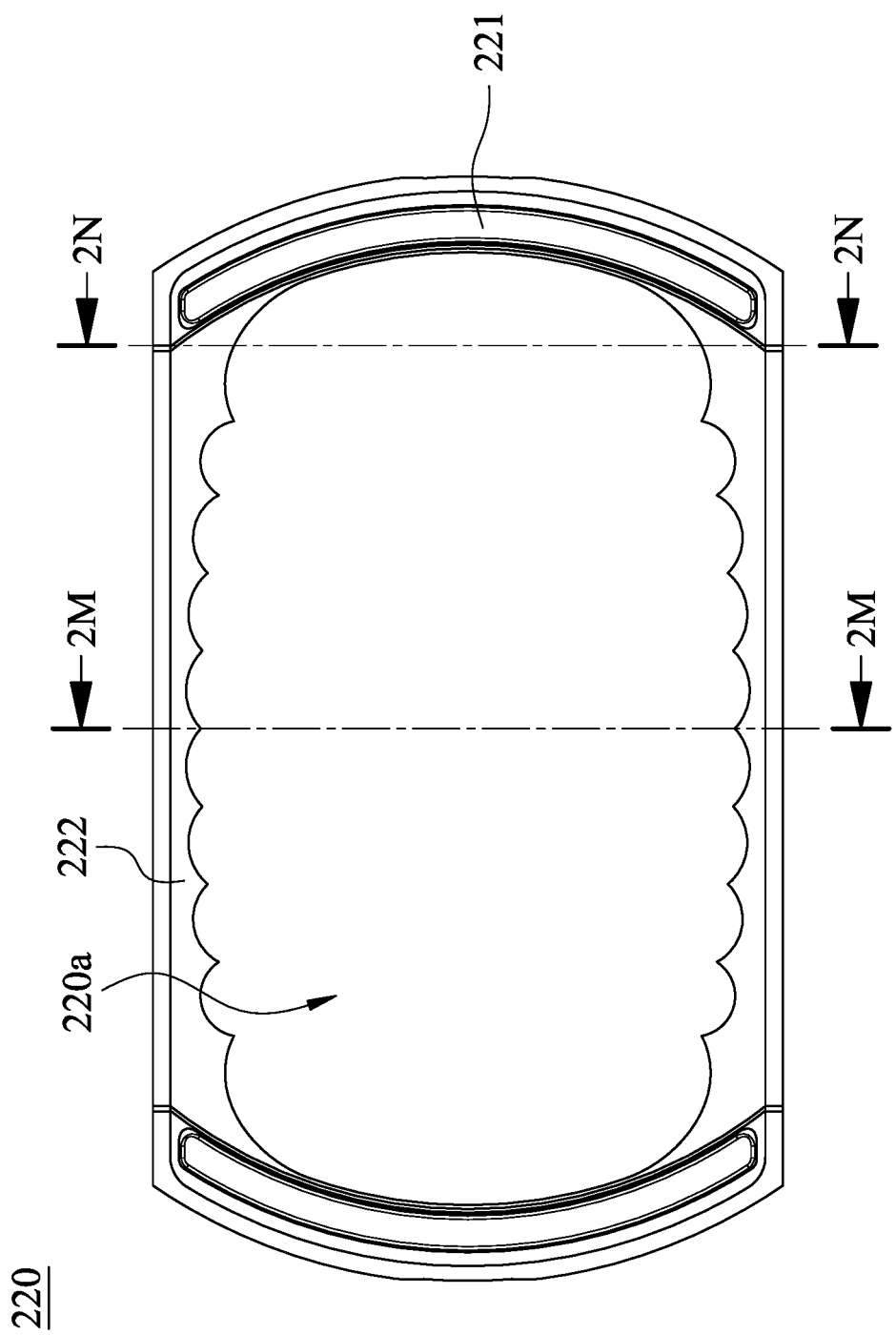
FIG. 2L is an image-side schematic view of the light blocking element according to the 2nd example in FIG. 2A.
Figure 2O:
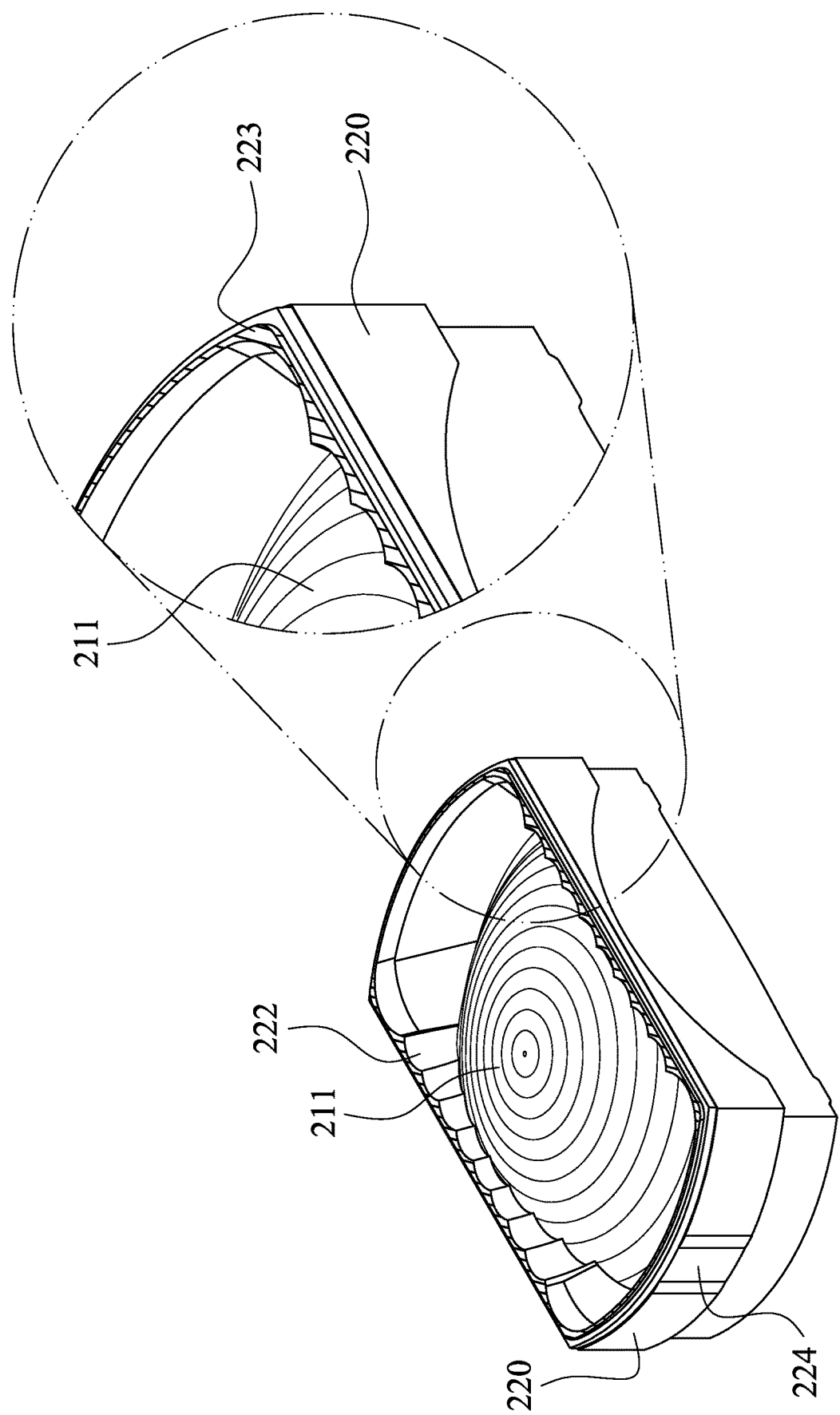
FIG. 2O is an assembling three dimensional view of the radial reduction lens element with the light blocking element according to the 2nd example in FIG. 2A.
Figure 2Q:
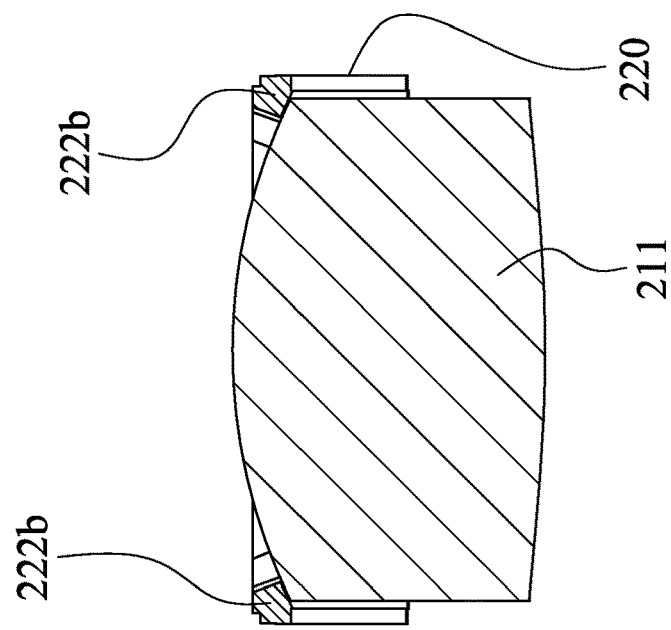
FIG. 2Q is a cross-sectional schematic view of the radial reduction lens element and the light blocking element according to the 2nd example in FIG. 2O.
Figure 2P:
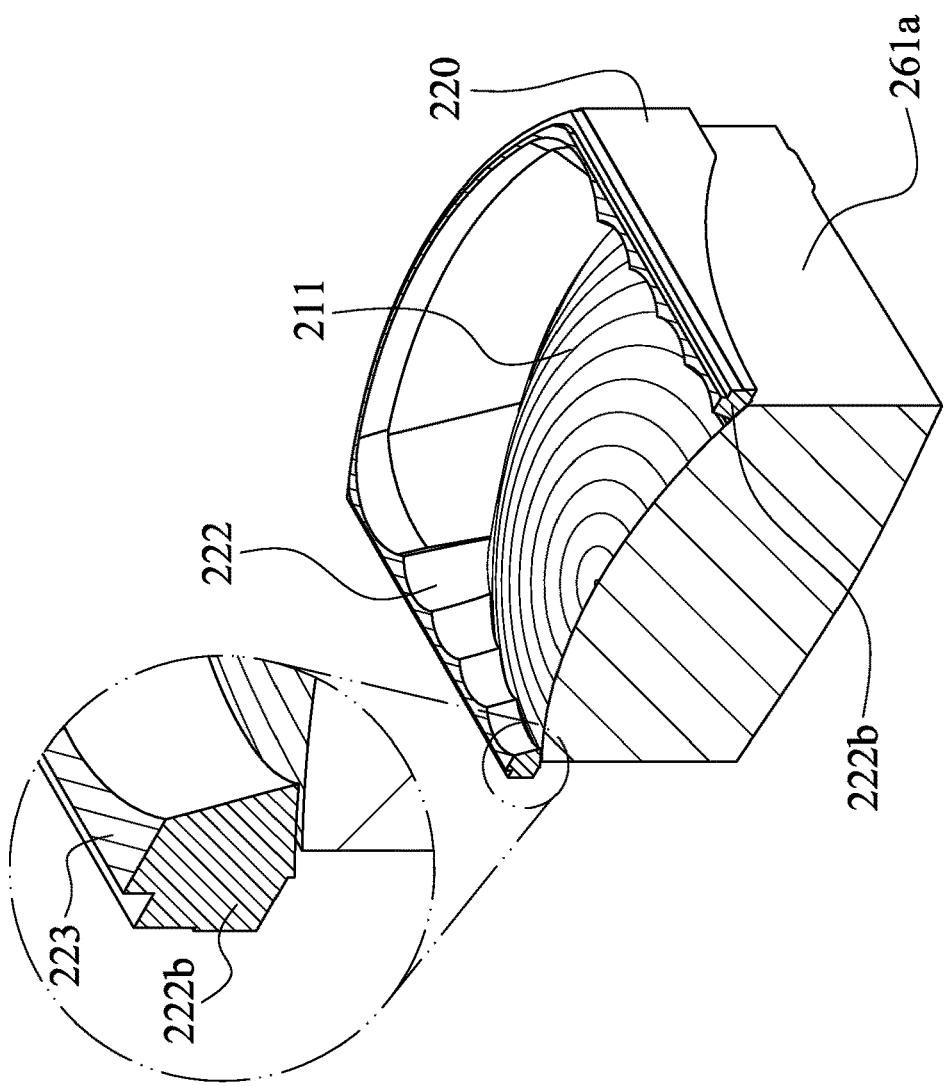
FIG. 2P is a cross-sectional view of the radial reduction lens element and the light blocking element according to the 2nd example in FIG. 2O.
Figures 2R, 2S:
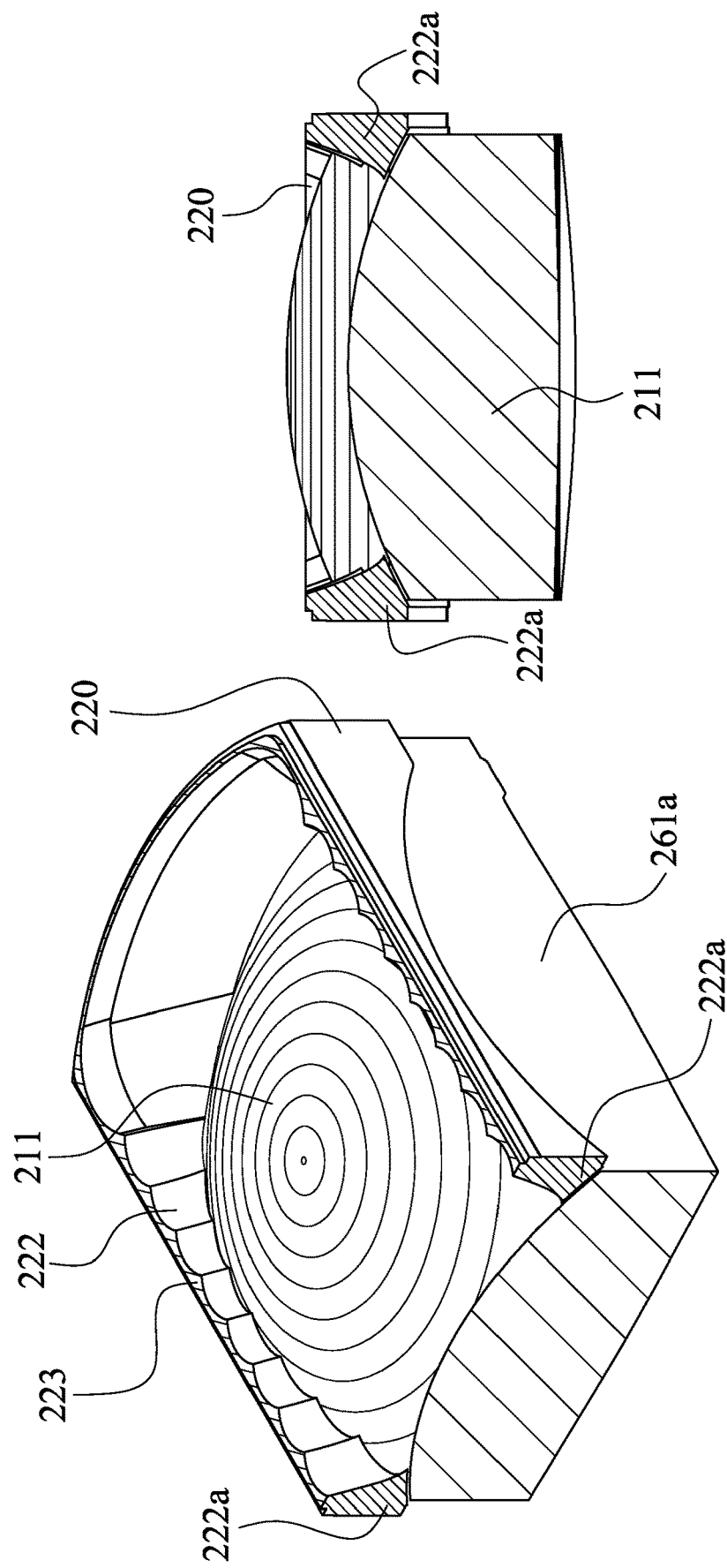
FIG. 2R is another cross-sectional view of the radial reduction lens element and the light blocking element according to the 2nd example in FIG. 2O.
FIG. 2S is another cross-sectional schematic view of the radial reduction lens element and the light blocking element according to the 2nd example in FIG. 2O.

FIG. 2L is an image-side schematic view of the light blocking element 220 according to the 2nd example in FIG. 2A. FIG. 2M is a cross-sectional side view of the light blocking element 220 along a 2M-2M line in FIG. 2L. FIG. 2N is a cross-sectional side view of the light blocking element 220 along a 2N-2N line in FIG. 2L. FIG. 2O is an assembling three dimensional view of the radial reduction lens element 211 with the light blocking element 220 according to the 2nd example in FIG. 2A. FIG. 2P is a cross-sectional view of the radial reduction lens element 211 and the light blocking element 220 according to the 2nd example in FIG. 2O. FIG. 2Q is a cross-sectional schematic view of the radial reduction lens element 211 and the light blocking element 220 according to the 2nd example in FIG. 2O. FIG. 2R is another cross-sectional view of the radial reduction lens element 211 and the light blocking element 220 according to the 2nd example in FIG. 2O. FIG. 2S is another cross-sectional schematic view of the radial reduction lens element 211 and the light blocking element 220 according to the 2nd example in FIG. 2O. In FIGS. 2C, 2I and 2L to 2S, the extending light blocking structure 222 and the reduction part 261a of the radial reduction lens element 211 are correspondingly disposed, and a location parallel to the optical axis X of an end part 222a of the extending light blocking structure 222 is different from a location parallel to the optical axis X of a middle part 222b of the extending light blocking structure 222. In particular, the end part 222a is connected to the receiving structure 221 and the extending light blocking structure 222, and the middle part 222b is located in the extending light blocking structure 222 and close to the optical axis X.

In FIGS. 2B, 2G to 2I, 2K, 2M to 2P and 2R, the light blocking element 220 further includes a coplanar structure 223 formed by connecting of the receiving structure 221 and the extending light blocking structure 222. In particular, the demolding resistance during the process of the injection molding can be reduced via the coplanar structure 223, so that the warpage of the product can be prevented during demolding, and the stability of the quality of the product can be enhanced. Furthermore, the connection of the receiving structure 221 and the extending light blocking structure 222 can be the closed loop by the coplanar structure 223 surrounding the central opening 220a, but the present disclosure is not limited thereto.

Furthermore, a normal direction of the coplanar structure 223 is parallel to the optical axis X, and the coplanar structure 223 and the radial reduction lens element 211 are relatively disposed. When the coplanar structure 223 is located on the most object-side end or the most image-side end of the imaging lens assembly 200, the smooth appearance of the imaging lens assembly 200 can be obtained. According to the 2nd example, the coplanar structure 223 is located on the most object-side end of the imaging lens assembly 200.

The central opening 220a of the light blocking element 220 gradually expands along the optical axis X and towards the coplanar structure 223. The difficulty of the release (that is, demolding) of the product can be reduced by the design of draft bevel so as to enhance the yield rate.

In FIGS. 2K and 2O to 2S, an air gap is located between the extending light blocking structure 222 and the radial reduction lens element 211. Therefore, the interference between the light blocking element 220 and the radial reduction lens element 211 can be prevented so as to ensure the assembling quality In FIGS. 2B, 2C, 2H and 2O, the light blocking element 220 is a black plastic product, and the light blocking element 220 includes at least one gate trace 224. According to the 2nd example, a number of the gate trace 224 is two, but the present disclosure is not limited thereto. Therefore, the light blocking element 220 can be corresponding to the structure of the injection molding product which is more complicated, so that the design margin of the mold can be enhanced.

In FIGS. 2D, 2G, 2I and 2J, when a maximum distance parallel to the optical axis X between the end part 222a and the middle part 222b is D1, a maximum distance parallel to the optical axis X between the effective optical portion 261 located on the reduction part 261a of the radial reduction lens element 211 and the receiving surface 262a of the peripheral portion 262 is D2, a maximum thickness of the radial reduction lens element 211 close to the optical axis X is DT, a cross-sectional area of the middle part 222b is A0, and a cross-sectional area of the end part 222a is A1, a distance of a long side defined via the central opening 220a is DL, and a distance of a short side defined via the central opening 220a is DS, the following conditions of the Table 2 are satisfied.

TABLE 2

| 2nd example | | | |
|---|---|---|---|
| D1 (mm) | 0.77 | A0 (mm²) | 0.054 |
| D2 (mm) | 0.80 | A1 (mm²) | 0.275 |
| DT (mm) | 2.07 | A0/A1 | 0.20 |
| D1/D2 | 0.96 | DS (mm) | 3.08 |
| D1/DT | 0.37 | DL (mm) | 5.50 |
| D2/DT | 0.39 | DS/DL | 0.56 |

3rd Example

Figure 3A:
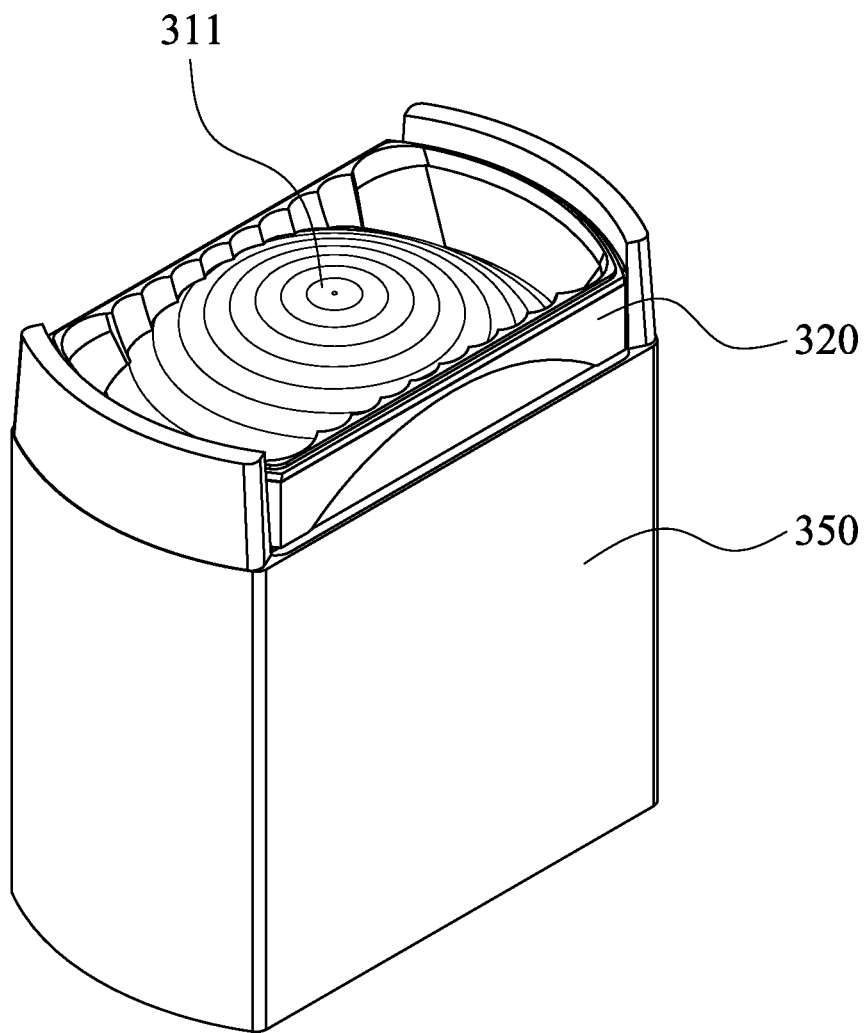
FIG. 3A is a three dimensional view of an imaging lens assembly according to the 3rd example of the present disclosure.
Figure 3B:
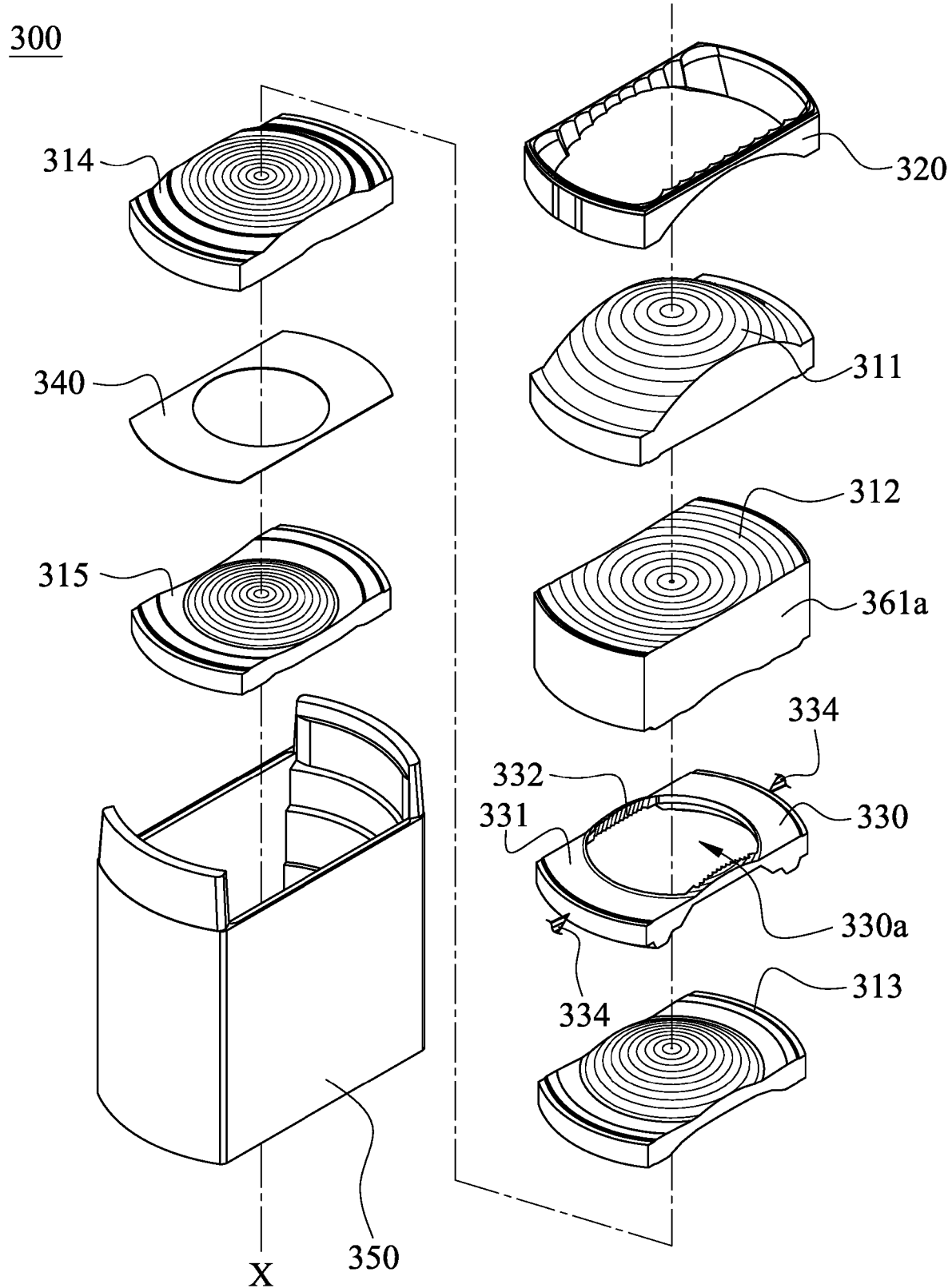
FIG. 3B is an exploded view of the imaging lens assembly according to the 3rd example in FIG. 3A.
Figure 3C:
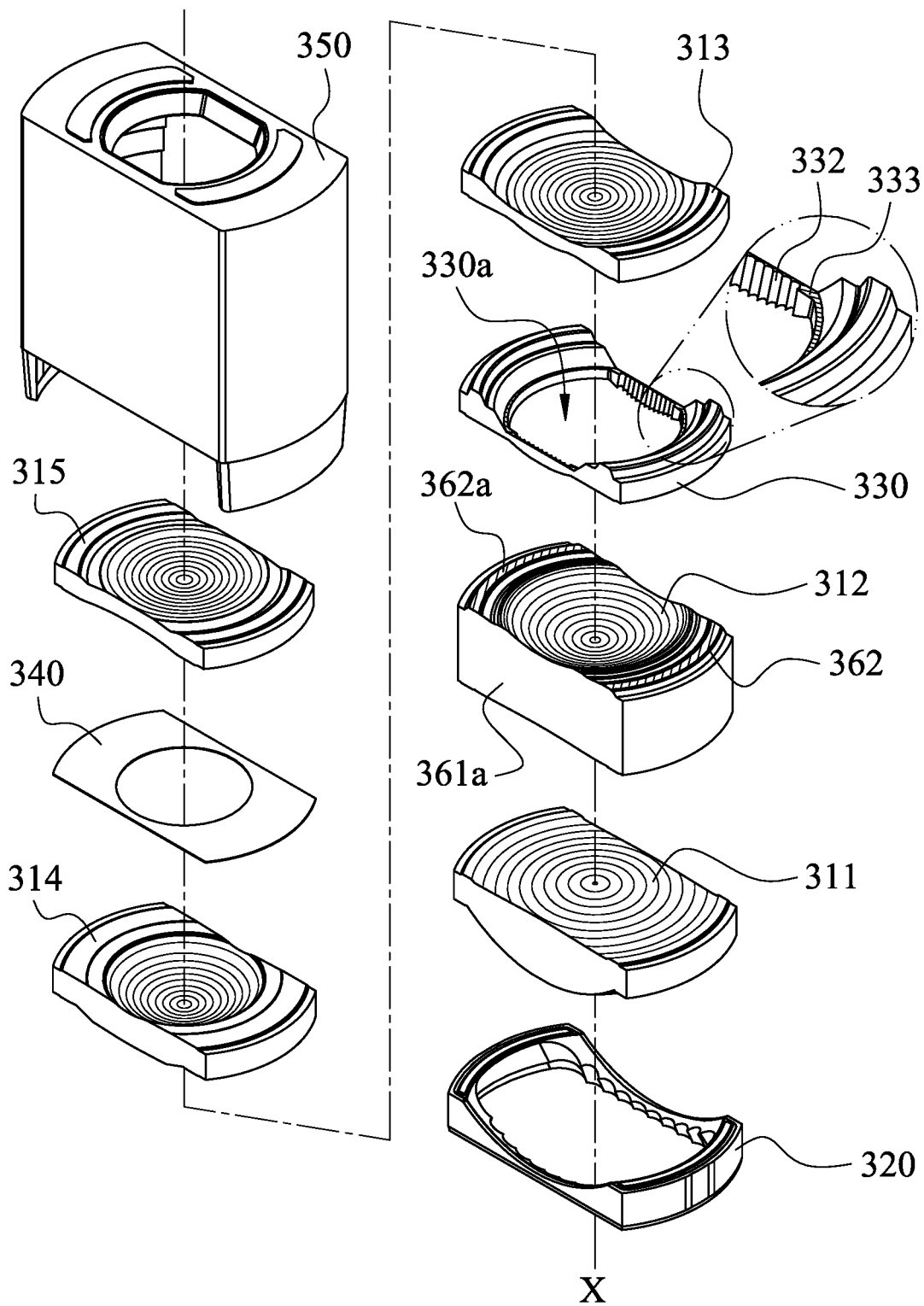
FIG. 3C is another exploded view of the imaging lens assembly according to the 3rd example in FIG. 3A.
Figure 3D:
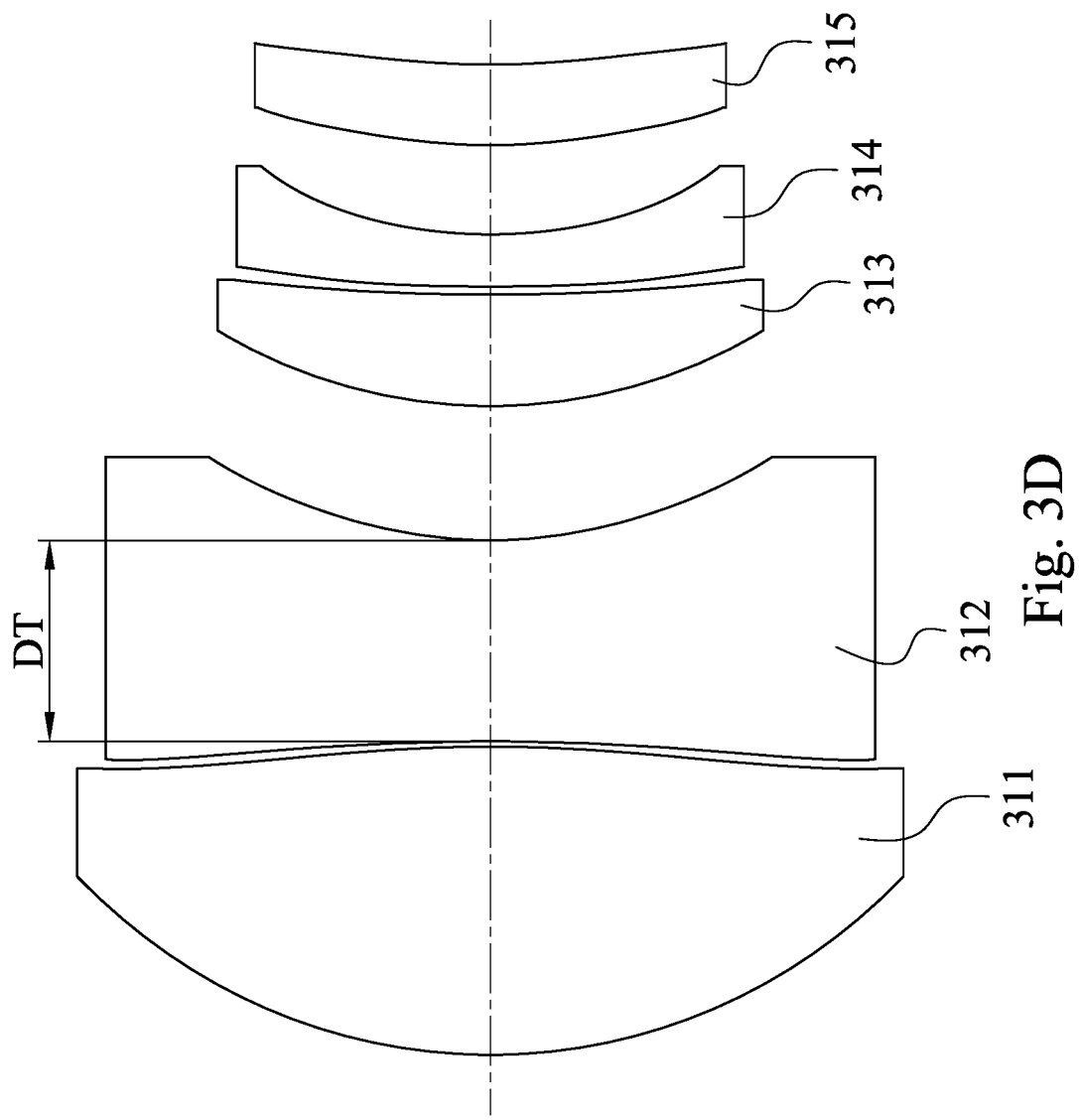
FIG. 3D is a partial schematic view of the imaging lens assembly according to the 3rd example in FIG. 3A.

FIG. 3A is a three dimensional view of an imaging lens assembly 300 according to the 3rd example of the present disclosure. FIG. 3B is an exploded view of the imaging lens assembly 300 according to the 3rd example in FIG. 3A. FIG. 3C is another exploded view of the imaging lens assembly 300 according to the 3rd example in FIG. 3A. FIG. 3D is a partial schematic view of the imaging lens assembly 300 according to the 3rd example in FIG. 3A. In FIGS. 3A to 3D, the imaging lens assembly 300 has an optical axis X, and the imaging lens assembly 300, in order from an object side to an image side, includes a light blocking element 320, radial reduction lens elements 311, 312, a light blocking element 330, radial reduction lens elements 313, 314, a light blocking sheet 340, a radial reduction lens element 315 and a lens barrel 350, wherein the radial reduction lens elements 311, 312, 313, 314, 315, the light blocking elements 320, 330 and the light blocking sheet 340 are disposed in the lens barrel 350. In particular, the optical features such as numbers, structures, surface shapes and so on of the radial reduction lens elements can be disposed according to different imaging demand, and the optical features are not limited thereto.

Figure 3F:
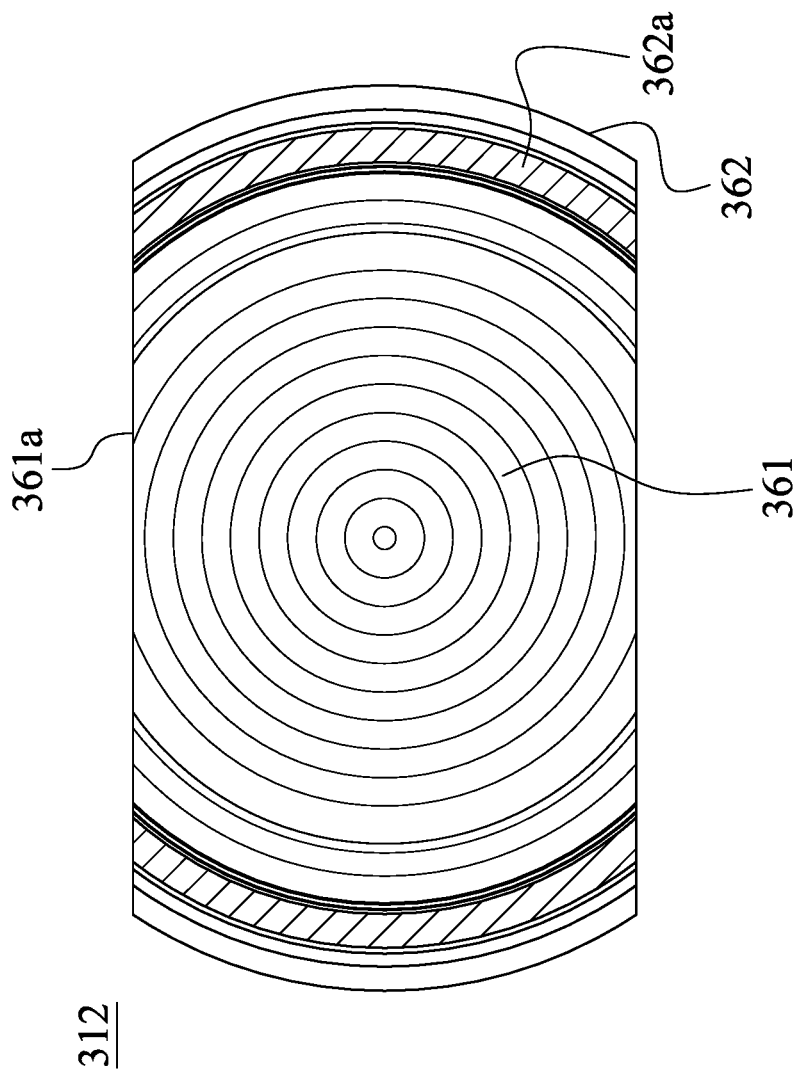
FIG. 3F is an image-side schematic view of the radial reduction lens element according to the 3rd example in FIG. 3A.
Figure 3E:
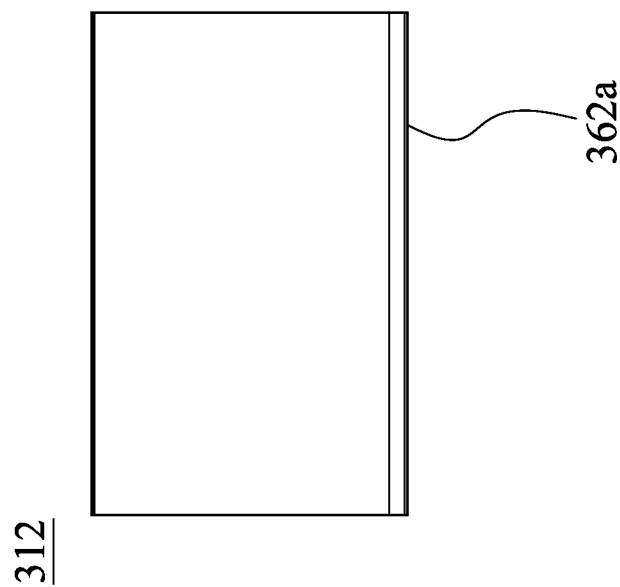
FIG. 3E is a side view of the radial reduction lens element according to the 3rd example in FIG. 3A.

FIG. 3E is a side view of the radial reduction lens element 312 according to the 3rd example in FIG. 3A. FIG. 3F is an image-side schematic view of the radial reduction lens element 312 according to the 3rd example in FIG. 3A. In FIGS. 3B, 3C, 3E and 3F, the radial reduction lens element 312 includes an effective optical portion 361 and a peripheral portion 362. The optical axis X passes through the effective optical portion 361, the effective optical portion 361 includes a reduction part 361a, and the reduction part 361a shrinks from a portion of the effective optical portion 361 towards the optical axis X so that the effective optical portion 361 is non-circular. The peripheral portion 362 extends from the effective optical portion 361 towards a direction away from the optical axis X, and the peripheral portion 362 and the reduction part 361a are disposed at interval along a circumferential direction surrounding the optical axis X. The entire volume of the imaging lens assembly 300 can be reduced via the radial reduction lens element 312, so that the possibility of the compact size of the imaging lens assembly 300 is provided. In particular, the reduction part 361a can be formed by the mold design of the injection molding or the cutting of the product after molding, but the present disclosure is not limited thereto.

FIG. 3G is an object-side schematic view of the light blocking element 330 according to the 3rd example in FIG. 3A. FIG. 3H is a side view of the light blocking element 330 according to the 3rd example in FIG. 3A. FIG. 3I is another side view of the light blocking element 330 according to the 3rd example in FIG. 3A. In FIGS. 3B, 3C, 3G, 3H and 3I, the light blocking element 330 has a central opening 330a, the optical axis X passes through the central opening 330a, and the light blocking element 330 includes a receiving structure 331 and an extending light blocking structure 332, wherein the receiving structure 331 extends along the optical axis X and towards the object side of the imaging lens assembly 300, the extending light blocking structure 332 and the receiving structure 331 are disposed at interval along the circumferential direction surrounding the optical axis X, and the extending light blocking structure 332 is connected to the receiving structure 331 so that the central opening 330a is non-circular. Therefore, the non-imaging light can be prevented from entering the radial reduction lens element 312 so as to ensure the image quality.

FIG. 3J is another side view of the radial reduction lens element 312 according to the 3rd example in FIG. 3A. FIG. 3K is an assembling schematic view of the radial reduction lens element 312 with the light blocking element 330 according to the 3rd example in FIG. 3A. In FIGS. 3I to 3K, the receiving structure 331 is directly contacted with the peripheral portion 362 of the radial reduction lens element 312. Furthermore, the peripheral portion 362 of the radial reduction lens element 312 includes a receiving surface 362a directly contacted with the receiving structure 331 of the light blocking element 330. Therefore, the assembling process of the light blocking element 330 can be more stable so as to reduce the assembling tolerance.

Figure 3L:
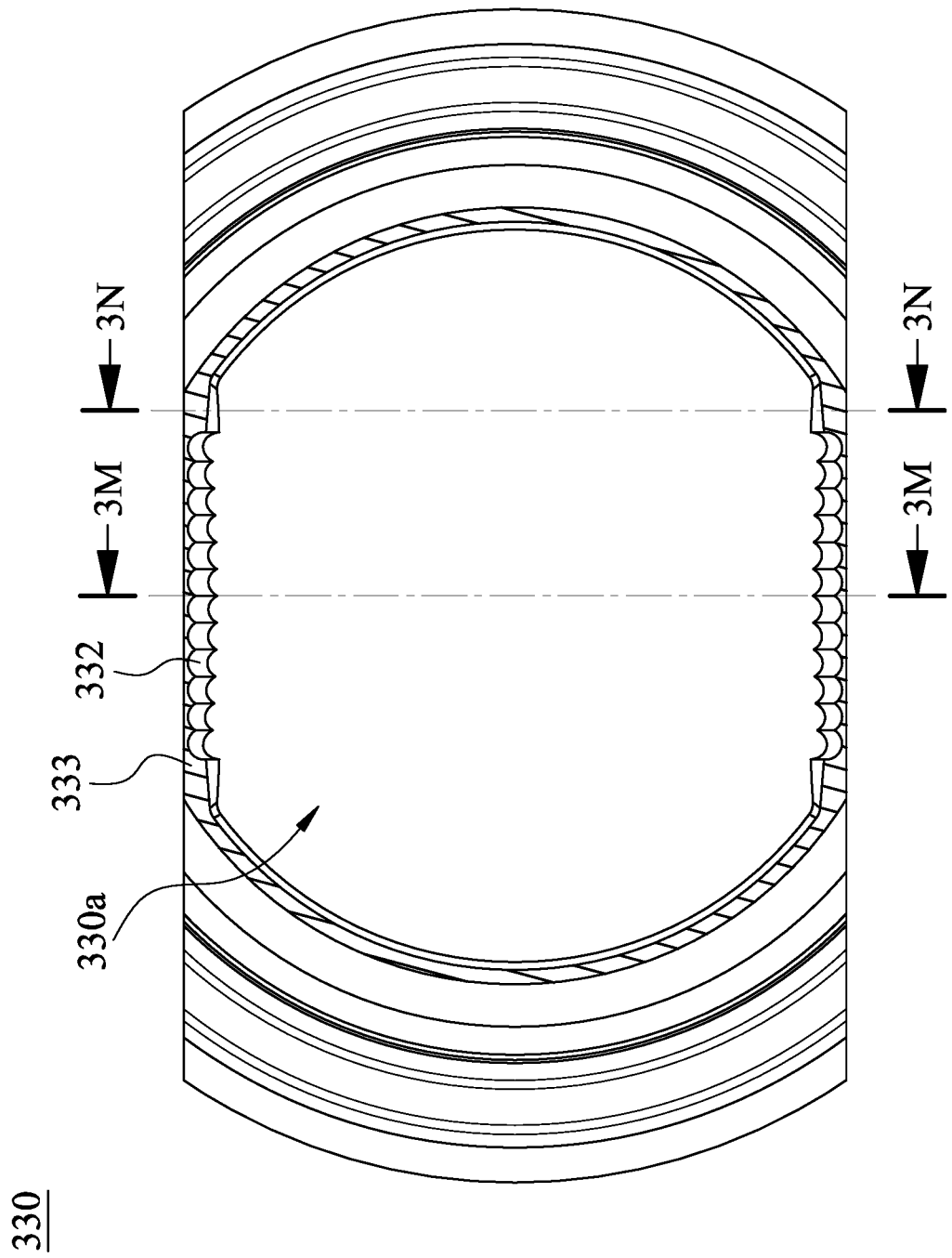
FIG. 3L is an image-side schematic view of the light blocking element according to the 3rd example in FIG. 3A.
Figure 3N:
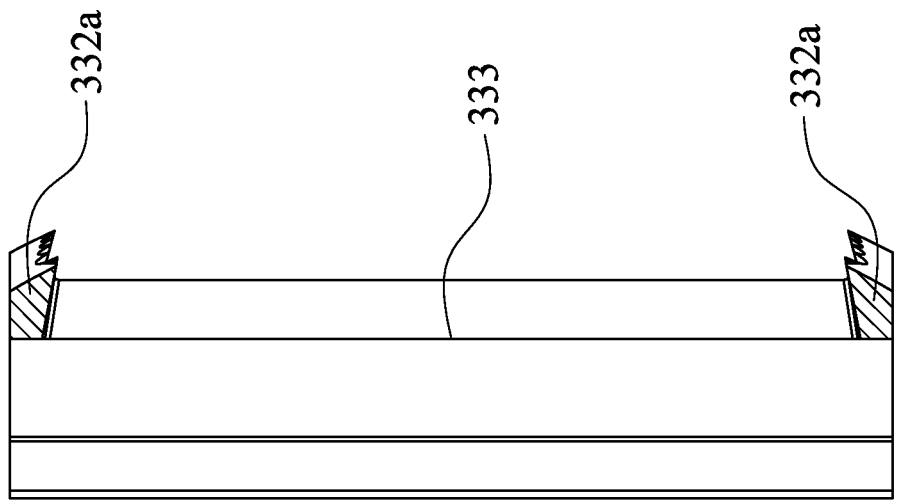
FIG. 3N is a cross-sectional side view of the light blocking element along a 3N-3N line in FIG. 3L.
Figure 3M:
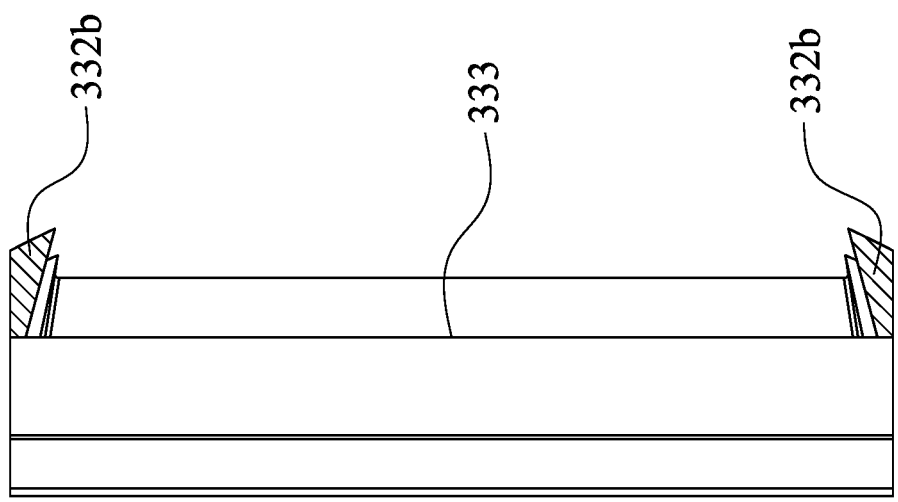
FIG. 3M is a cross-sectional side view of the light blocking element along a 3M-3M line in FIG. 3L.
Figure 30:
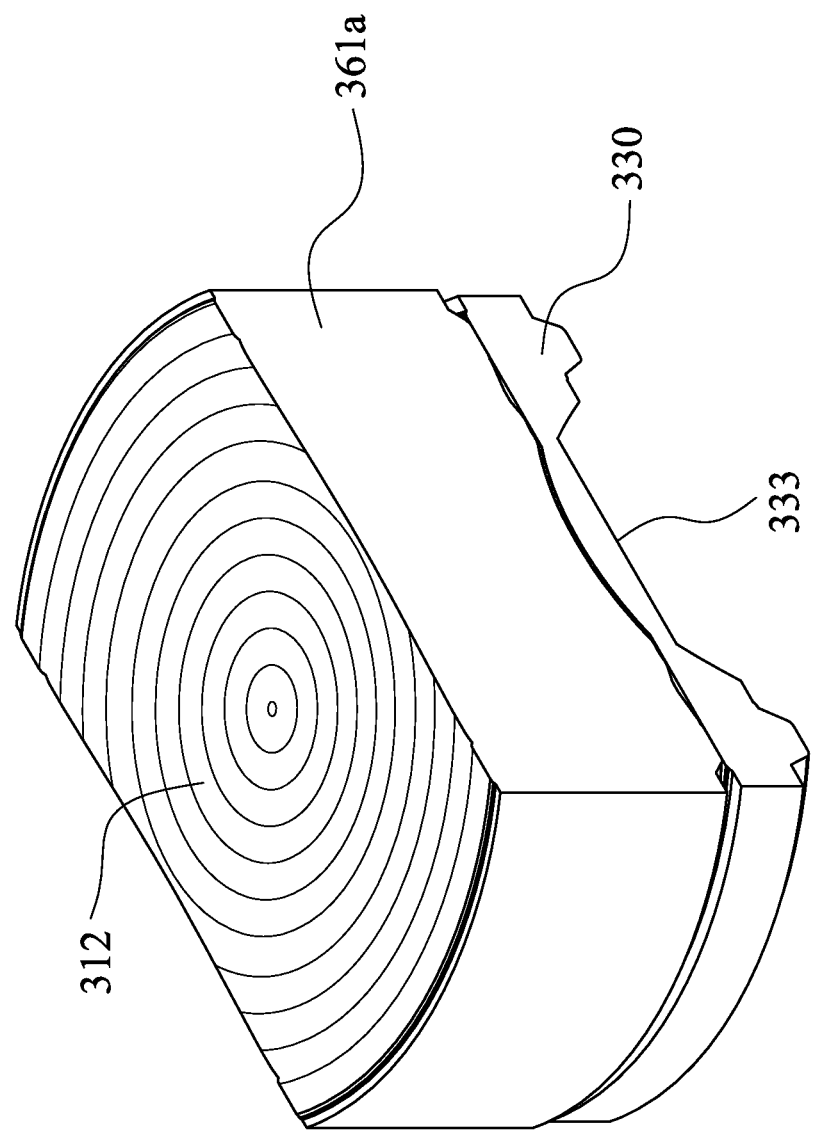

FIG. 3L is an image-side schematic view of the light blocking element 330 according to the 3rd example in FIG. 3A. FIG. 3M is a cross-sectional side view of the light blocking element 330 along a 3M-3M line in FIG. 3L. FIG. 3N is a cross-sectional side view of the light blocking element 330 along a 3N-3N line in FIG. 3L. FIG. 3O is an assembling three dimensional view of the radial reduction lens element 312 with the light blocking element 330 according to the 3rd example in FIG. 3A. FIG. 3P is a partial cross-sectional view of the radial reduction lens element 312 and the light blocking element 330 according to the 3rd example in FIG. 3O. FIG. 3Q is another partial cross-sectional view of the radial reduction lens element 312 and the light blocking element 330 according to the 3rd example in FIG. 3O. FIG. 3R is a cross-sectional view of the radial reduction lens element 312 and the light blocking element 330 according to the 3rd example in FIG. 3O. FIG. 3S is a cross-sectional schematic view of the radial reduction lens element 312 and the light blocking element 330 according to the 3rd example in FIG. 3O. FIG. 3T is another cross-sectional view of the radial reduction lens element 312 and the light blocking element 330 according to the 3rd example in FIG. 3O. FIG. 3U is another cross-sectional schematic view of the radial reduction lens element 312 and the light blocking element 330 according to the 3rd example in FIG. 3O. In FIGS. 3C, 3I and 3L to 3U, the extending light blocking structure 332 and the reduction part 361a of the radial reduction lens element 312 are correspondingly disposed, and a location parallel to the optical axis X of an end part 332a of the extending light blocking structure 332 is different from a location parallel to the optical axis X of a middle part 332b of the extending light blocking structure 332. In particular, the end part 332a is connected to the receiving structure 331 and the extending light blocking structure 332, and the middle part 332b is located in the extending light blocking structure 332 and close to the optical axis X.

In FIGS. 3C, 3H to 3I and 3K to 3U, the light blocking element 330 further includes a coplanar structure 333 formed by connecting of the receiving structure 331 and the extending light blocking structure 332. In particular, the demolding resistance during the process of the injection molding can be reduced via the coplanar structure 333, so that the warpage of the product can be prevented during demolding, and the stability of the quality of the product can be enhanced. Furthermore, the connection of the receiving structure 331 and the extending light blocking structure 332 can be the closed loop by the coplanar structure 333 surrounding the central opening 330a, but the present disclosure is not limited thereto.

Furthermore, a normal direction of the coplanar structure 333 is parallel to the optical axis X, and the coplanar structure 333 and the radial reduction lens element 312 are relatively disposed.

The central opening 330a of the light blocking element 330 gradually expands along the optical axis X and towards the coplanar structure 333. The difficulty of the release (that is, demolding) of the product can be reduced by the design of draft bevel so as to enhance the yield rate.

In FIGS. 3K and 3O to 3U, an air gap is located between the extending light blocking structure 332 and the radial reduction lens element 312. Therefore, the interference between the light blocking element 330 and the radial reduction lens element 312 can be prevented so as to ensure the assembling quality.

In FIG. 3B, the light blocking element 330 is a black plastic product, and the light blocking element 330 includes at least one gate trace 334. According to the 3rd example, a number of the gate trace 334 is two, but the present disclosure is not limited thereto. Therefore, the light blocking element 330 can be corresponding to the structure of the injection molding product which is more complicated, so that the design margin of the mold can be enhanced.

In FIGS. 3D, 3G, 3I and 3J, when a maximum distance parallel to the optical axis X between the end part 332a and the middle part 332b is D1, a maximum distance parallel to the optical axis X between the effective optical portion 361 located on the reduction part 361a of the radial reduction lens element 312 and the receiving surface 362a of the peripheral portion 362 is D2, a maximum thickness of the radial reduction lens element 312 close to the optical axis X is DT, a cross-sectional area of the middle part 332b is A0, and a cross-sectional area of the end part 332a is A1, a distance of a long side defined via the central opening 330a is DL, and a distance of a short side defined via the central opening 330a is DS, the following conditions of the Table 3 are satisfied.

TABLE 3

3rd example

| D1 (mm) | 0.15 | A0 (mm$^2$) | 0.039 |
|---|---|---|---|
| D2 (mm) | 0.18 | A1 (mm$^2$) | 0.032 |
| DT (mm) | 1.35 | A0/A1 | 1.22 |
| D1/D2 | 0.83 | DS (mm) | 2.99 |
| D1/DT | 0.11 | DL (mm) | 3.68 |
| D2/DT | 0.13 | DS/DL | 0.81 |

4th Example

Figure 4A:
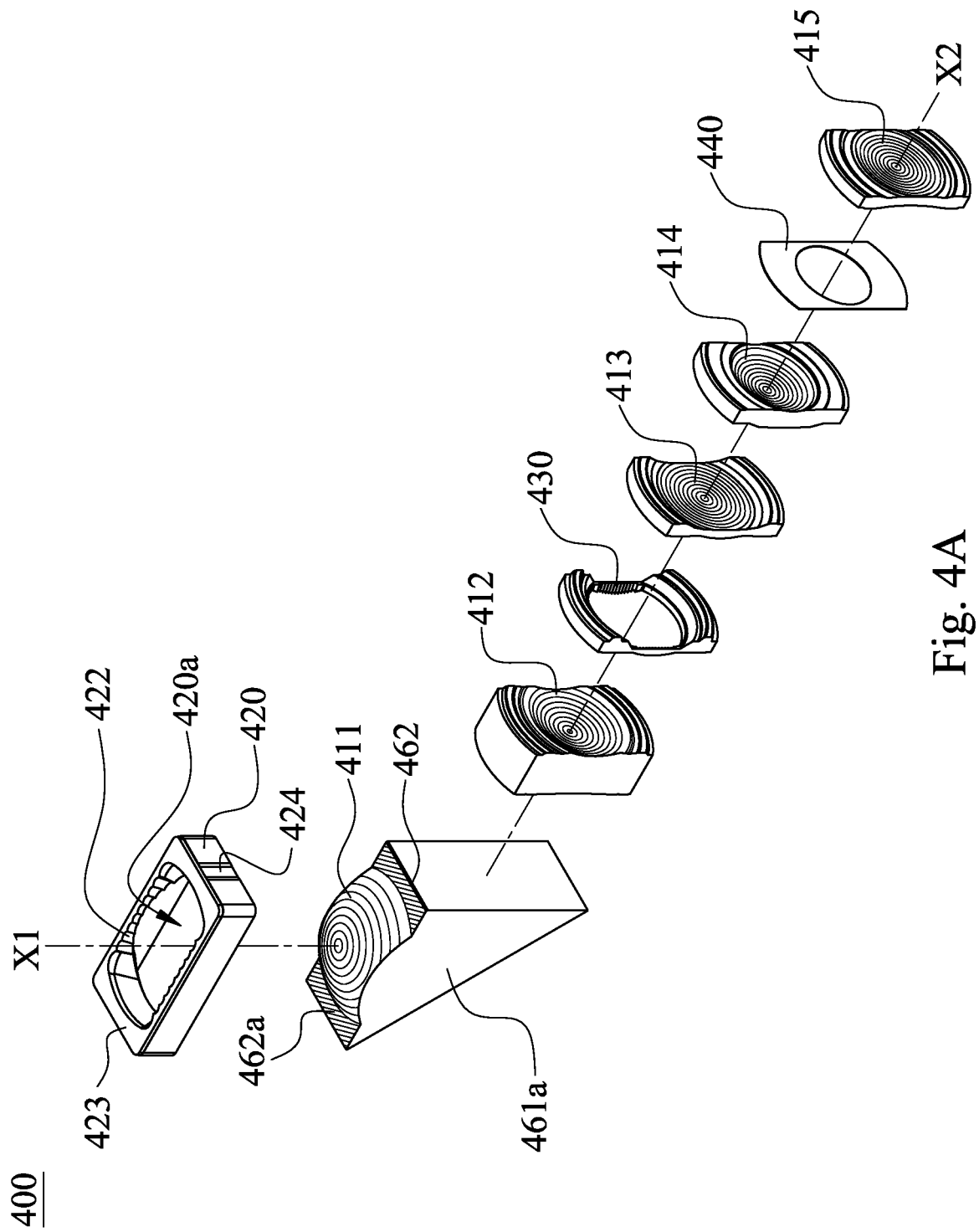
FIG. 4A is an exploded view of an imaging lens assembly according to the 4th example of the present disclosure.
Figure 4B:
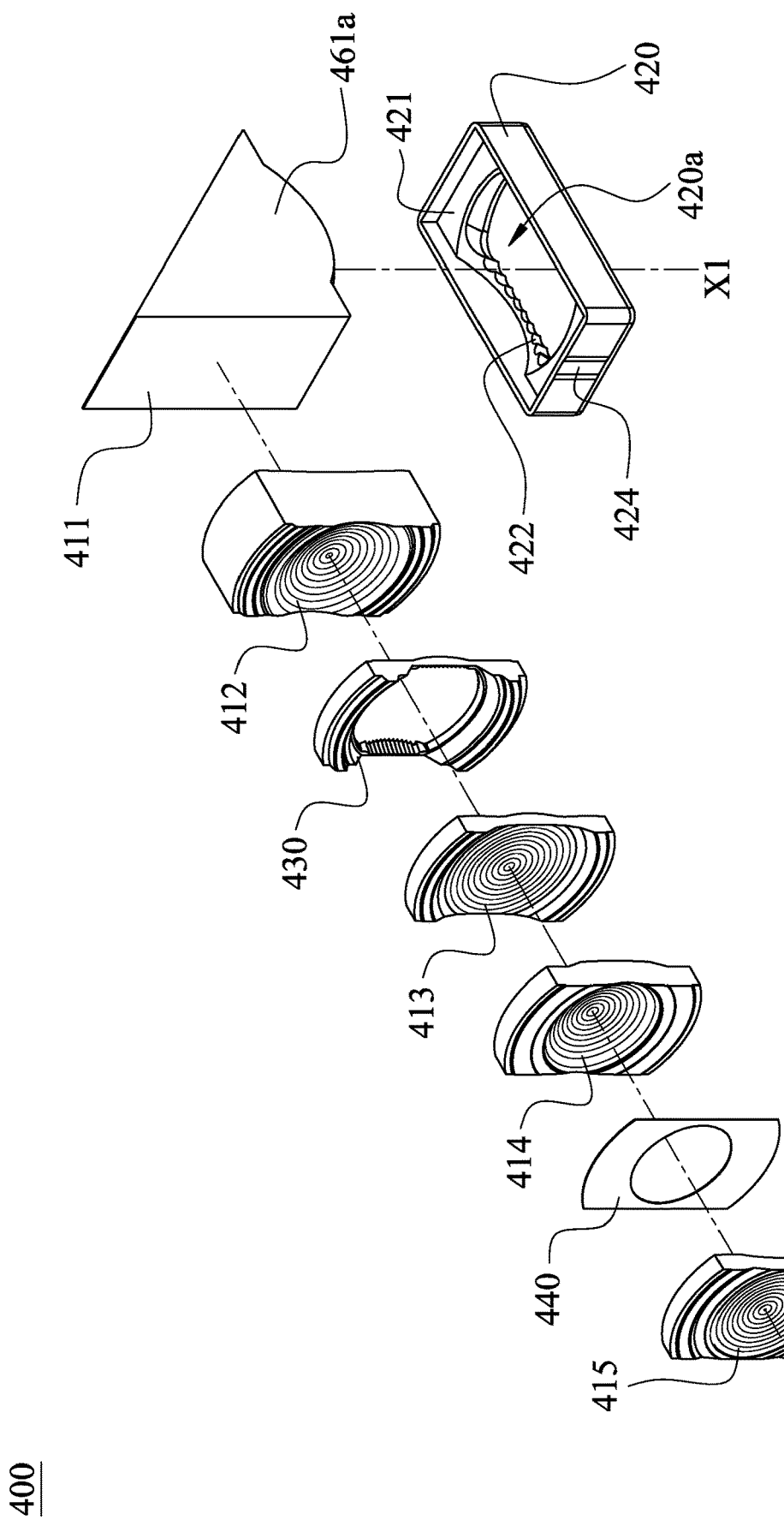
FIG. 4B is another exploded view of the imaging lens assembly according to the 4th example in FIG. 4A.

FIG. 4A is an exploded view of an imaging lens assembly 400 according to the 4th example of the present disclosure. FIG. 4B is another exploded view of the imaging lens assembly 400 according to the 4th example in FIG. 4A. In FIGS. 4A and 4B, the imaging lens assembly 400 has an optical axis (that is, a first optical axis X1 and a second optical axis X2), and the imaging lens assembly 400, in order from an object side to an image side, includes a light blocking element 420, radial reduction lens elements 411, 412, a light blocking element 430, radial reduction lens elements 413, 414, a light blocking sheet 440 and a radial reduction lens element 415, wherein the optical features such as numbers, structures, surface shapes and so on of the radial reduction lens elements can be disposed according to different imaging demand, and the optical features are not limited thereto.

In particular, the radial reduction lens element 411 is a reflective lens element, and the radial reduction lens element 411 is configured to guide an imaging light path (its reference numeral is omitted) enter the radial reduction lens element 411 along the first optical axis X1, and reflect the imaging light path enter the radial reduction lens element 412 along the second optical axis X2.

FIG. 4C is a side view of the radial reduction lens element 411 according to the 4th example in FIG. 4A. FIG. 4D is an image-side schematic view of the radial reduction lens element 411 according to the 4th example in FIG. 4A. In FIGS. 4A to 4D, the radial reduction lens element 411 includes an effective optical portion 461 and a peripheral portion 462. The first optical axis X1 passes through the effective optical portion 461, the effective optical portion 461 includes a reduction part 461a, and the reduction part 461a shrinks from a portion of the effective optical portion 461 towards the first optical axis X1 so that the effective optical portion 461 is non-circular. The peripheral portion 462 extends from the effective optical portion 461 towards a direction away from the first optical axis X1, and the peripheral portion 462 and the reduction part 461a are disposed at interval along a circumferential direction surrounding the first optical axis X1. The entire volume of the imaging lens assembly 400 can be reduced via the radial reduction lens element 411, so that the possibility of the compact size of the imaging lens assembly 400 is provided. In particular, the reduction part 461a can be formed by the mold design of the injection molding or the cutting of the product after molding, but the present disclosure is not limited thereto.

Figures 4E, 4F:
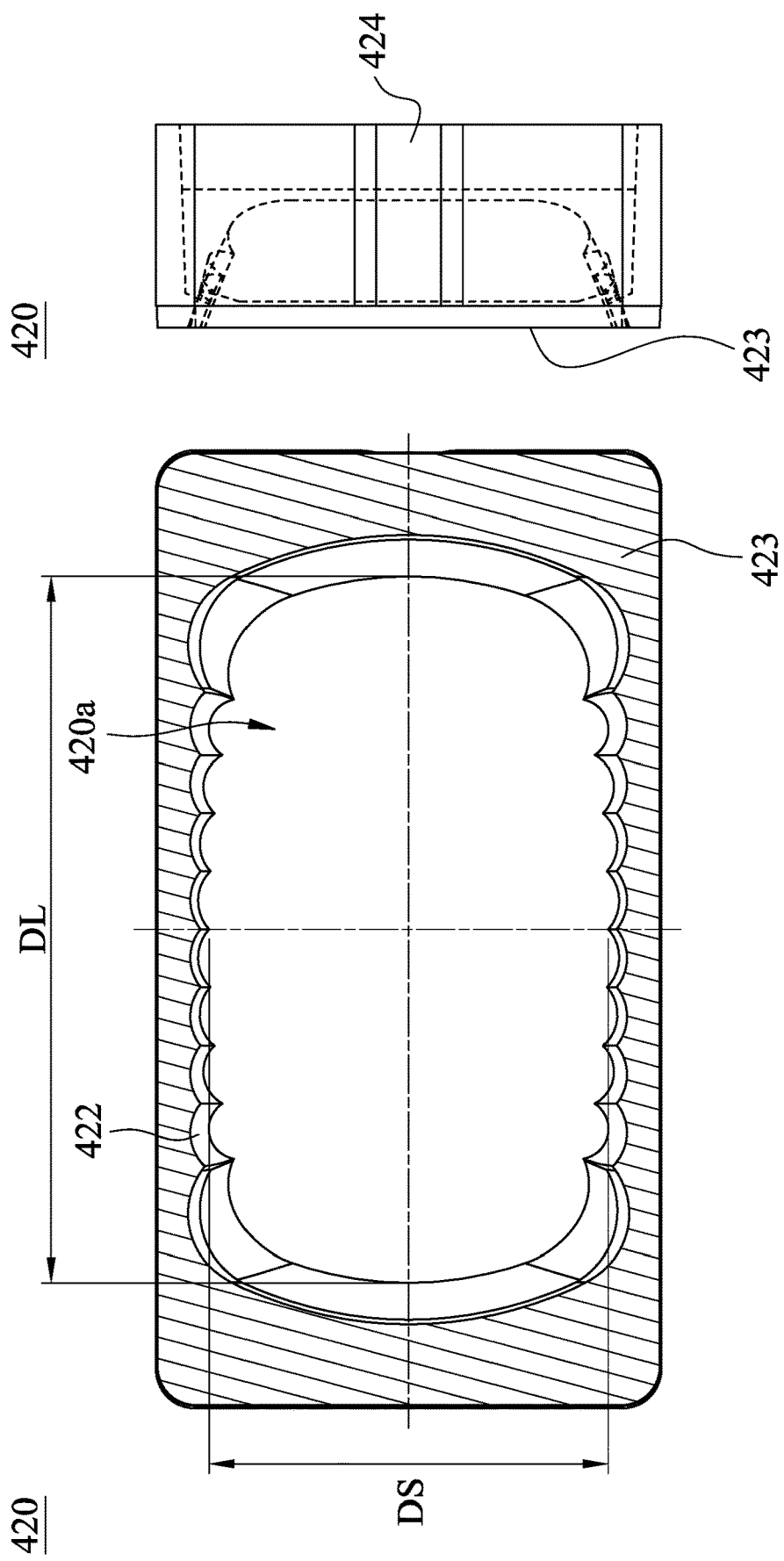
FIG. 4E is an object-side schematic view of the light blocking element according to the 4th example in FIG. 4A.
FIG. 4F is a side view of the light blocking element according to the 4th example in FIG. 4A.

FIG. 4E is an object-side schematic view of the light blocking element 420 according to the 4th example in FIG. 4A. FIG. 4F is a side view of the light blocking element 420 according to the 4th example in FIG. 4A. FIG. 4G is another side view of the light blocking element 420 according to the 4th example in FIG. 4A. In FIGS. 4A, 4B, 4E, 4F and 4G, the light blocking element 420 has a central opening 420a, the first optical axis X1 passes through the central opening 420a, and the light blocking element 420 includes a receiving structure 421 and an extending light blocking structure 422, wherein the receiving structure 421 extends along the first optical axis X1 and towards the image side of the imaging lens assembly 400, the extending light blocking structure 422 and the receiving structure 421 are disposed at interval along the circumferential direction surrounding the first optical axis X1, and the extending light blocking structure 422 is connected to the receiving structure 421 so that the central opening 420a is non-circular. Therefore, the non-imaging light can be prevented from entering the radial reduction lens element 411 so as to ensure the image quality.

FIG. 4H is another side view of the radial reduction lens element 411 according to the 4th example in FIG. 4A. FIG. 4I is an assembling schematic view of the radial reduction lens element 411 with the light blocking element 420 according to the 4th example in FIG. 4A. In FIGS. 4G to 4I, the receiving structure 421 is directly contacted with the peripheral portion 462 of the radial reduction lens element 411. Furthermore, the peripheral portion 462 of the radial reduction lens element 411 includes a receiving surface 462a directly contacted with the receiving structure 421 of the light blocking element 420. Therefore, the assembling process of the light blocking element 420 can be more stable so as to reduce the assembling tolerance.

Figure 4J:
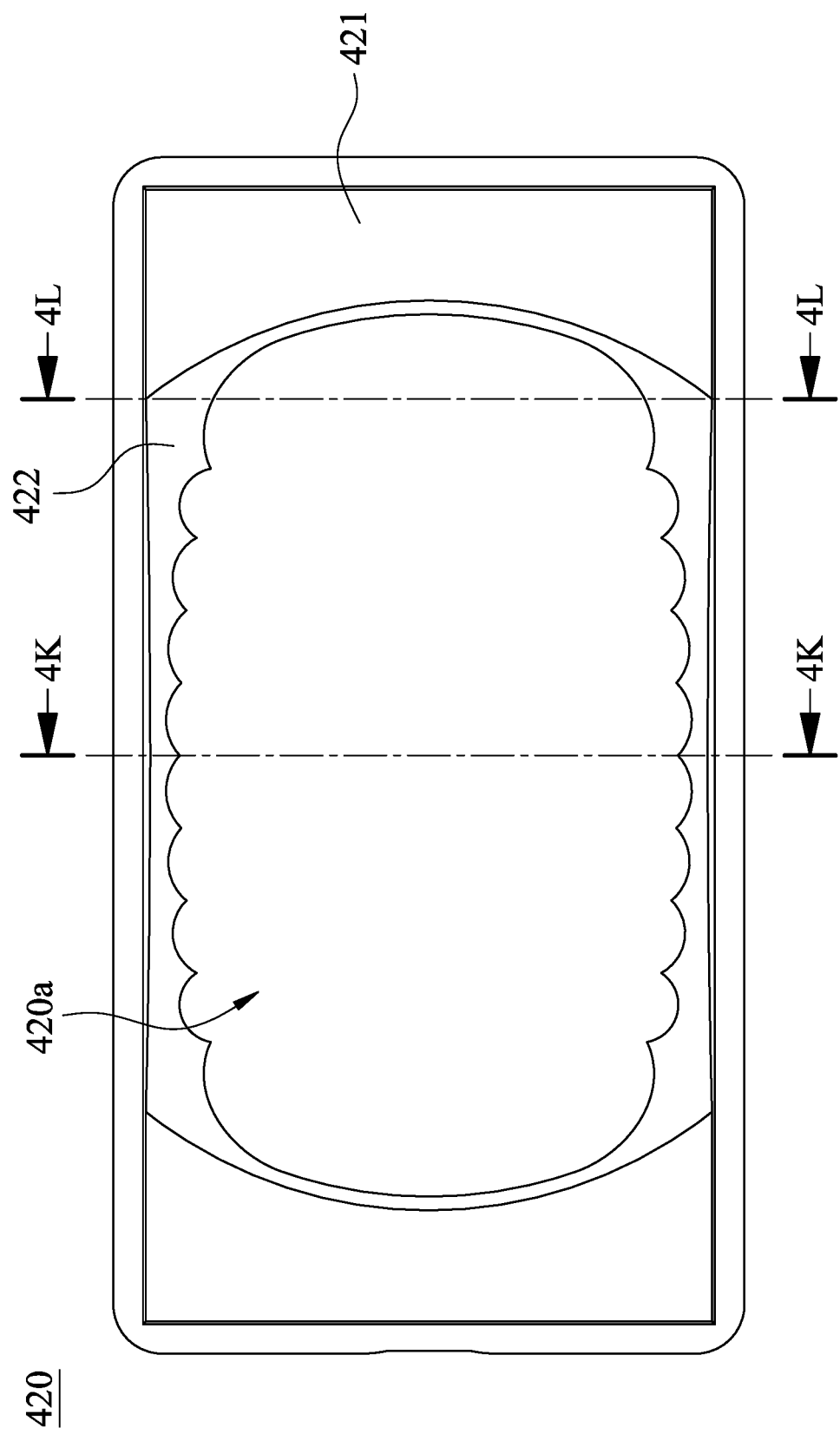
FIG. 4J is an image-side schematic view of the light blocking element according to the 4th example in FIG. 4A.
Figure 4L:
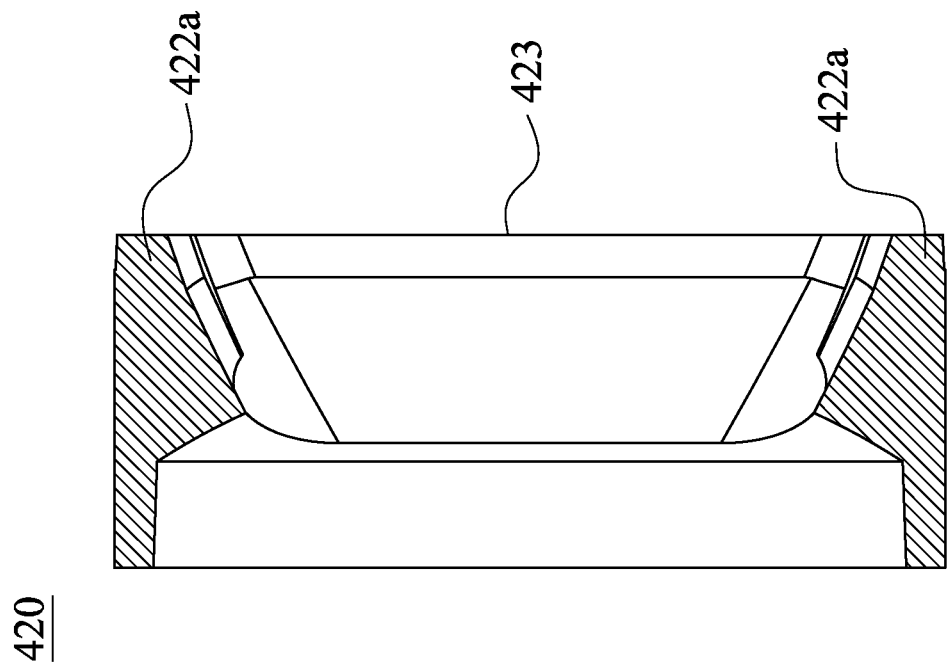
FIG. 4L is a cross-sectional side view of the light blocking element along a 4L-4L line in FIG. 4J.
Figure 4K:
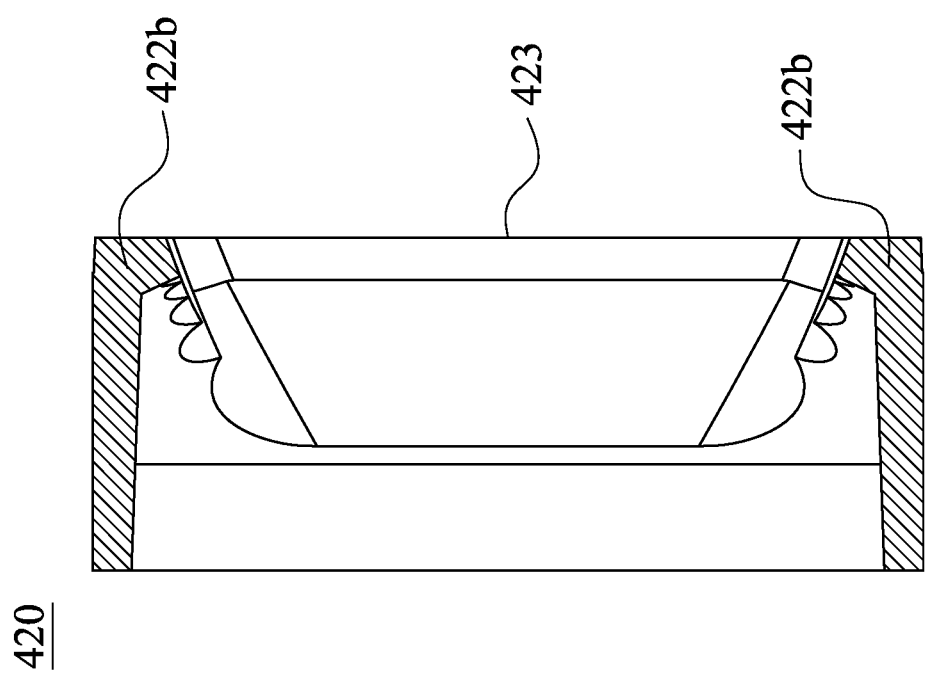
FIG. 4K is a cross-sectional side view of the light blocking element along a 4K-4K line in FIG. 4J.
Figure 4M:
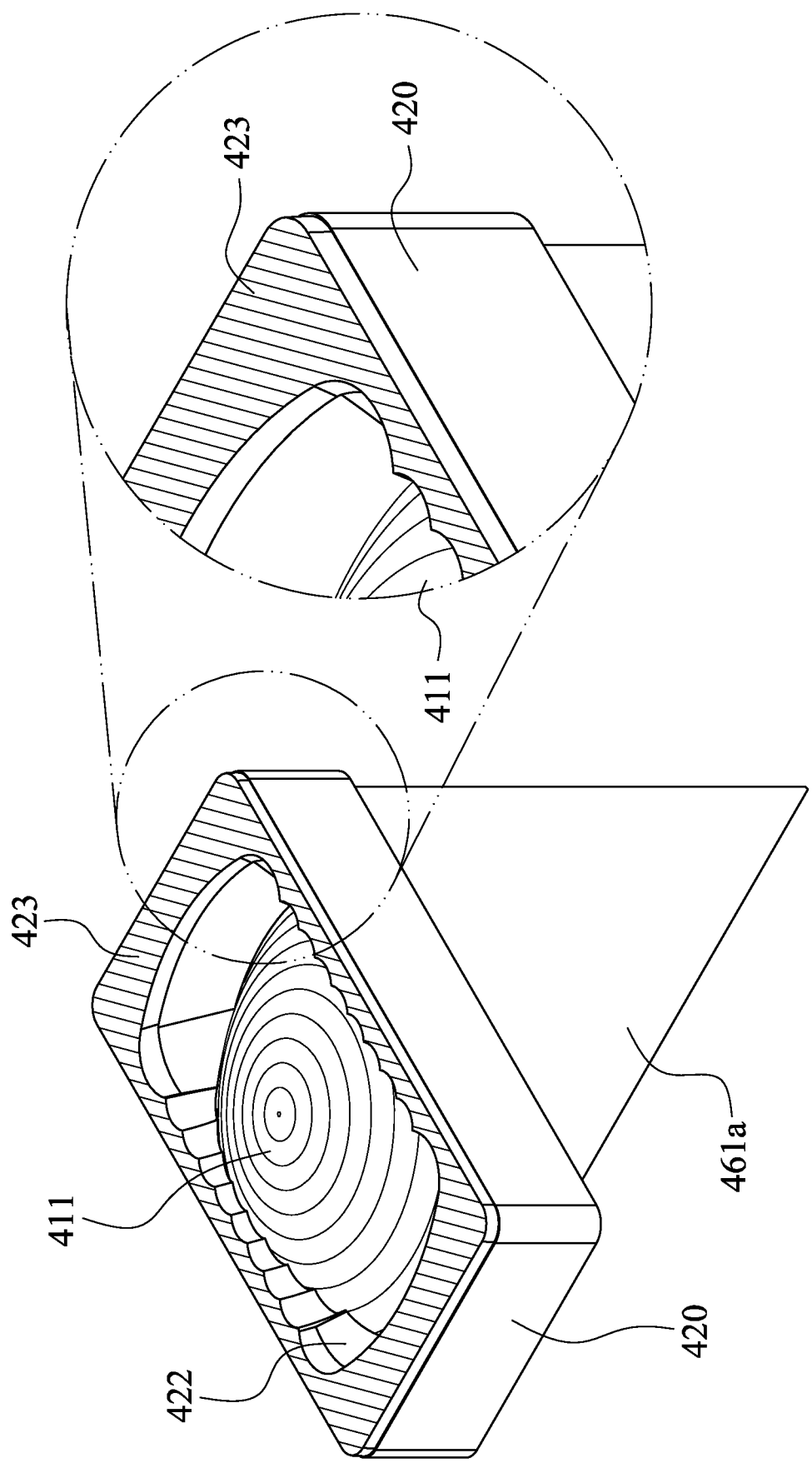
FIG. 4M is an assembling three dimensional view of the radial reduction lens element with the light blocking element according to the 4th example in FIG. 4A.
Figure 4O:
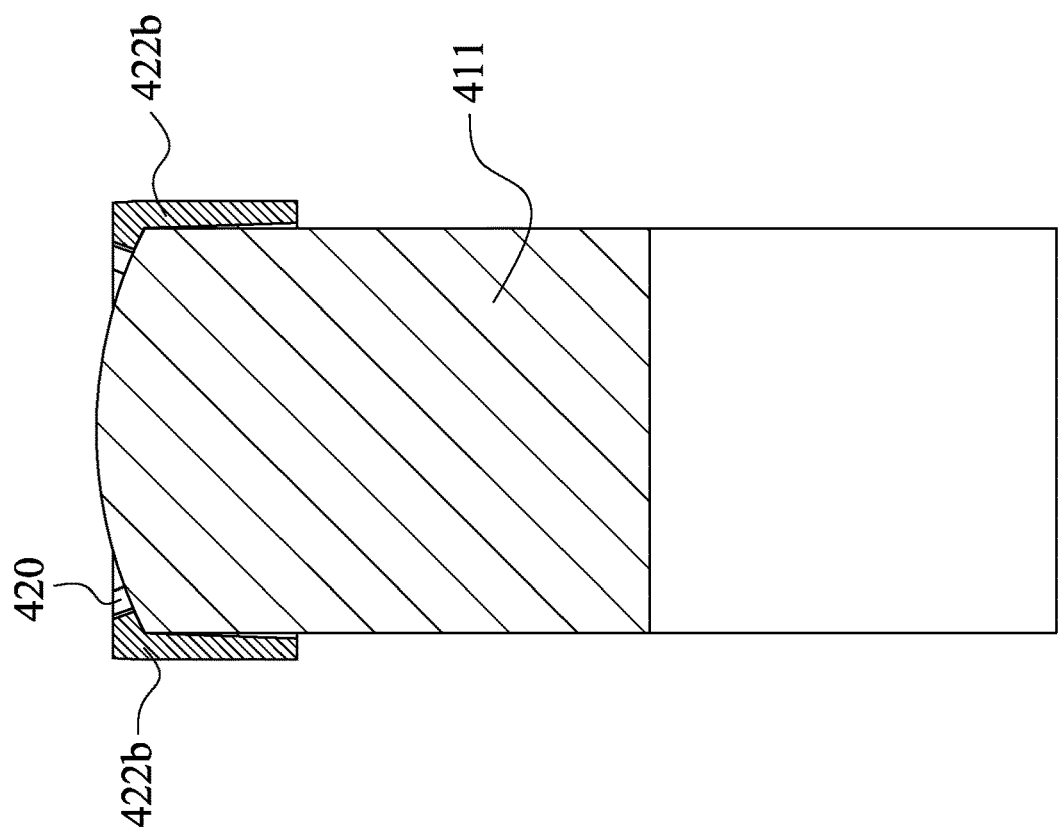
FIG. 4O is a cross-sectional schematic view of the radial reduction lens element and the light blocking element according to the 4th example in FIG. 4M.
Figure 4N:
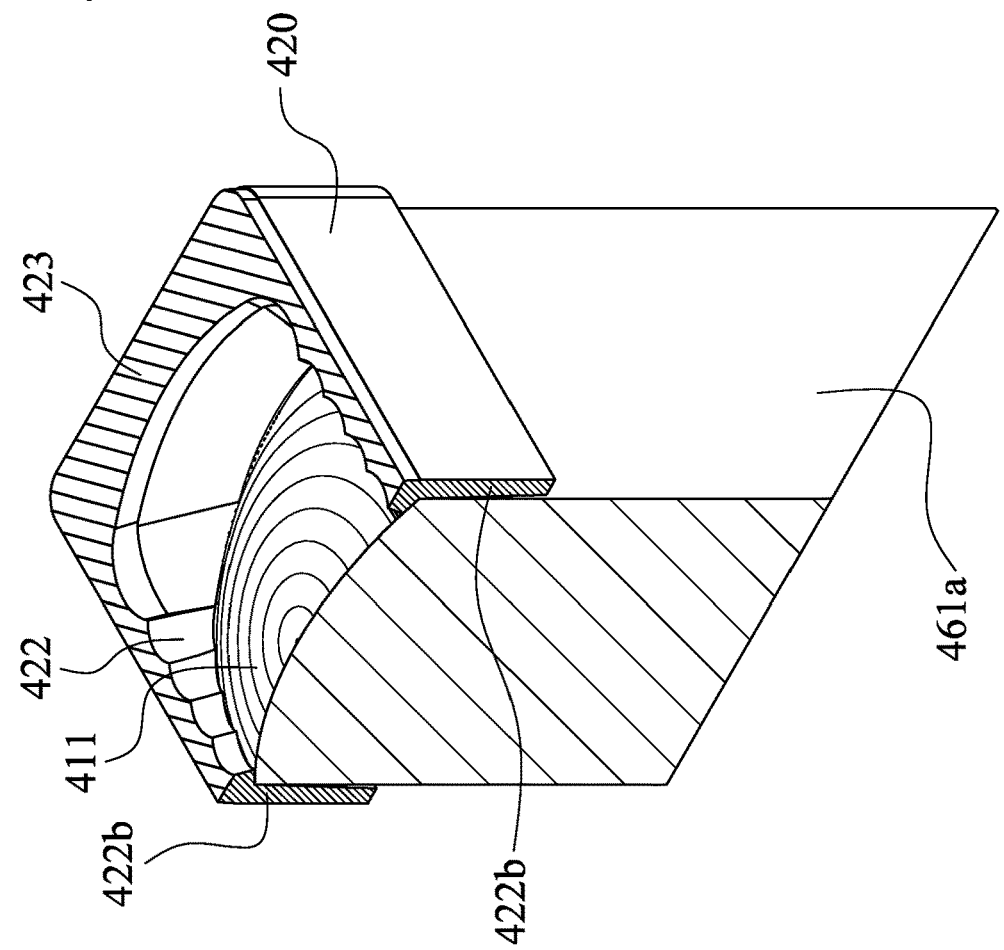
FIG. 4N is a cross-sectional view of the radial reduction lens element and the light blocking element according to the 4th example in FIG. 4M.
Figure 4Q:
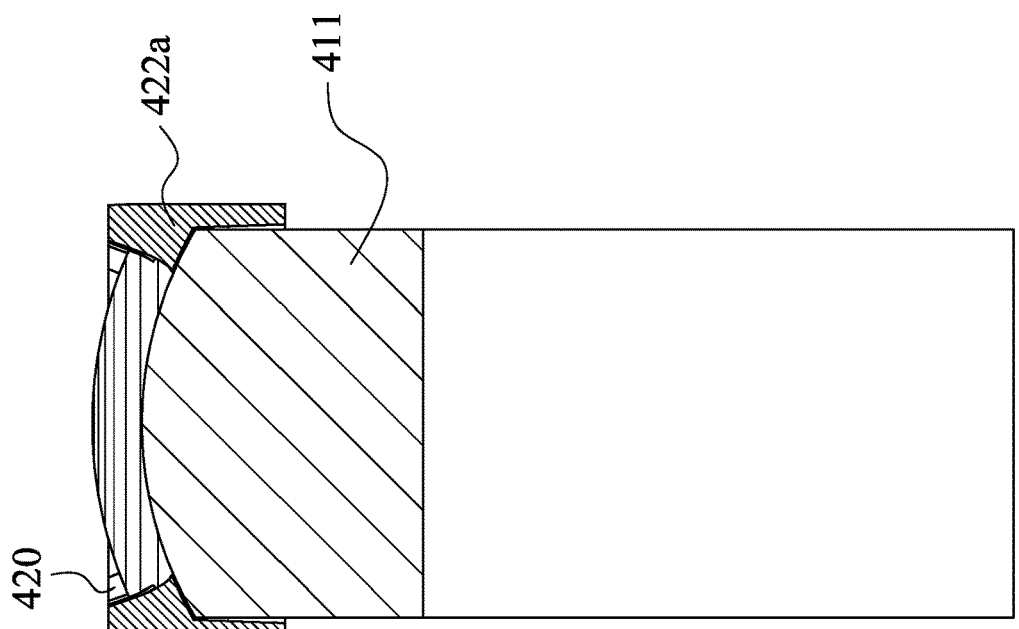
FIG. 4Q is another cross-sectional schematic view of the radial reduction lens element and the light blocking element according to the 4th example in FIG. 4M.
Figure 4P:
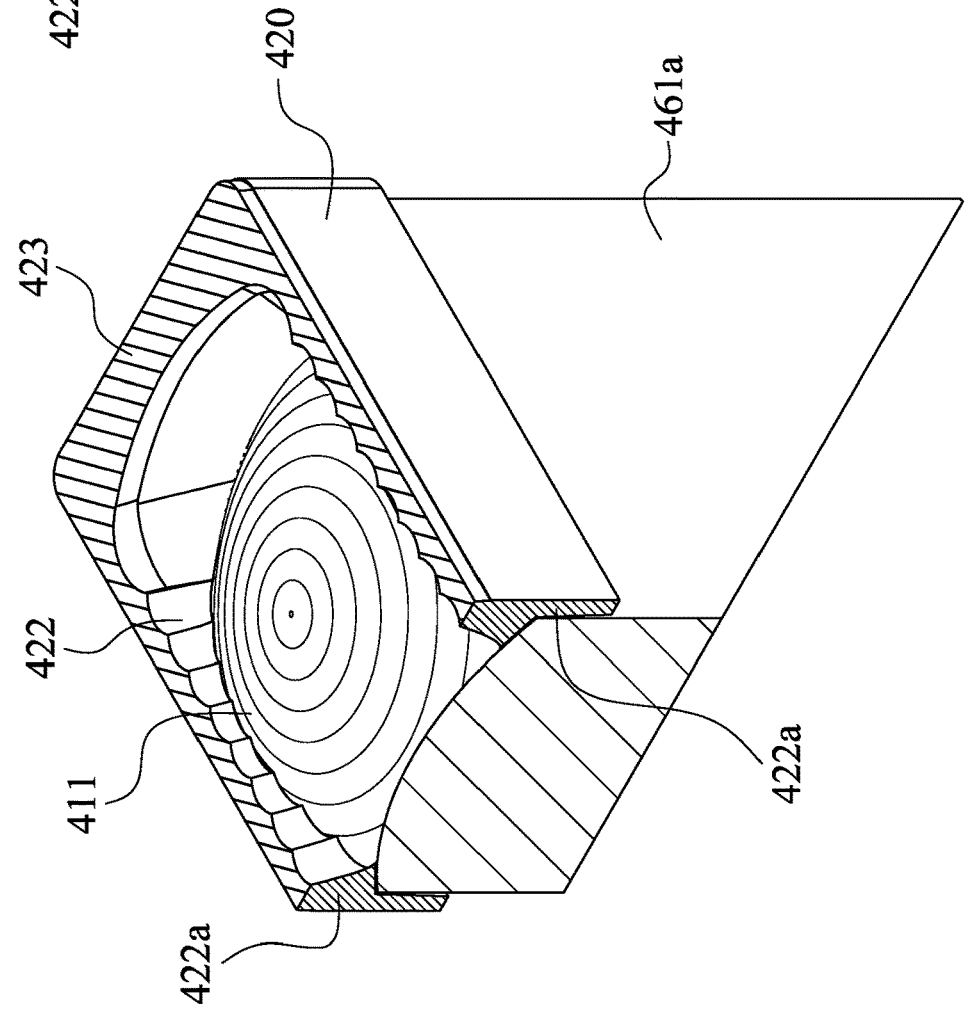
FIG. 4P is another cross-sectional view of the radial reduction lens element and the light blocking element according to the 4th example in FIG. 4M.

FIG. 4J is an image-side schematic view of the light blocking element 420 according to the 4th example in FIG. 4A. FIG. 4K is a cross-sectional side view of the light blocking element 420 along a 4K-4K line in FIG. 4J. FIG. 4L is a cross-sectional side view of the light blocking element 420 along a 4L-4L line in FIG. 4J. FIG. 4M is an assembling three dimensional view of the radial reduction lens element 411 with the light blocking element 420 according to the 4th example in FIG. 4A. FIG. 4N is a cross-sectional view of the radial reduction lens element 411 and the light blocking element 420 according to the 4th example in FIG. 4M. FIG. 4O is a cross-sectional schematic view of the radial reduction lens element 411 and the light blocking element 420 according to the 4th example in FIG. 4M. FIG. 4P is another cross-sectional view of the radial reduction lens element 411 and the light blocking element 420 according to the 4th example in FIG. 4M. FIG. 4Q is another cross-sectional schematic view of the radial reduction lens element 411 and the light blocking element 420 according to the 4th example in FIG. 4M. In FIGS. 4B, 4G and 4J to 4Q, the extending light blocking structure 422 and the reduction part 461a of the radial reduction lens element 411 are correspondingly disposed, and a location parallel to the first optical axis X1 of an end part 422a of the extending light blocking structure 422 is different from a location parallel to the first optical axis X1 of a middle part 422b of the extending light blocking structure 422. In particular, the end part 422a is connected to the receiving structure 421 and the extending light blocking structure 422, and the middle part 422b is located in the extending light blocking structure 422 and close to the first optical axis X1.

In FIGS. 4A, 4E to 4G, 4I, 4L to 4N and 4P, the light blocking element 420 further includes a coplanar structure 423 formed by connecting of the receiving structure 421 and the extending light blocking structure 422. In particular, the demolding resistance during the process of the injection molding can be reduced via the coplanar structure 423, so that the warpage of the product can be prevented during demolding, and the stability of the quality of the product can be enhanced. Furthermore, the connection of the receiving structure 421 and the extending light blocking structure 422 can be the closed loop by the coplanar structure 423 surrounding the central opening 420a, but the present disclosure is not limited thereto.

Furthermore, a normal direction of the coplanar structure 423 is parallel to the first optical axis X1, and the coplanar structure 423 and the radial reduction lens element 411 are relatively disposed. When the coplanar structure 423 is located on the most object-side end or the most image-side end of the imaging lens assembly 400, the smooth appearance of the imaging lens assembly 400 can be obtained. According to the 4th example, the coplanar structure 423 is located on the most object-side end of the imaging lens assembly 400.

The central opening 420a of the light blocking element 420 gradually expands along the first optical axis X1 and towards the coplanar structure 423. The difficulty of the release (that is, demolding) of the product can be reduced by the design of draft bevel so as to enhance the yield rate.

In FIGS. 4I and 4M to 4Q, an air gap is located between the extending light blocking structure 422 and the radial reduction lens element 411. Therefore, the interference between the light blocking element 420 and the radial reduction lens element 411 can be prevented so as to ensure the assembling quality.

In FIGS. 4A and 4B, the light blocking element 420 is a black plastic product, and the light blocking element 420 includes at least one gate trace 424. According to the 4th example, a number of the gate trace 424 is one, but the present disclosure is not limited thereto.

In FIGS. 4E, 4G and 4H, when a maximum distance parallel to the optical axis (that is, the first optical axis X1) between the end part 422a and the middle part 422b is D1, a maximum distance parallel to the optical axis (that is, the first optical axis X1) between the effective optical portion 461 located on the reduction part 461a of the radial reduction lens element 411 and the receiving surface 462a of the peripheral portion 462 is D2, a maximum thickness of the radial reduction lens element 411 close to the optical axis (that is, the first optical axis X1) is DT, a cross-sectional area of the middle part 422b is A0, and a cross-sectional area of the end part 422a is A1, a distance of a long side defined via the central opening 420a is DL, and a distance of a short side defined via the central opening 420a is DS, the following conditions of the Table 4 are satisfied.

TABLE 4

| 4th example | | | |
|---|---|---|---|
| D1 (mm) | 0.80 | A0 (mm$^2$) | 0.361 |
| D2 (mm) | 0.79 | A1 (mm$^2$) | 0.534 |
| DT (mm) | 4.71 | A0/A1 | 0.68 |
| D1/D2 | 1.01 | DS (mm) | 3.08 |
| D1/DT | 0.17 | DL (mm) | 5.46 |
| D2/DT | 0.17 | DS/DL | 0.56 |

5th Example

Figure 5A:
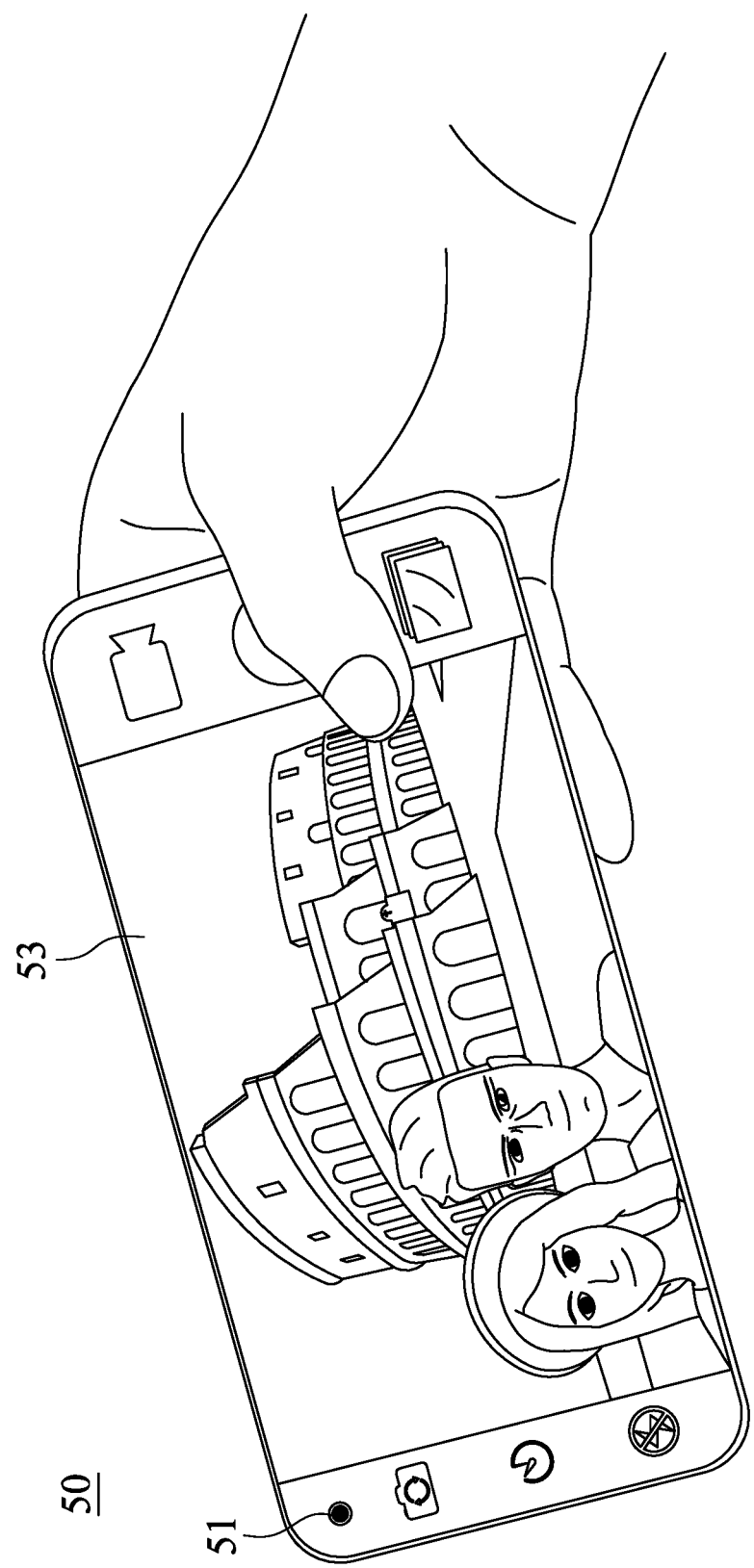
FIG. 5A is a schematic view of an electronic device according to the 5th example of the present disclosure.
Figure 5B:
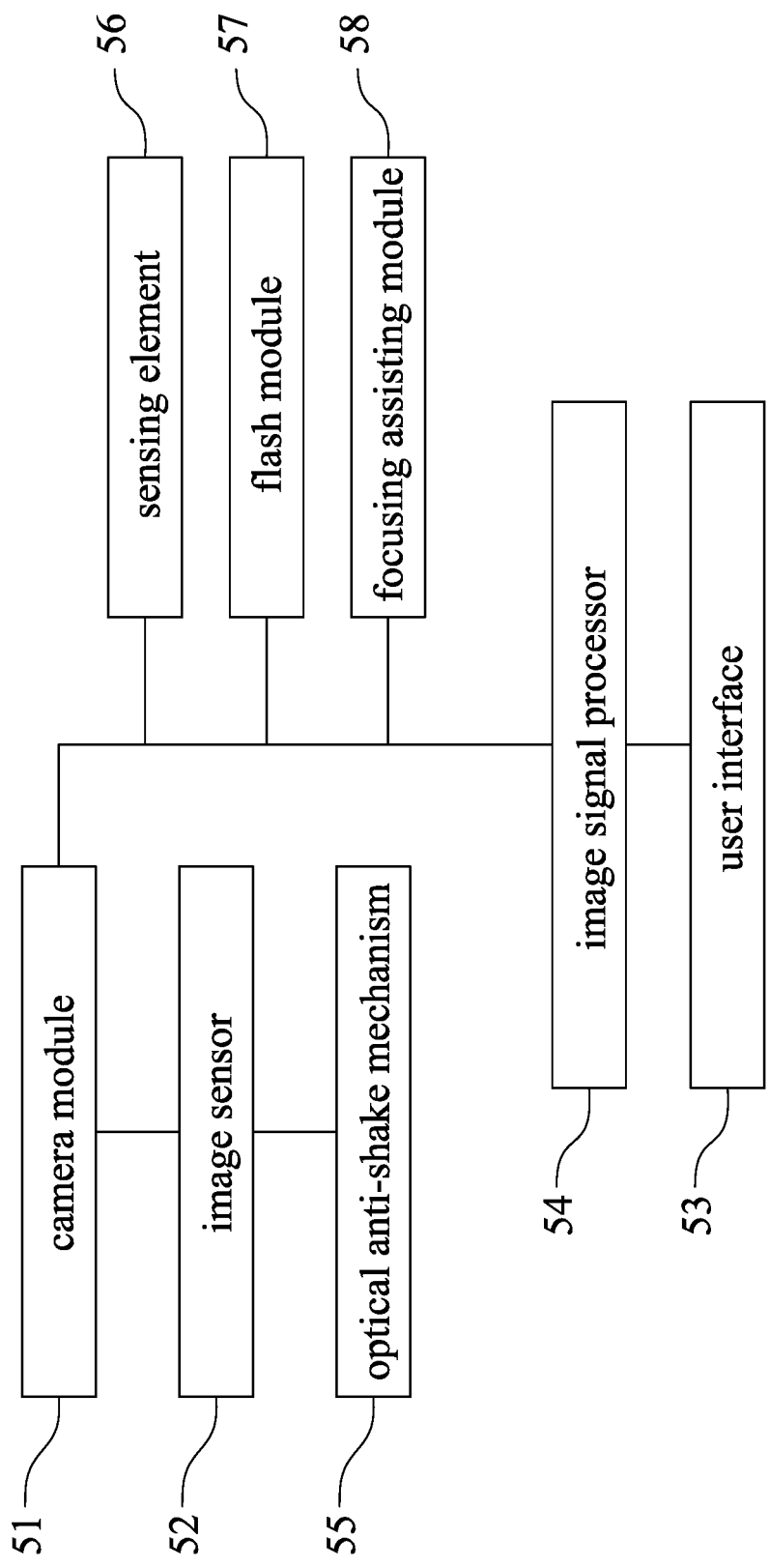
FIG. 5B is a block diagram of the electronic device according to the 5th example in FIG. 5A.

FIG. 5A is a schematic view of an electronic device 50 according to the 5th example of the present disclosure. FIG. 5B is a block diagram of the electronic device 50 according to the 5th example in FIG. 5A. In FIGS. 5A and 5B, the electronic device 50 is a smart phone, and includes a camera module 51, an image sensor 52 and a user interface 53, wherein the camera module 51 includes an imaging lens assembly (not shown). The camera module 51 according to the 5th example is disposed on an area of side of the user interface 53, wherein the user interface 53 can be a touch screen or a display screen, but is not limited thereto. The camera module 51 can be one of the camera module according to the aforementioned 1st example to the 4th example, but the present disclosure is not limited thereto.

Moreover, users enter a shooting mode via the user interface 53 of the electronic device 50. At this moment, the imaging light is gathered on the image sensor 52 via the camera module 51, and an electronic signal about an image is output to an image signal processor (ISP) 54.

To meet a specification of a camera of the electronic device 50, the electronic device 50 can further include an optical anti-shake mechanism 55, which can be an optical image stabilization (OIS). Furthermore, the electronic device 50 can further include at least one auxiliary optical element (its reference numeral is omitted) and at least one sensing element 56. According to the 5th example, the auxiliary optical element is a flash module 57 and a focusing assisting module 58. The flash module 57 can be configured to compensate a color temperature, and the focusing assisting module 58 can be an infrared distance measurement component, a laser focus module, etc. The sensing element 56 can have functions for sensing physical momentum and kinetic energy, such as an accelerator, a gyroscope, a Hall Effect Element, to sense shaking or jitters applied by hands of the user or external environments. Accordingly, the camera module 51 of the electronic device 50 equipped with an auto-focusing mechanism and the optical anti-shake mechanism 55 can be enhanced to achieve the superior image quality. Furthermore, the electronic device 50 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 50 can further include, but not be limited to, a display, a control unit, a storage unit, a random access memory (RAM), a read-only memory (ROM), or the combination thereof.

Figure 5C:
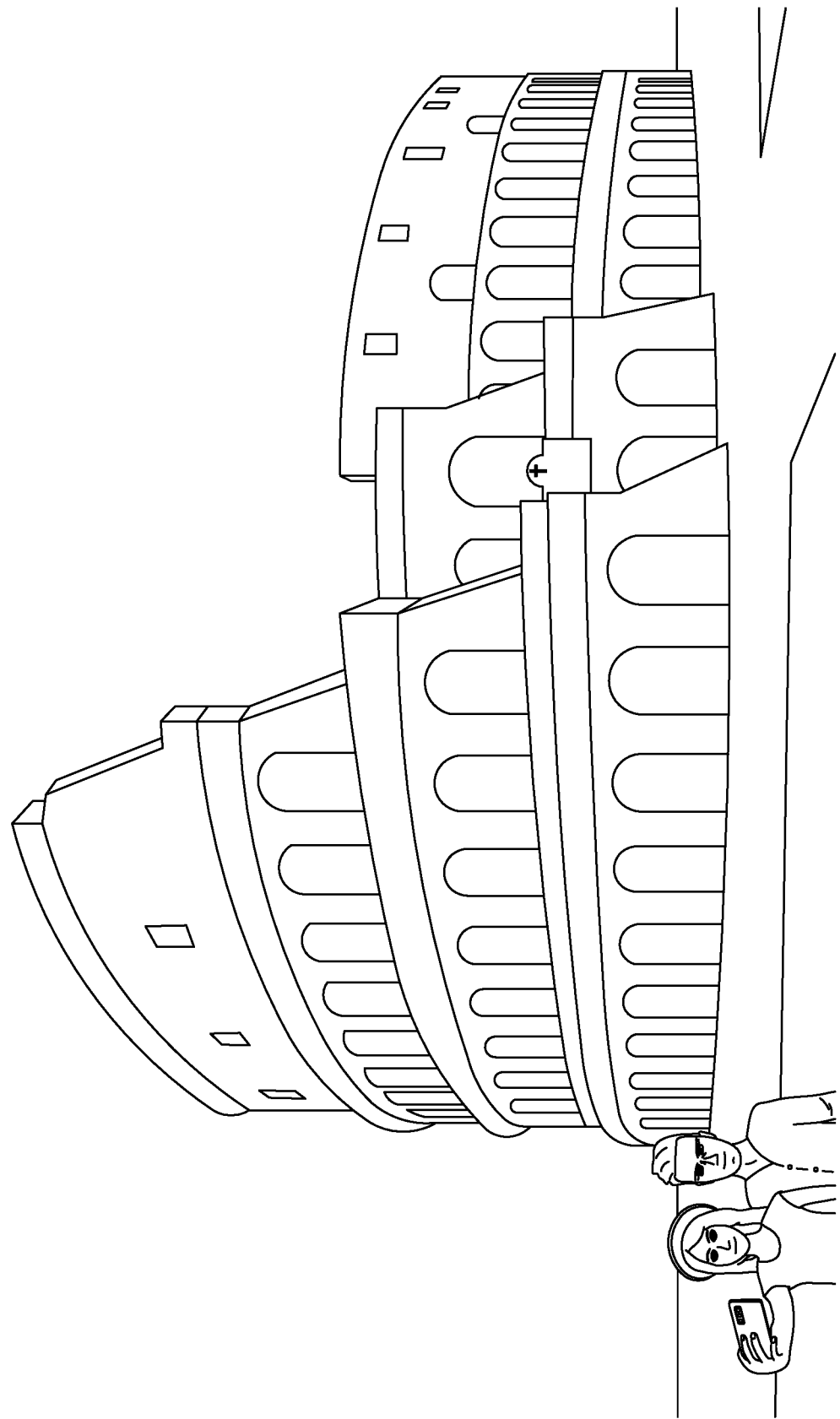
FIG. 5C is a schematic view of a selfie scene according to the 5th example in FIG. 5A.
Figure 5D:
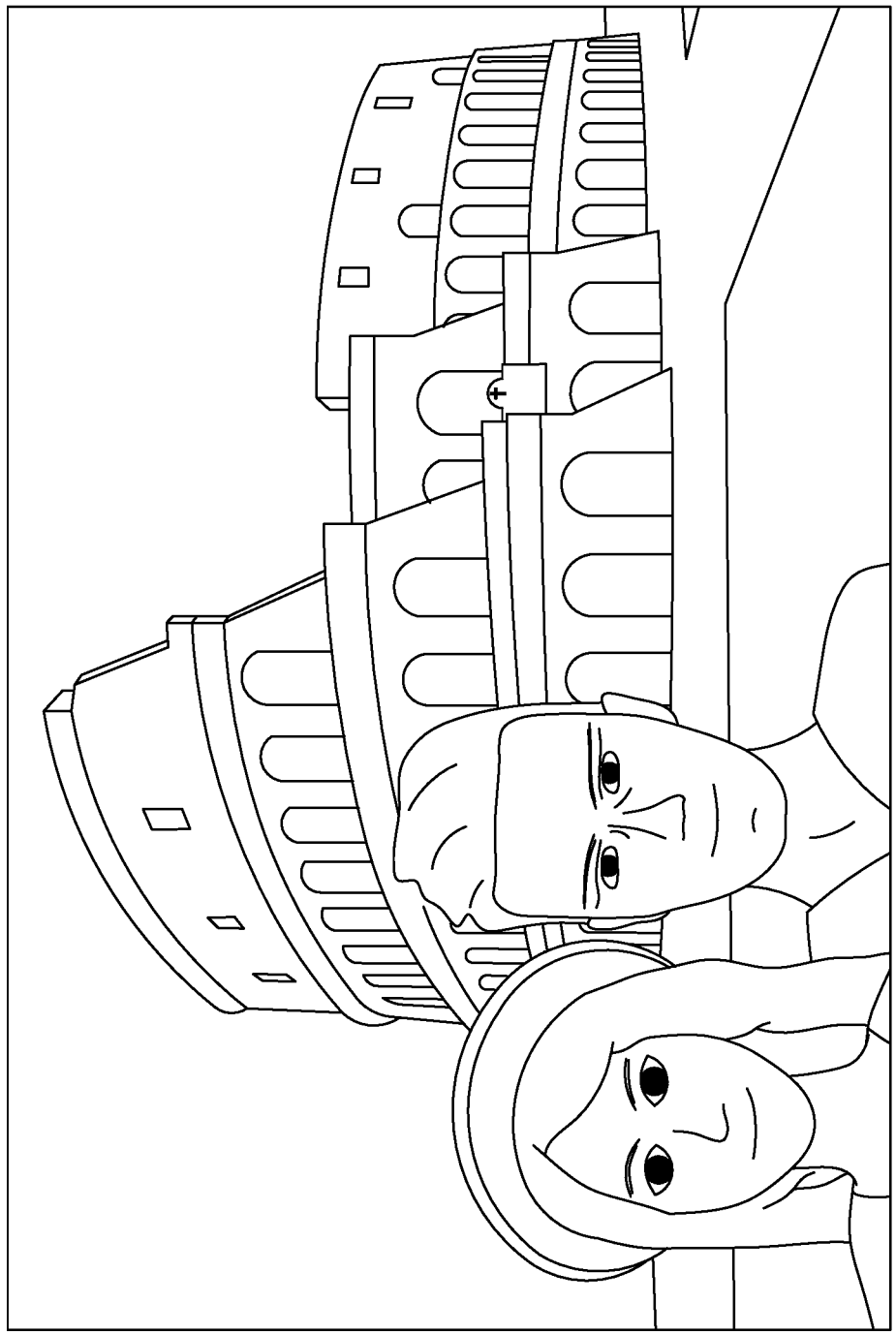
FIG. 5D is a schematic view of a captured image according to the 5th example in FIG. 5A.

FIG. 5C is a schematic view of a selfie scene according to the 5th example in FIG. 5A. FIG. 5D is a schematic view of a captured image according to the 5th example in FIG. 5A. In FIGS. 5A to 5D, both of the camera module 51 and the user interface 53 face towards the users. When proceeding selfie or live streaming, the users can watch a captured image and operate an interface at the same time, and the capture image as FIG. 5D can be obtained after shooting. Therefore, better shooting experience can be provided via the camera module 51 of the present disclosure.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, having an optical axis, and comprising:
   at least one radial reduction lens element, comprising:
      an effective optical portion, the optical axis passing through the effective optical portion, and comprising:
         a reduction part shrinking from a portion of the effective optical portion towards the optical axis so that the effective optical portion being non-circular; and
      a peripheral portion extending from the effective optical portion towards a direction away from the optical axis, and the peripheral portion and the reduction part disposed at interval along a circumferential direction surrounding the optical axis; and
   a light blocking element having a central opening, the optical axis passing through the central opening, and comprising:
      a receiving structure extending along the optical axis and towards one of an object side and an image side of the imaging lens assembly; and
      an extending light blocking structure and the receiving structure disposed at interval along the circumferential direction surrounding the optical axis, and the extending light blocking structure connected to the receiving structure so that the central opening being non-circular;
   wherein the receiving structure is directly contacted with the peripheral portion of the at least one radial reduction lens element;
   wherein the extending light blocking structure and the reduction part of the at least one radial reduction lens element are correspondingly disposed;
   wherein a location parallel to the optical axis of an end part of the extending light blocking structure is different from a location parallel to the optical axis of a middle part of the extending light blocking structure.

2. The imaging lens assembly of claim 1, wherein the peripheral portion of the at least one radial reduction lens element comprises:
   a receiving surface directly contacted with the receiving structure of the light blocking element.

3. The imaging lens assembly of claim 1, wherein a maximum distance parallel to the optical axis between the end part and the middle part is D1, and the following condition is satisfied:

$$0.01 \text{ mm} \leq D1 \leq 3.0 \text{ mm}.$$

4. The imaging lens assembly of claim 3, wherein a maximum distance parallel to the optical axis between the effective optical portion located on the reduction part of the at least one radial reduction lens element and a receiving surface of the peripheral portion is D2, and the following condition is satisfied:

$$0.01 \text{ mm} \leq D2 \leq 3.0 \text{ mm}.$$

5. The imaging lens assembly of claim 3, wherein a maximum thickness of the at least one radial reduction lens element close to the optical axis is DT, and the following condition is satisfied:

$$0.04 \text{ mm} \leq DT \leq 4.0 \text{ mm}.$$

6. The imaging lens assembly of claim 4, wherein the maximum distance parallel to the optical axis between the end part and the middle part is D1, the maximum distance parallel to the optical axis between the effective optical portion located on the reduction part of the at least one radial reduction lens element and the receiving surface of the peripheral portion is D2, and the following condition is satisfied:

$$0.05 < D1/D2 < 3.$$

7. The imaging lens assembly of claim 5, wherein a maximum distance parallel to the optical axis between the effective optical portion located on the reduction part of the at least one radial reduction lens element and a receiving surface of the peripheral portion is D2, the maximum thickness of the at least one radial reduction lens element close to the optical axis is DT, and the following condition is satisfied:

$$0.03 < D2/DT < 0.8.$$

8. The imaging lens assembly of claim 5, wherein the maximum distance parallel to the optical axis between the end part and the middle part is D1, the maximum thickness of the at least one radial reduction lens element close to the optical axis is DT, and the following condition is satisfied:

$$0.02 < D1/DT < 0.7.$$

9. The imaging lens assembly of claim 1, wherein a cross-sectional area of the middle part is A0, a cross-sectional area of the end part is A1, and the following condition is satisfied:

$$0.05 < A0/A1 < 2.$$

10. The imaging lens assembly of claim 9, wherein the cross-sectional area of the middle part is A0, the cross-sectional area of the end part is A1, and the following condition is satisfied:

$0.1<A0/A1<1.5$.

11. The imaging lens assembly of claim 1, wherein a distance of a long side defined via the central opening is DL, a distance of a short side defined via the central opening is DS, and the following condition is satisfied:

$0.3<DS/DL<1.0$.

12. The imaging lens assembly of claim 11, wherein the distance of the long side defined via the central opening is DL, the distance of the short side defined via the central opening is DS, and the following condition is satisfied:

$0.5<DS/DL<0.9$.

13. The imaging lens assembly of claim 1, wherein the light blocking element further comprises:
   a coplanar structure formed by connecting the receiving structure and the extending light blocking structure.

14. The imaging lens assembly of claim 13, wherein a normal direction of the coplanar structure is parallel to the optical axis, and the coplanar structure and the at least one radial reduction lens element are relatively disposed.

15. The imaging lens assembly of claim 13, wherein the central opening of the light blocking element gradually expands along the optical axis and towards the coplanar structure.

16. The imaging lens assembly of claim 1, wherein an air gap is located between the extending light blocking structure and the at least one radial reduction lens element.

17. The imaging lens assembly of claim 1, wherein the light blocking element is a black plastic product, and the light blocking element comprises at least one gate trace.

18. A camera module, comprising:
   the imaging lens assembly of claim 1.

19. An electronic device, comprising:
   the camera module of claim 18; and
   an image sensor disposed on an image surface of the camera module.

* * * * *